(12) United States Patent
Bito et al.

(10) Patent No.: US 7,404,575 B2
(45) Date of Patent: Jul. 29, 2008

(54) AIR BAG APPARATUS

(75) Inventors: Kazuaki Bito, Aichi (JP); Kazutoshi Hayashi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 227 days.

(21) Appl. No.: 10/889,363

(22) Filed: Jul. 13, 2004

(65) Prior Publication Data

US 2005/0029779 A1     Feb. 10, 2005

(30) Foreign Application Priority Data

| Jul. 14, 2003 | (JP) | ............................ P2003-196831 |
| Sep. 16, 2003 | (JP) | ............................ P2003-323108 |
| Sep. 16, 2003 | (JP) | ............................ P2003-323117 |
| Sep. 16, 2003 | (JP) | ............................ P2003-323122 |
| Sep. 16, 2003 | (JP) | ............................ P2003-323128 |

(51) Int. Cl.
*B60R 21/16* (2006.01)
*B60R 21/205* (2006.01)

(52) U.S. Cl. .................................................. 280/743.1

(58) Field of Classification Search ................ 280/732, 280/729, 743.1, 743.2, 731
See application file for complete search history.

(56) References Cited

U.S. PATENT DOCUMENTS

| 3,424,151 | A | * | 1/1969 | Ericson ........................ 602/13 |
| 3,887,213 | A | | 6/1975 | Goetz |
| 3,929,350 | A | | 12/1975 | Pech |
| 5,405,166 | A | * | 4/1995 | Rogerson ..................... 280/739 |
| 5,427,410 | A | * | 6/1995 | Shiota et al. ............. 280/743.1 |
| 5,513,876 | A | * | 5/1996 | Matsumoto .............. 280/728.1 |
| 5,573,270 | A | * | 11/1996 | Sogi et al. ................... 280/740 |
| 5,839,139 | A | * | 11/1998 | Fink ............................... 5/648 |
| 6,095,557 | A | | 8/2000 | Takimoto et al. |
| 6,572,144 | B2 | * | 6/2003 | Igawa ....................... 280/743.1 |

(Continued)

FOREIGN PATENT DOCUMENTS

EP     1 236 622 A2     9/2002

(Continued)

OTHER PUBLICATIONS

Partial European search report dated Sep. 14, 2005.

(Continued)

*Primary Examiner*—Eric Culbreth
*Assistant Examiner*—Joseph Rocca
(74) *Attorney, Agent, or Firm*—Posz Law Group, PLC

(57) ABSTRACT

An air bag apparatus having a constitution of developing an air bag folded to contain in a case to a rear side of a vehicle by making an expanding gas flow from a gas flow inlet in expanding to develop the air bag. The air bag is arranged with a through hole. The air bag is constituted by a ring-like member arranged with a lower expanded portion arranged with a gas flow inlet, an upper expanded portion arranged to an upper side of the lower expanded portion to communicate with a front side of the lower expanded portion, and a rear expanded portion arranged to connect to a rear part of the lower expanded portion and a rear part of the upper expanded portion at a surrounding of the through hole. The air bag is constituted to finish to expand by closing the through hole.

4 Claims, 46 Drawing Sheets

U.S. PATENT DOCUMENTS

| | | | |
|---|---|---|---|
| 7,025,376 B2 * | 4/2006 | Dominissini | 280/729 |
| 7,052,042 B2 * | 5/2006 | Sato et al. | 280/743.1 |
| 7,152,877 B2 * | 12/2006 | Hasebe et al. | 280/743.1 |
| 2001/0003395 A1 | 6/2001 | Ariyoshi | |
| 2002/0067033 A1 * | 6/2002 | Sato et al. | 280/743.1 |
| 2002/0089158 A1 * | 7/2002 | Fischer et al. | 280/740 |
| 2003/0094794 A1 | 5/2003 | Aramori | |
| 2003/0218325 A1 * | 11/2003 | Hasebe et al. | 280/743.2 |

FOREIGN PATENT DOCUMENTS

| | | |
|---|---|---|
| EP | 1 279 573 A2 | 1/2003 |
| JP | 06-344844 | 12/1994 |
| JP | A-06-344844 | 12/1994 |
| JP | A-10-226294 | 8/1998 |
| JP | A-11-170955 | 6/1999 |
| JP | A-11-227553 | 8/1999 |
| JP | A-2001-163144 | 6/2001 |
| JP | A-2001-270414 | 10/2001 |
| JP | A-2002-166805 | 6/2002 |
| JP | A-2002-255004 | 9/2002 |
| JP | A-2002-264753 | 9/2002 |
| JP | A-2003-160016 | 6/2003 |
| JP | A-2003-170795 | 6/2003 |

OTHER PUBLICATIONS

Office Action dated Nov. 6, 2007 in corresponding Japanese Patent Application No. 2003-196831 (and English translation).

Office Action dated Nov. 27, 2007 in corresponding Japanese Patent Application No. 2003-323117 (and English translation).

Office Action dated Nov. 27, 2007 in corresponding Japanese Patent Application No. 2003-323128 (and English translation).

Office Action dated Nov. 27, 2007 in corresponding Japanese Patent Application No. 2003-323108 (and English translation).

* cited by examiner

DIRECTION OF MOVEMENT OF VEHICLE ←

FIG. 30
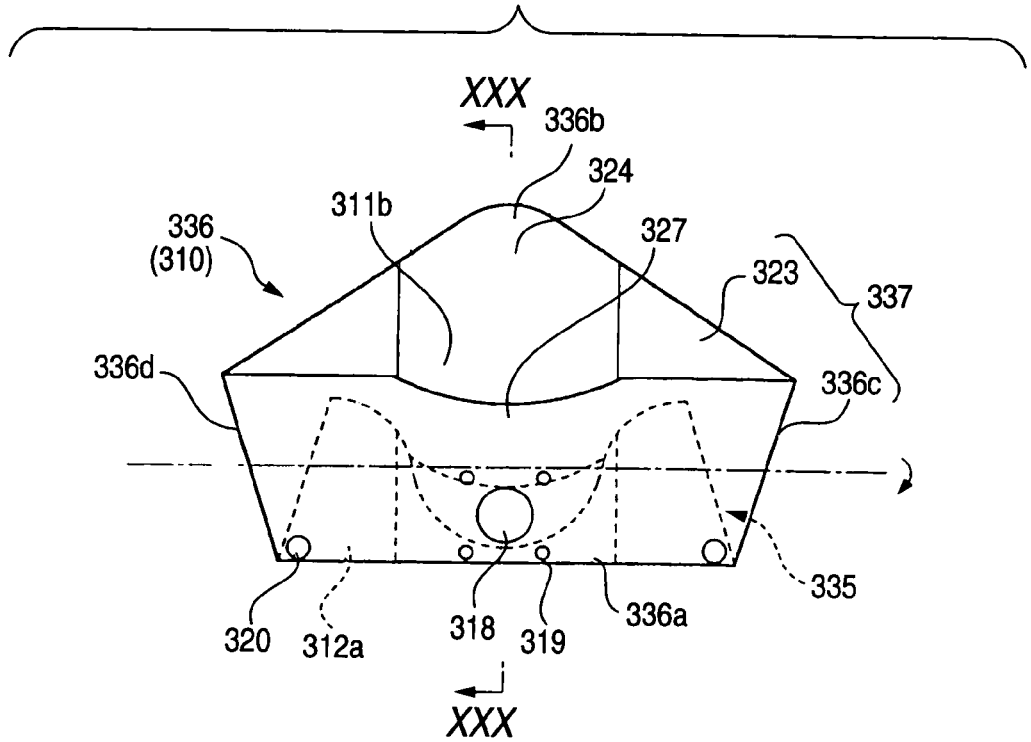
END SECTIONAL VIEW TAKEN ON LINE XXX-XXX
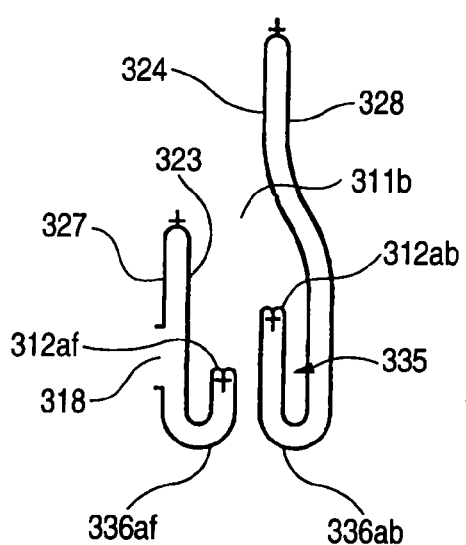
SCHEMATIC CROSS-SECTIONAL VIEW TAKEN ON LINE XXX-XXX
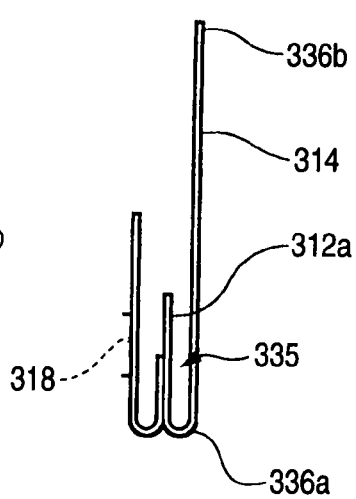

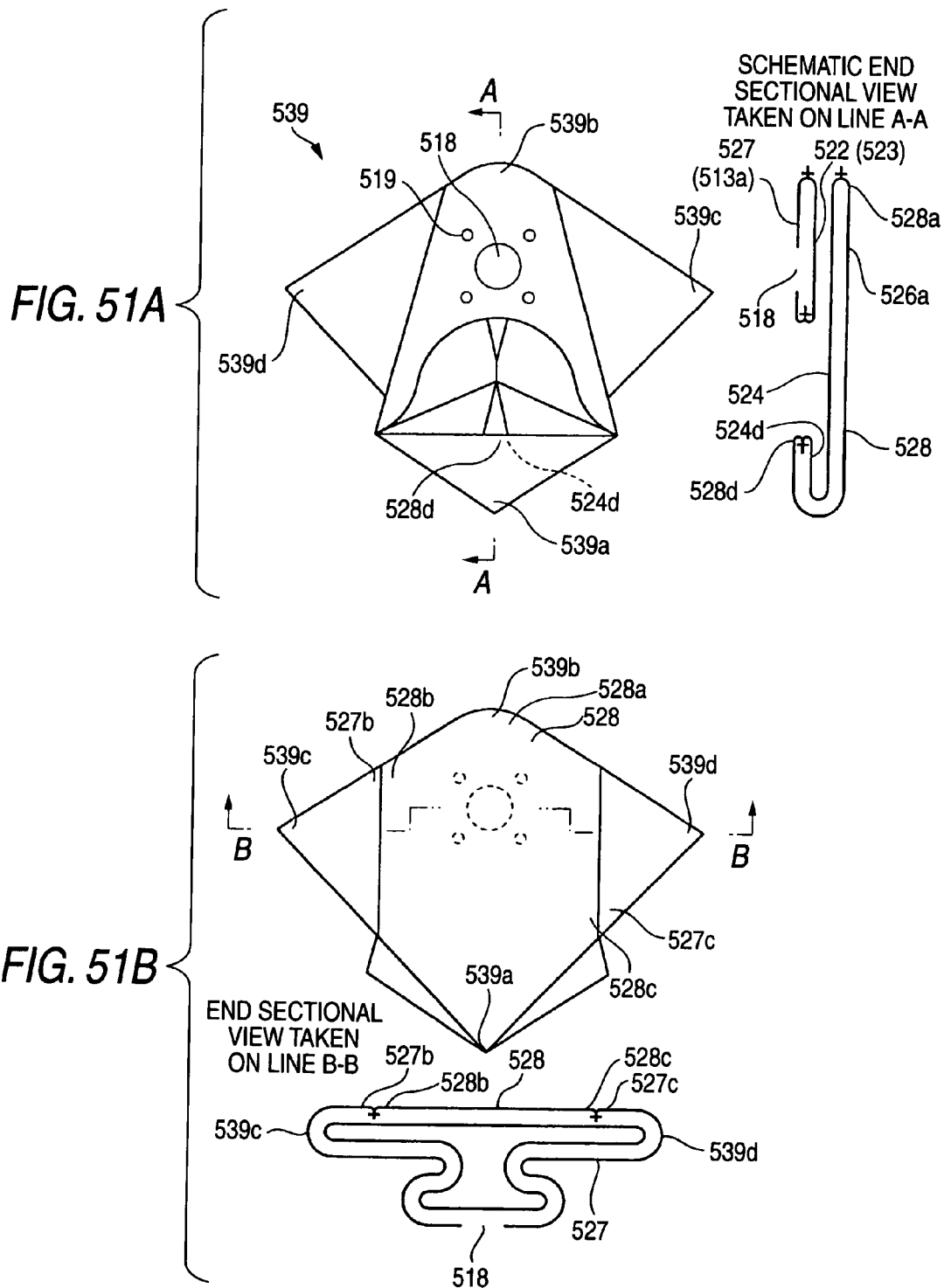

AIR BAG APPARATUS

This application is based on Japanese Patent Applications No. 2003-196831, 2003-323108, 2003-323117, 2003-323122 and 2003-323128, which are incorporated herein by reference.

BACKGROUND OF THE INVENTION

1. Field of the Invention

The present invention relates to an air bag apparatus installed at an instrument panel and constituted to develop an air bag folded to contain at inside of the case.

2. Description of the Related Art

In a related art, according to an air bag apparatus having the above-described constitution, an air bag is provided with a through hole penetrated in a left and right direction (refer to, for example, JP-A-6-344844).

However, the air bag apparatus of the related art is constituted such that the through hole provided at the air bag is not closed even in finishing to expand the air bag. That is, according to the air bag of the related art, a dispersion is brought about in a function of constraining the passenger at a portion thereof on a side of the passenger in a state of finishing to expand the air bag since the through hole penetrated in the left and right direction is provided at a vicinity of a center thereof. For example, according to the air bag apparatus of the related art, when the head portion of the passenger interferes with a portion of the air bag which has been finished to expand constituting a vicinity of a center axis of the through hole, the air bag is considerably recessed to deform to a side of the through hole to narrow an inner diameter of the through hole. Further, when the head portion of the passenger interferes with a portion thereof remote from the center axis of the through hole, an amount of recessing the air bag is small. Therefore, according to the air bag apparatus of the related art, the function of constraining the passenger is dispersed by a physical constitution and an attitude of the passenger and there is a concern of being unable to stably protect the passenger.

Incidentally, an air bag apparatus for protecting a passenger is included at inside of an instrument panel arranged in front of a passenger seat of a vehicle. An air bag is folded to contain in a case constituting the air bag apparatus and an inflator is operated in impacting the vehicle. Further, by introducing a generated gas at high pressure into the air bag, the air bag is rapidly expanded to develop to the passenger to thereby constrain movement of the passenger by an inertia force.

There is proposed the above-described air bag apparatus disclosed in JP-A-11-170955. According to the air bag apparatus, an initial developing speed of the air bag to the rear side is reduced by providing an inner bag in the air bag.

According to the air bag apparatus disclosed in JP-A-11-170955, a portion of the air bag needs to press to an instrument panel or a windshield by the inner bag and a position of mounting the air bag apparatus to the vehicle is limited.

Incidentally, according to an air bag apparatus of a related art, an air bag in a bag-like shape is constituted substantially by a shape of a cone including a passenger side wall portion arranged substantially along a vertical direction on a side of the passenger and a peripheral wall portion narrowed substantially in a shape of a cone from an outer peripheral edge of the passenger side wall portion to a front side of a vehicle as a shape in finishing to expand to develop the air bag (refer to, for example, JP-A-2002-255004). The air bag is constituted to arrange a gas flow inlet as an opening face substantially along a horizontal direction at a front side of a lower side of the peripheral wall portion in finishing to expand to develop the air bag and a peripheral edge of the gas flow inlet is attached to a case.

The air bag is contained in the case by transversely folding the air bag for making a crease in a left and right direction and vertically folding the air bag for making a crease in a front and rear direction after previously folding the air bag, and a previously folding shape thereof after finishing to previously folding the air bag is constituted by a shape of arranging a portion of a vicinity of an upper edge of the passenger side wall portion at a position opposed to the gas flow inlet and overlapping the passenger side wall portion on the lower side of the peripheral portion to flatten.

According to the air bag apparatus, in expanding to develop the air bag, the air bag is expanded to develop to a rear side of a vehicle by making an expanding gas flow from the gas flowing inlet to project to push to open doors arranged at an instrument panel while resolving the creases constituted by transversely folding and vertically folding the air bag, at that occasion, since the portion proximate to the upper edge of the passenger side wall portion is arranged at the position opposed to the gas flow inlet, a portion proximate to the upper edge of the passenger side wall portion opposed to the gas flow inlet is strongly pushed up to an upper side by a pressing force of the expanding gas at an initial stage of making the expanding gas flow more precedingly than other portion of a portion on a side of a lower edge of the passenger side wall portion or the like and therefore, the passenger side wall portion is easy to arrange to be along substantially in the vertical direction Further, when the portion at the vicinity of the upper edge of the passenger side wall portion is strongly pushed up, the portion can contribute also to swiftly resolving the creases constituted by transversely folding and vertically folding the air bag and therefore, the passenger side wall portion can widely be developed, in expanding to develop the air bag, the passenger side wall portion which is brought into a state of being substantially orthogonal to the peripheral edge of the gas flow inlet can be arranged to be swiftly along substantially the vertical direction and the air bag can be developed in a widely opened state such that the pressing force is not partially operated to a side of the passenger.

However, although according to the air bag apparatus of the related art, in expanding to develop the air bag, the passenger side wall portion can be moved to the rear side of the vehicle in the state of constituting the wide face arranged substantially in the vertical direction, in the case in which an obstacle having a height up to a vicinity of a height of the instrument panel is arranged at a vicinity of the instrument panel, there is a room for improvement in finishing to expand the air bag while restraining interference with the obstacle.

Incidentally, according to an air bag apparatus of a related art, in expanding to develop an air bag folded to contain in a case, an expanding gas is made to flow thereinto from a gas flow inlet, push to open doors arranged at an instrument panel and expanded to develop to a rear side of a vehicle. Further, according to the air bag apparatus of the related art, the air bag is folded to contain to project to a side of a passenger in a state of widely opening a face constituting the side of a passenger and in a state of restraining a moving speed thereof such that the pressing force is not operated partially to the side of the passenger in expanding to develop the air bag (refer to, for example, JP-A-2002-255004).

Further, according to the air bag apparatus of the related art, a vicinity of an upper end of the face arranged substantially orthogonally to the gas flow inlet to constitute the side of the passenger in finishing to expand the air bag is arranged to be opposed to a gas flow inlet in the contained state. Therefore, in expanding to develop the air bag, the face on the side of the passenger is developed to be along substantially in a vertical direction. However, according to the air bag apparatus of the related art, there is a room for improvement in reducing a speed of moving the face constituting the side of the passenger.

Incidentally, in a related art, there is known an air bag apparatus arranged with a supporting member for supporting an expanded portion of an air bag for protecting a passenger on a front side (refer to, for example, JP-A-11-227553).

According to the air bag, an expanded portion of a region of protecting the head portion of the passenger is supported by the supporting member comprising an air bag arranged on a front side thereof (refer to FIG. 1 of JP-A-11-227553).

However, according to the air bag apparatus of the related art, the expanded portion for protecting the head portion of the passenger is supported by the supporting member, an expanded portion for protecting the chest and the belly portion of the passenger is not supported by the supporting member, depending on elastic performance of the supporting member, by presence or absence of the supporting member, the chest and belly portion of the passenger is constrained by the protecting expanded portion with excellent positioning performance, however, there is a concern that the head portion of the passenger is not constrained by the protecting expanding portion of the head portion.

SUMMARY OF THE INVENTION

An object of the invention is to provide an air bag apparatus capable of stably protecting a passenger by an air bag which has finished to expand even when a physical constitution and an attitude of the passenger differs.

Another object of the invention is to provide an air bag apparatus having a high degree of freedom of mounting to a vehicle and capable of reducing an initial developing speed of an air bag.

Further, another object of the invention is to provide an air bag apparatus in which an air bag expanding to develop can constrain a passenger at a vicinity of a proper position by a wide face and even when an obstacle having a height up to a vicinity of an upper face of an instrument panel is arranged at a vicinity of the instrument panel, the air bag can restrain interference with the obstacle.

Further, another object of the invention is to provide an air bag apparatus capable of precisely protecting a passenger by making a face constituting a side of the passenger substantially by a planar shape along substantially a vertical direction and widely developed in an up and down direction and a left and right direction and movable to a rear side of a vehicle in a state of further restraining a moving speed thereof in expanding to develop an air bag.

Further, another object of the invention is to provide an air bag apparatus capable of constraining the head portion of a passenger with excellent positioning performance in comparison with the chest and belly portion of the passenger.

According to the first aspect of the invention, an air bag apparatus comprises an air bag folded to inside of a case, wherein a through hole opens in a procedure of developing the air bag and the through hole is substantially closed in a state of finishing to expand the air bag.

According to the second aspect of the invention, an air bag is characterized in an air bag apparatus arranged on a front side of a seated passenger and constituted such that an air bag folded to contain in a case is developed to a rear side of a vehicle by making an expanding gas flow from a gas flow inlet in expanding to develop the air bag, further comprises a plurality of expanded portions expanding when the air bag apparatus is operated, wherein the expanded portions include a lower expanded portion arranged with a gas flow inlet, the lower expanded portion being attached to the case at a peripheral edge thereof, an upper expanded portion arranged on an upper side of the lower expanded portion so as to communicate with the lower expanded portion at a front part thereof, and a rear expanded portion connecting to a rear part of the lower expanded portion and a rear part of the upper expanded portion, so that the through hole penetrated substantially in a left and right direction of the air bag apparatus.

According to the air bag apparatus of the invention, the air bag is constituted to arrange the through hole penetrated substantially in the left and right direction and the through hole is closed in finishing to expand the air bag. Therefore, a vicinity of a center axis of the through hole of the air bag is prevented from being recessed more than a surrounding thereof and an amount of recessing the air bag when the passenger interferes therewith can be made to be substantially constant at a face on a side of the passenger. As a result, even when the passenger interferes with any portion of the face on the side of the passenger of the air bag which has finished to expand, the passenger can stably be protected.

Therefore, according to the air bag apparatus of the invention, the passenger can stably be protected by the air bag which has finished to expand even when a physical constitution and an attitude of the passenger differ.

Further, according to the air bag apparatus of the invention, the air bag is constituted by a ring-like member having the through hole penetrated in the left and right direction and therefore, at an initial stage of expanding to develop the air bag, the expanding gas flowing from the gas flow inlet does not flow directly to the side of the passenger but flows to widen in an up and down direction along a shape of the air bag. Therefore, the air bag is moved to a rear side while being expanded to widen considerably in the up and down direction in a state of being restrained from considerably projecting partially to the rear side. As a result, a moving speed of the face constituting the side of the passenger to the side of the passenger can be restrained without partially exerting the pressing force to the side of the passenger and the passenger moving forward can precisely be protected.

Further, the air bag apparatus having the above-described constitution is preferably constituted such that the air bag is arranged with rectifying unit for rectifying the expanding gas flowing from the gas flow inlet to direct to both sides of an upper side and a lower side at an inner portion thereof.

When the air bag apparatus is constituted as described above, the expanding gas flowing from the gas flow inlet flows into the air bag to direct to the both sides of the upper side and the lower side by the rectifying unit. Therefore, the air bag can be developed to further considerably be widened in the up and down direction in the state of being restrained from being considerably projected to the rear side.

Furthermore, the air bag apparatus having the above-described constitution is preferably constituted such that the expanding gas flowing from the gas flow inlet flows more to the lower side than the upper side.

When the air bag apparatus is constituted as described above, in expanding to develop the air bag, the portion of the lower expanded portion of the air bag can be developed more swiftly than a portion of the upper expanded portion and therefore, in expanding to develop the air bag, even when the belly portion of the passenger is proximate to the air bag, the air bag can swiftly be developed between a member on a side of a body and the passenger and the passenger can precisely be protected.

According to the third aspect of the invention, the air bag apparatus constitutes an air bag apparatus installed at an instrument panel for protecting a passenger by operating an inflator by a signal from an acceleration sensor in impacting a vehicle and expanding to develop an air bag on a rear side from a windshield over to the instrument panel by a generated gas, further comprises a plurality of expanded portions expanding when the air bag apparatus is operated, wherein the expanded portions include an inner peripheral side sheet disposed on an inner peripheral side face of the through hole, and an outer peripheral side sheet disposed on an outer peripheral face side of the air bag to be opposed to the inner peripheral side sheet in finishing to expand the air bag, so that the through hole penetrated in an up and down direction of the air bag apparatus.

Accordingly, the gas introduced from the inflator to the air bag is introduced to a portion of the expanded portion in the cylindrical shape. Further, the air bag is successively expanded from the portion in a peripheral direction, that is, in a vehicle left and right direction of the expanded portion in the cylindrical shape. At this occasion, since the through hole is provided on an inner side of the air bag, the air bag can considerably be widened in the left and right direction and as a result, a developing speed to a lower side is reduced. Further, after finishing to expand the air bag, the through hole is closed and therefore, a passenger can effectively be constrained. Further, since a vehicle member of the instrument panel or the like is not related to a reduction in the developing speed, a degree of freedom of mounting to the vehicle is promoted.

An inner portion of the expanded portion in the cylindrical shape is provided with a deflection portion disposed at a vicinity of a gas injecting port of the inflator for deflecting the injected gas in a left and right direction of the air bag apparatus.

Accordingly, the gas injected from the gas injecting port of the inflator is deflected in the left and right direction by the gas deflecting means and the air bag is further widened considerably in the left and right direction. Therefore, the developing speed is further reduced.

An upper portion of the expanded portion in the cylindrical shape is provided with an upper portion width restricting member for restricting an amount of expanding the expanded portion in a vehicle width direction.

Accordingly, the upper portion width of the expanded portion in the cylindrical shape in finishing to expand the air bag is restrained by the upper portion width restricting member and therefore, the passenger is further firmly constrained.

A lower portion width restricting member for restricting the amount of expanding the expanding portion in the vehicle width direction is provided at a rear expanded portion of the air bag.

Accordingly, the lower portion width of the expanded portion in the cylindrical shape in finishing to expand the air bag is restrained by the lower portion width restricting member and therefore, the passenger is further firmly constrained.

A tension of the inner sheet forming the through hole is set to be smaller than a tension of the outer sheet.

The tension of the inner sheet is weakened and therefore, the inner side sheets opposed to each other are brought into contact with each other by a large area and in constraining the passenger, a shape of expanding the air bag is prevented from being deformed considerably by sliding the inner sheets from each other and therefore, a performance of constraining the passenger can further be ensured.

The through hole is located on a rear side of an instrument panel.

According to the fourth aspect of the invention, an air bag is constituted such that a front side of the outer peripheral side sheet is arranged with a gas flow inlet a peripheral edge of which is attached to the case and which is opened for making the expanding gas flow thereinto, and in expanding the air bag, an lower opening of the through hole is displaced downward to a lower side before finishing the expansion of the air bag.

According to the air bag apparatus of the invention, in expanding the air bag, the opening of the lower side of the through hole is brought into the widened state, the lower peripheral edge of the through hole is moved from the upper side to the lower side to finish expanding the air bag apparatus and therefore, even when there is an obstacle having a height up to a vicinity of an upper face of the instrument panel at a vicinity of the instrument panel, the air bag can insert the obstacle into the through hole on the lower side. That is, the air bag can be finished to expand while restraining interference with the obstacle in strongly pushing down to the obstacle or pushing the obstacle to the rear side of the vehicle.

Further, even when there is not the obstacle, the air bag is constituted by the ring-like shape when the expanding gas is made to flow thereinto from the gas flow inlet and therefore, the expanding gas is made to flow to both left and right sided between the outer peripheral sheet and the inner peripheral side sheet and therefore, a passenger side wall portion of the outer peripheral side sheet is widened widely in the left and right direction to move to the rear side of the vehicle and therefore, even when a passenger seated by arranging the back to a vicinity of a back rest portion of a seat, that is, the passenger seated at a vicinity of a proper position is moved forward, the passenger can precisely be constrained by portions on the side of the passenger widths of which are widened in the left and right direction without partially operating a pressing force.

Therefore, according to the air bag apparatus of the invention, the air bag expanded to develop can constrain the passenger at the vicinity of the proper position of a wide face and even when the obstacle at the height up to the vicinity of the upper face of the instrument panel is arranged at the vicinity of the instrument panel, interference with the obstacle can be restrained by inserting the obstacle into the central hole.

In this case, the air bag is previously folded in a state in which the air bag is not expanded such that the lower peripheral edge of the through hole is folded back to the upper side, the gas flow inlet is brought into a state of being disposed on a side of a lower face thereof, and the outer peripheral side sheet is arranged on the upper side of the gas flow inlet by interposing the inner peripheral side sheet to develop flatly substantially symmetrically in a left and right direction of the air bag apparatus, and the air bag is folded by laterally folding the air bag to narrow a width dimension in a front and rear direction centering on the gas flow inlet by making a crease in the left and right direction and vertically folding the air bag to narrow a width dimension in the left and right direction by making a crease in a front an rear direction to constitute a dimension capable of being contained in the case.

When the air bag is folded in this way, the air bag in expanding the air bag can open the through hole in the state in which the expanding gas does not flow to the lower peripheral edge of the through hole and therefore, in comparison with the case in which the lower opening of the through hole is expanded without folding back the lower peripheral edge of the through hole, the air bag can be opened by a wide inner diameter dimension, the obstacle can further be facilitated to insert into the through hole, the air bag can finish to expand by further restraining the interference with the obstacle in pushing down the obstacle or pushing the obstacle to the rear side of the vehicle. Further, the air bag folded in this way is facilitated to provide a mode of finishing to expand by moving the lower peripheral edge of the through hole from the upper side to the lower side since a portion thereof upward from the folded-back portion is bulged and thereafter, the folded-back portion of the lower side is expanded.

Further, the mode of finishing to expand by moving the lower peripheral edge of the through hole from the upper side to the lower side in expanding the air bag can be constituted by providing rectifying unit for controlling flow of the expanding gas such that the expanding gas is made to flow more to the upper side, or by folding means such that an upper edge side of the passenger side wall portion is previously folded to be opposed to the gas flow inlet and in expanding the air bag, the upper edge side of the passenger side wall portion is swiftly disposed on the upper side to finish to expand other than providing the above-described folded-back portion.

According to the fifth aspect of the invention, an air bag is constituted such that a front side of the outer peripheral side sheet is arranged with a gas flow inlet a peripheral edge of which is attached to the case and which is opened for making the expanding gas flow thereinto, and a guide moving means of a passenger side face of the outer sheet on which a passenger is protected is constituted by substantially a planar shape along substantially in a vertical direction and widely developed in an up and down direction of the air bag apparatus and a left and right direction of the air bag apparatus and is made movable to a rear side of the vehicle in expanding the air bag.

According to the air bag apparatus of the invention, the air bag is constituted as the ring-like member arranged with the through hole penetrated substantially in the up and down direction. That is, in expanding to develop the air bag, the expanding gas flowing from the gas flow inlet does not flow directly to the face constituting the side of the passenger but flows to widen in the left and right direction along the shape of the air bag. Therefore, the air bag is expanded to considerably widen in the left and right direction in a state of being restrained from considerably projecting to the rear side. As a result, a moving speed to the rear side of the face constituting the side of the passenger in expanding to develop the air bag can be restrained.

Further, according to the air bag apparatus of the invention, the air bag is constituted by providing the guide moving means of the passenger side face such that in expanding to develop the air bag, the passenger side face is constituted substantially by the planar shape along substantially the vertical direction and widely developed in the up and down direction and in the left and right direction to be movable to the rear side of the passenger. That is, according to the air bag apparatus of the invention, the air bag is expanded to considerably widen not only in the left and right direction but also in the up and down direction at an initial stage of expanding to develop the air bag. As a result, the air bag is expanded to develop in the state of widely developing the passenger side face in the up and down direction and in the left and right direction to move the passenger side face to the rear side of the vehicle and even when the passenger side face interferes with the passenger moving forward, the passenger can precisely be protected without operating a pressing force partially to the side of the passenger.

Therefore, according to the air bag apparatus of the invention, in expanding to develop the air bag, the face constituting the side of the passenger is constituted substantially by the planar shape along substantially the vertical direction and widely developed in the up and down direction and in the left and right direction to be movable to the rear side of the vehicle in the state of further restraining the moving speed and the passenger can precisely be protected.

Further, although according to the air bag apparatus of the invention, the air bag is constituted to include the through hole penetrated substantially in the up and down direction, the through hole is closed in finishing to expand the air bag. Therefore, a predetermined inner pressure can be ensured and the passenger can stably be protected by the air bag which has finished to expand.

There may be constructed a constitution in which the guide moving means is constituted by folding the air bag, the air bag is folded by previously folding the air bag and vertically folding and laterally folding the air bag after previously folding the air bag, the air bag after having been previously folded is arranged with the gas flow inlet to a lower face side in a state in which the air bag is not expanded, the inner peripheral side sheet is interposed above the gas flow inlet, a vicinity of a rear upper portion of the outer peripheral side sheet is arranged thereabove to be constituted by a shape of flatly developing substantially symmetrically in the left and right direction, and a position constituting a vicinity of an upper end of the passenger side face of the outer peripheral side sheet is arranged at a position opposed to the gas flow inlet.

When the air bag apparatus is constructed by the above-described constitution, at an initial stage of expanding the air bag, a portion at a vicinity of an upper end of the passenger side face of the outer peripheral side sheet is precedingly pushed up to the upper side via the inner peripheral side sheet by the pressing force of the expanding gas flowing from the gas flow inlet. Further, by pushing up the portion at the vicinity of the upper end of the passenger side plate, creases in laterally folding and vertically folding the air bag are swiftly resolved and the air bag is developed along the up and down direction and the left and right direction.

Further, there maybe constructed a constitution in which the guide moving means is constituted by rectifying unit arranged in the air bag and capable of rectifying the expanding gas flowing from the gas flow inlet, and the rectifying unit is arranged at a portion rearward from a front position of the air bag constituting a portion of a side of the gas flow inlet and constituted to be able to rectify the expanding gas to direct in the up and down direction.

When the air bag apparatus is constructed by the above-described constitution, the expanding gas flowing from the gas flow inlet temporarily flows along the left and right direction along the shape of the air bag and thereafter flows to direct in the up and down direction by the rectifying unit arranged at the portion rearward from the rear potion. Therefore, the expanded portion of the air bag is widely developed in the up and down direction and in the left and right direction and the face constituting the passenger side can further widely be developed in the up and down direction and in the left and right direction.

According to the sixth aspect of the invention, an air bag apparatus is characterized in an air bag apparatus folded to contain in a case arranged at an instrument panel in front of a passenger seat and capable of being projected from the case to a rear side of a vehicle on a side of the passenger when an expanding gas flows thereinto, wherein the air bag is constituted to arrange an upper expanded portion capable of protecting a head of the passenger on a rear side of the passenger in finishing to expand the air bag and arranging a lower expanded portion capable of protecting a chest and belly of the passenger, and the lower expanded portion in finishing to expand the air bag is arranged by restraining a moving amount thereof more than a moving amount of moving a rear face of the upper expanded portion to a front side of the vehicle in finishing to expand the air bag in interfering with the passenger by being supported by a supporting member arranged on a front side of the vehicle.

In the air bag according to the invention, the air bag in finishing to expand the air bag is constituted such that the lower expanded portion for protecting the chest and belly portion of the passenger is supported by the supporting member, the moving amount is restrained more than that in moving the rear face of the upper expanded portion to the front side of the vehicle in interfering with the passenger, conversely, the moving amount of the rear face to the front side of the vehicle in interfering with the passenger is made to be larger than that of the lower expanded portion and therefore, the upper expanded portion can softly constrain the head portion of the passenger.

Naturally, when the rear face of the lower expanded portion is constituted by an area wider than that of the upper expanded portion such that the chest and belly portion of the passenger having the area larger than that of the head portion can be protected, even when the moving amount to the front side is small, a total of the chest and belly portion of the passenger can precisely be protected.

Therefore, in the air bag apparatus according to the invention, the air bag expanded to develop can constrain the head portion of the passenger with more excellent cushioning performance than the chest and belly portion of the passenger.

Further, it is preferable that the supporting member is constituted by a supporting bag bulged by making the expanding gas flow thereinto.

According to the constitution, the supporting bag as the supporting member can support the lower expanded portion when the expanding gas is made to flow thereinto, the expanded gas may be supplied to the supporting bag along with the expanding gas flowing to the upper and the lower expanded portion and arrangement of the supporting member is more facilitated than in the case of using a member which is not expanded of a supporting rod or the like for the supporting member.

Further, when the supporting bag in this case is arranged to communicate with the lower expanded portion, the expanding gas flowing to the upper and lower expanded portions can commonly be used and therefore, the inflator for supplying the gas can commonly be used and therefore, an increase in a number of parts of the air bag apparatus can be prevented.

Further, it is preferable that the air bag in this case is constituted as a ring-like member arranged with a through hole penetrated substantially in an up and down direction in finishing to expand the air bag and including a front expanded portion, a left expanded portion, a rear expanded portion and a right expanded portion such that the air bag finishes to expand by closing the through hole by a bulging base cloth at a surrounding thereof, wherein the front expanded portion is constituted by arranging a gas flow inlet a peripheral edge of which is attached to the case and which makes the expanding gas flow thereinto, the rear expanded portion is constituted by arranging the upper expanded portion on an upper side thereof and arranging the lower expanded portion on a lower side thereof, and the supporting bag is constituted by the front expanded portion, the left expanded portion and the right expanded portion.

According to the air bag, the air bag including the upper and the lower expanded portions of the supporting bag can be formed by simply forming the air bag in the ring-like shape and therefore, fabrication thereof is facilitated.

BRIEF DESCRIPTION OF DRAWINGS

FIG. 30 illustrates views showing a previously folded air bag of the fourth embodiment of the invention;

FIGS. 51A and 51B illustrate views of a state of previously folding the air bag of the embodiment viewed from a side of a gas flow inlet and from a passenger side;

DETAILED DESCRIPTION OF PREFERRED EMBODIMENTS

Embodiments of the invention will be explained in reference to the drawings as follows.

First Embodiment

Figure 1:
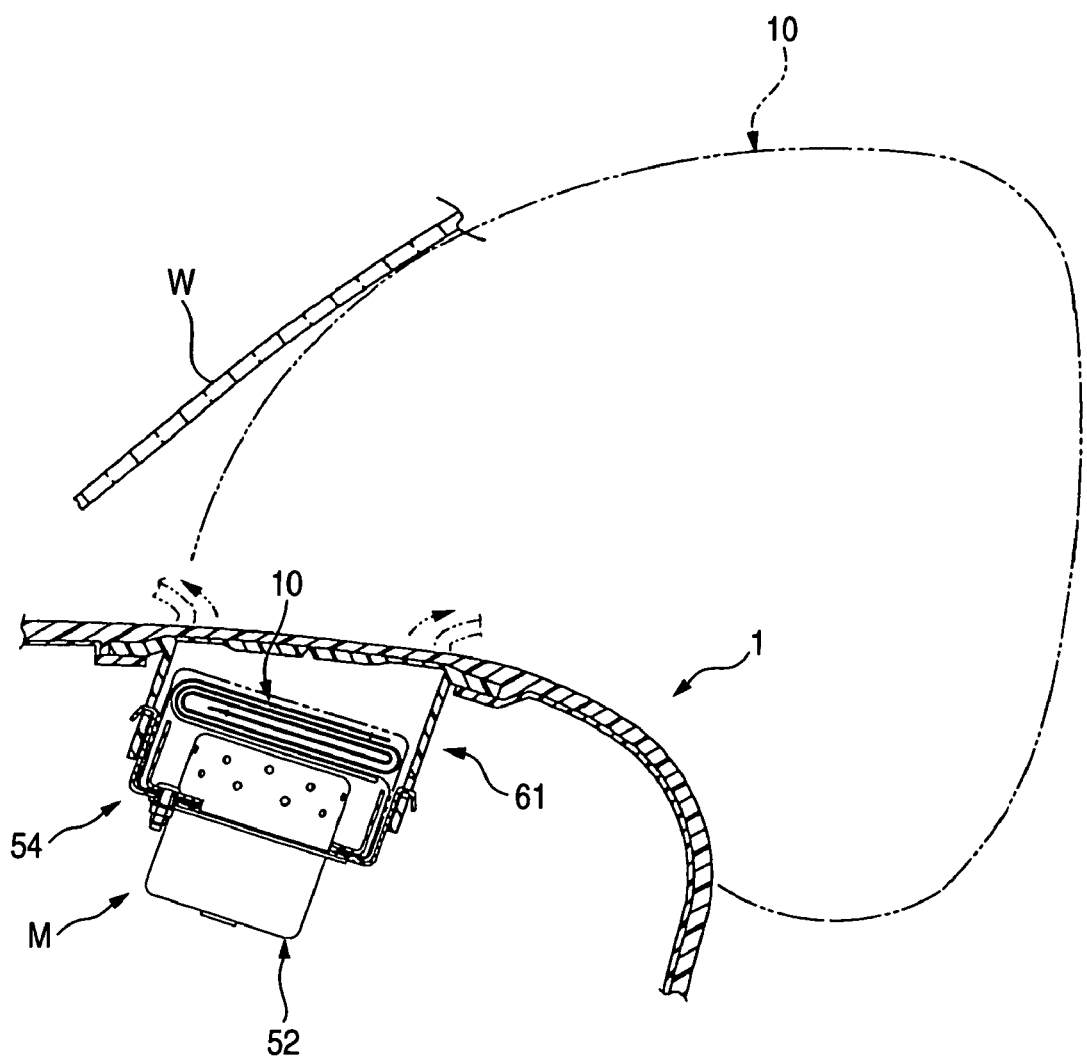
FIG. 1 is a sectional view of an air bag apparatus in a front and rear direction of a vehicle in a first embodiment of the invention.
Figure 2:
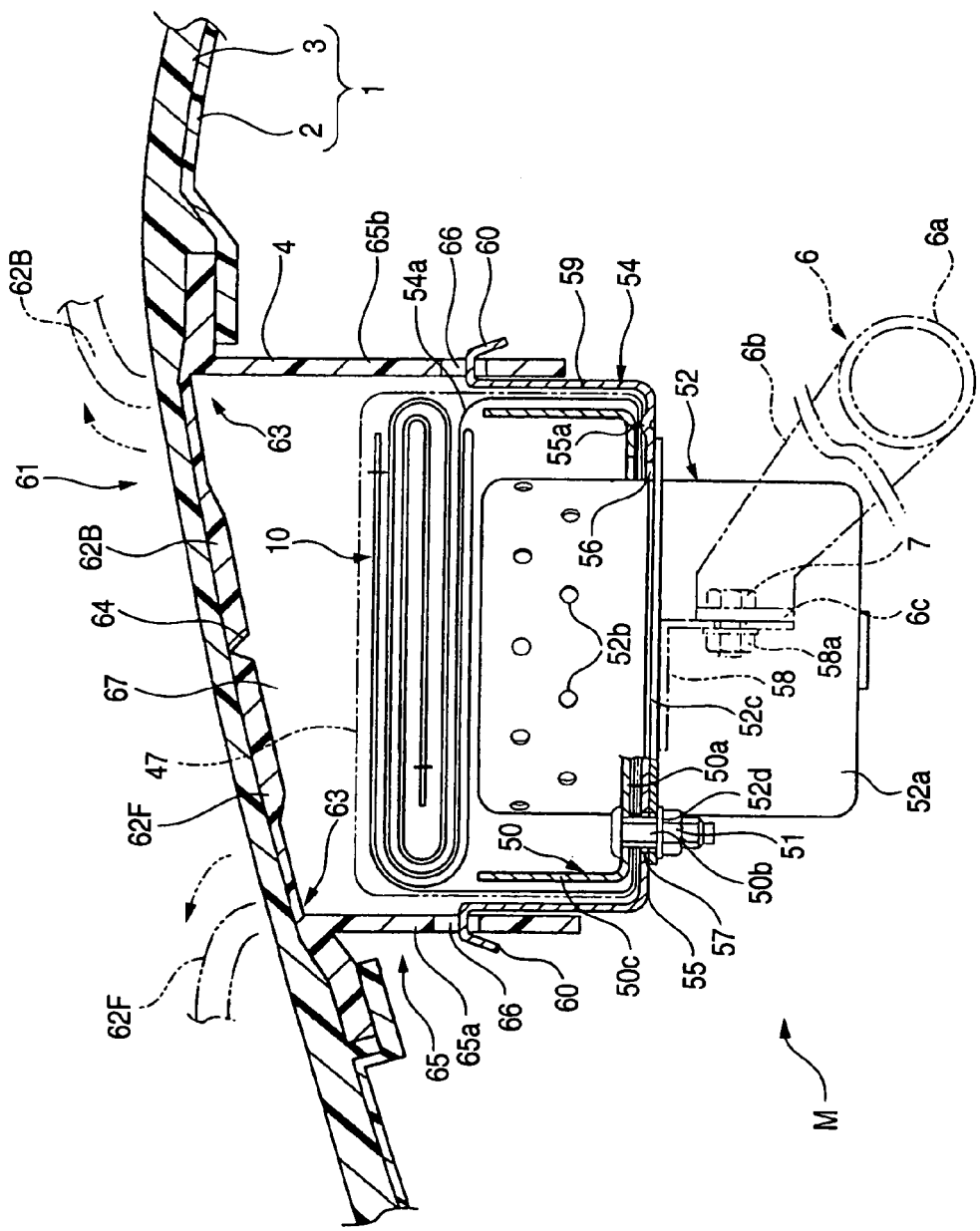
FIG. 2 is a sectional view enlarging an outline of the air bag apparatus of the first embodiment in the front and rear direction of the vehicle.
Figure 3:
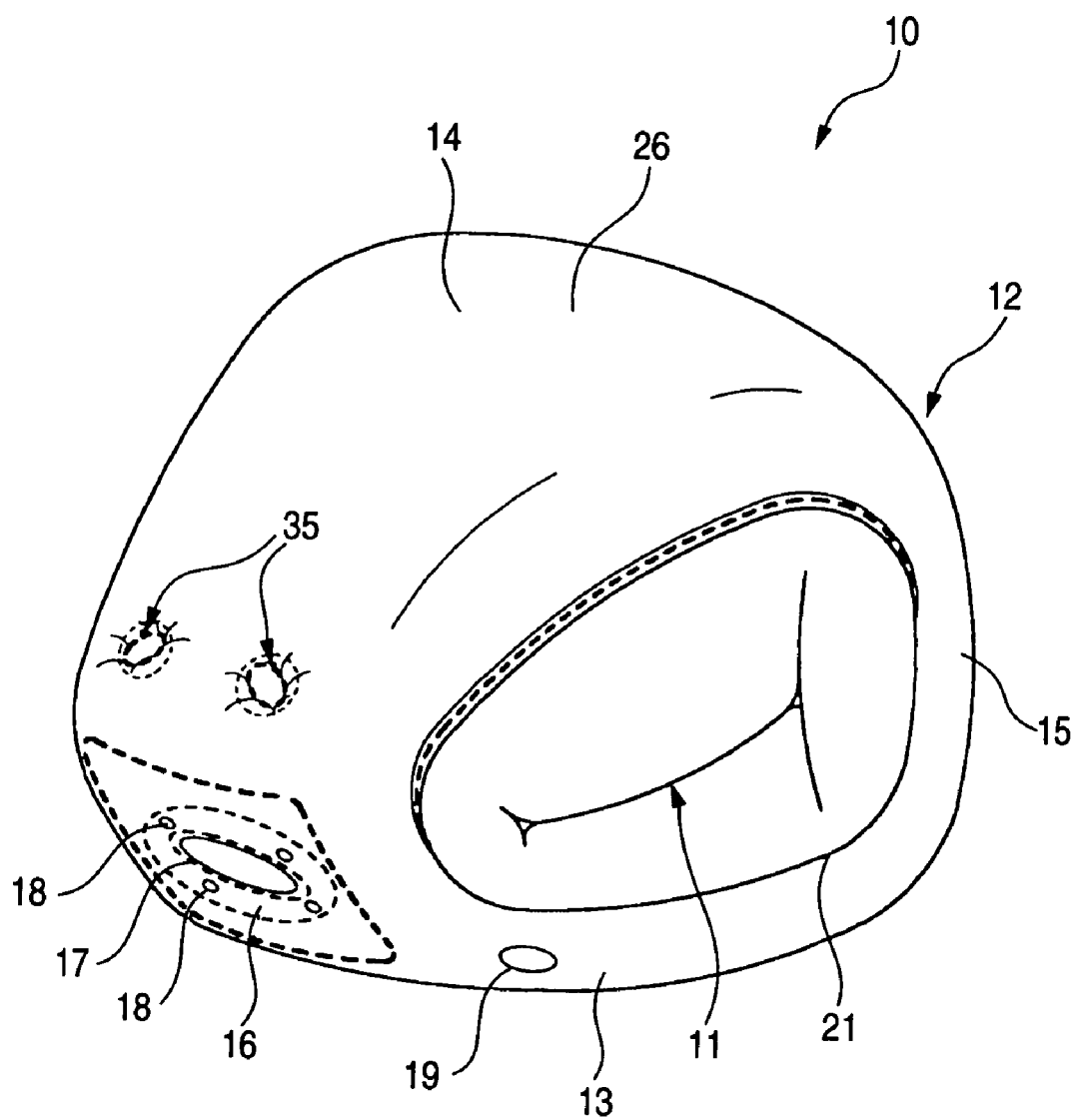
FIG. 3 is a perspective view of a state of expanding a single member of an air bag used in the first embodiment.

First, an explanation will be given of an air bag apparatus M for a passenger seat constituting a first embodiment of the invention. As shown by FIGS. 1 and 2, an air bag apparatus 1 is of a top mount type arranged at an inner portion on a side of an upper face of a surface of an instrument panel (inpane) 1. The air bag apparatus M is constituted by including a folded air bag 10, an inflator 52 for supplying an expanding gas to the air bag 10, a case 54 for containing to hold the air bag 10 and the inflator 52, a retainer 50 for attaching the air bag 10 to the case 54, and an air bag cover 61 for covering the folded air bag 10.

As shown by FIGS. 1 and 2, an air bag cover 61 is integrally formed with the instrument panel 1 in the case of the embodiment. The instrument panel 1 is constituted by including a base portion 2 on a rear face side comprising a hard synthetic resin of polypropylene or the like, and a cover layer 3 having a foamed layer of foamed polyurethane or the like covering a side of an outer surface of the base portion 2 and a skin layer. Further, a portion of the air bag cover 61 is arranged with a soft portion 4 made of a soft synthetic resin of olefin species thermoplastic elastomer or the like in place of the base portion 2. The air bag cover 61 is constituted by arranging two door portions 62F and 62B arranged with a thin-walled portion 64 to be broken at surroundings thereof. The portion 64 to be broken is arranged in an H-like shape in view from an upper side of the instrument panel 1 and is constituted such that the two door portions 62F and 62B are opened to both sides in a front and rear direction by constituting hinge portions 63 by a front end side and a rear end side thereof.

Further, a portion of the air bag cover 61 is arranged with a connecting wall portion 65 substantially in a shape of a square cylinder projected from a side of a rear face thereof to a lower side to surround positions of arranging the door portions 62F and 62B. A plurality of locking holes 66 are penetrated at predetermined positions of wall portions 65a and 65b opposed to each other in a front and rear direction in the connecting wall 65. The locking holes 66 are inserted with locking claws 60 formed at the case 54 to thereby lock the connecting wall portion 65 by the locking claws 60. The connecting wall portion 65 is locked by the respective locking claws 60 in order to be able to smoothly break the portion 64 to be broken by pushing up the door portions 62F and 62B by the air bag 10 in expanding the air bag by ensuring a state of connecting the connecting wall portion 65 and the case 54.

Further, in the case of the embodiment, the soft portion 4 is arranged at front and rear parts exceeding the connecting wall portion 65 on sides of rear faces of the respective door portions 62F and 62B of the air bag cover 61 and on a side of a rear face of the instrument panel 1 at vicinities of the respective hinge portions 63 of the door portions 62F and 62B.

As shown by FIGS. 1 and 2, the case 54 is formed substantially in a shape of a rectangular parallelepiped made of sheet metal having an opening 54a in a rectangular shape at an upper end side thereof and is constituted by including a bottom wall portion 55 in a shape of a rectangular plate, and a side wall portion 59 extended to an upper side of the air bag cover 61 substantially in shape of a square cylinder from an outer peripheral edge of the bottom wall portion 55. The bottom wall portion 55 is constituted by the shape of the rectangular plate extended to prolong in a left and right direction and is provided with an inserting hole 56 opened substantially in a circular shape capable of inserting an upper portion side of the inflator 52 from a lower side to the upper side on the side of the air bag cover 61 at a center thereof. A peripheral edge of the inserting hole 56 of the bottom wall portion 55 is formed with an attaching hole 57 capable of inserting each bolt 50b of the retainer 50. Further, the bottom wall portion 55 is fixed with brackets 58 for connecting the case 54 to a side of a body 6 of a vehicle on sides of lower faces of two left and right side portions of the bottom wall portion 55. Each bracket 58 is fixedly attached with a nut 58a for screwing a bolt 7. The side of the body 6 is arranged with a bracket 6b extended from a reinforcement 6a and the bolt 7 is screwed to the nut 58a by penetrating a sheet 6c for attaching the bracket 6b. By fastening each bolt 7 to the nut 58a, the case 54 and therefore, the air bag apparatus M is fixedly attached to the side of the body 6.

Further, a vicinity of a peripheral edge of the inserting hole 56 of the bottom wall portion 55 is formed with a rib 55a projected to an upper side to surround the inserting hole 56. The rib 55a is arranged at a lower region of a base portion 50a of the retainer 50 and is arranged to promote performance of sealing the bottom wall portion 55 and a peripheral edge 16 of a gas flow inlet 17 of the air bag 10.

Further, the side wall portion 59 of the case 54 is formed with a plurality of the locking claws 60 inverted to an outer side and a lower side of the case 54 at upper ends of portions in the front and rear direction of the vehicle. The respective locking claws 60 are inserted into the locking holes 66 of the connecting wall portion 65 of the air bag cover 61 to lock the connecting wall portion 65 as described above.

The inflator 52 is constituted by a disk type having a main body portion 52a substantially in a cylindrical shape having a plurality of gas delivery ports 52b at an outer peripheral face on a side of an upper portion thereof. An outer peripheral face of the main body portion 52a is provided with a flange portion 52c for attaching the inflator 52 to the case 54. The flange portion 52c is constituted by substantially a shape of a square ring (substantially in a shape of a square plate) projected from the outer peripheral face of the main body portion 52a and penetrated with attaching holes 52d respectively at four corners thereof. The respective attaching holes 52d are arranged at positions in correspondence with the attaching holes 57 of the bottom wall portion 55 of the case 54 and constituted by a dimension of an inner diameter the same as a dimension of an inner diameter of the attaching hole 57.

The retainer 50 is formed by sheet metal drawing and is constituted by including the base portion 50a having a hole opened in a shape substantially the same as that of the inserting hole 56 of the case 54 and a guide wall portion 50c substantially in a shape of a rectangular cylinder extended from an outer peripheral edge of the base portion 50a to the upper side of the side of the air bag cover 61. An outer peripheral edge of the base portion 50a is formed substantially in a rectangular shape (substantially in a square shape) and fixedly attached with the bolts 50b extended to the lower side at four corner portions thereof. Each bolt 50b is inserted into an attaching hole 18 of the air bag 10, the attaching hole 57 of the bottom wall portion 55 of the case 54 and the attaching hole 52d of the flange portion 52 of the inflator 52 in a state of arranging the retainer 50 at inside of the air bag 10 to attach the air bag 10 and the inflator 52 to the bottom wall portion 55 of the case 54 by fastening the nut 51. That is, in fastening the nut 51 to each bolt 50b, the peripheral edge 16 of the gas flow inlet 17 of the air bag 10 is pressed to the bottom wall portion 55 by the base portion 50a, the air bag 10 is attached to the bottom wall portion 55 and the flange portion 52c of the inflator 52 is pressed to the peripheral edge of the inserting hole 56 to thereby attach the inflator 52 to the bottom wall portion 55. Further, the guide wall portion 50c of the retainer 50 is arranged to extend a front end thereof extended to the upper side to a height coinciding with that of an upper end face of the main body portion 52a of the inflator 52. The guide wall portion 50c is extended to the upper side of the side of the air bag cover 61 from an outer edge of the base portion 50a constituting substantially a rectangular shape.

As shown by FIGS. 3 through 7, the air bag 10 is constituted as a ring-like member arranged with a through hole 11 penetrated to be along substantially in the left and right direction for finishing to expand by closing the through hole 11. In the case of the embodiment, a shape of the air bag 10 in finishing to expand the air bag is constituted by substantially a shape of a triangular prism an axial direction thereof is made to be along the left and the right direction. According to the air bag 10, a ring-like main body portion 12 which is expanded to bulge is constituted by arranging a lower expanded portion 13, an upper expanded portion 14 and a rear expanded portion 15 at a surrounding of the through hole 11. The lower expanded portion 13 is arranged with the gar flowing inlet 17 at a lower face 13b at a vicinity of a front end 13c thereof. The upper expanded portion 14 is arranged on a side of an upper portion of the lower expanded portion 13 by communicating with a side of a front part of the lower expanded portion. The rear expanded portion 15 is arranged to connect to the rear part of the lower expanded portion 13 and a rear part of the upper expanded portion 14. Further, in the case of the embodiment, a rear face 15b of the rear expanded portion 15 is made to constitute a passenger side face 30 constituting a side of the passenger in developing to expand the air bag 10.

Further, the ring-like main body 12 is constituted by an inner peripheral side base cloth 21 disposed at an inner peripheral side face of the through hole 11 and an outer peripheral side base cloth 26 disposed on a side of an outer peripheral face of the air bag 10 to be opposed to the inner peripheral side base cloth 21 in finishing to expand the air bag (refer to FIG. 7) Further, the base cloths 21 and 22 are formed by flexible woven cloths comprising polyester string, polyamide string or the like along with a reinforcing cloth, mentioned later and constituted as a noncoated cloth which is not coated with a coating agent of silicone or the like.

Figure 8:
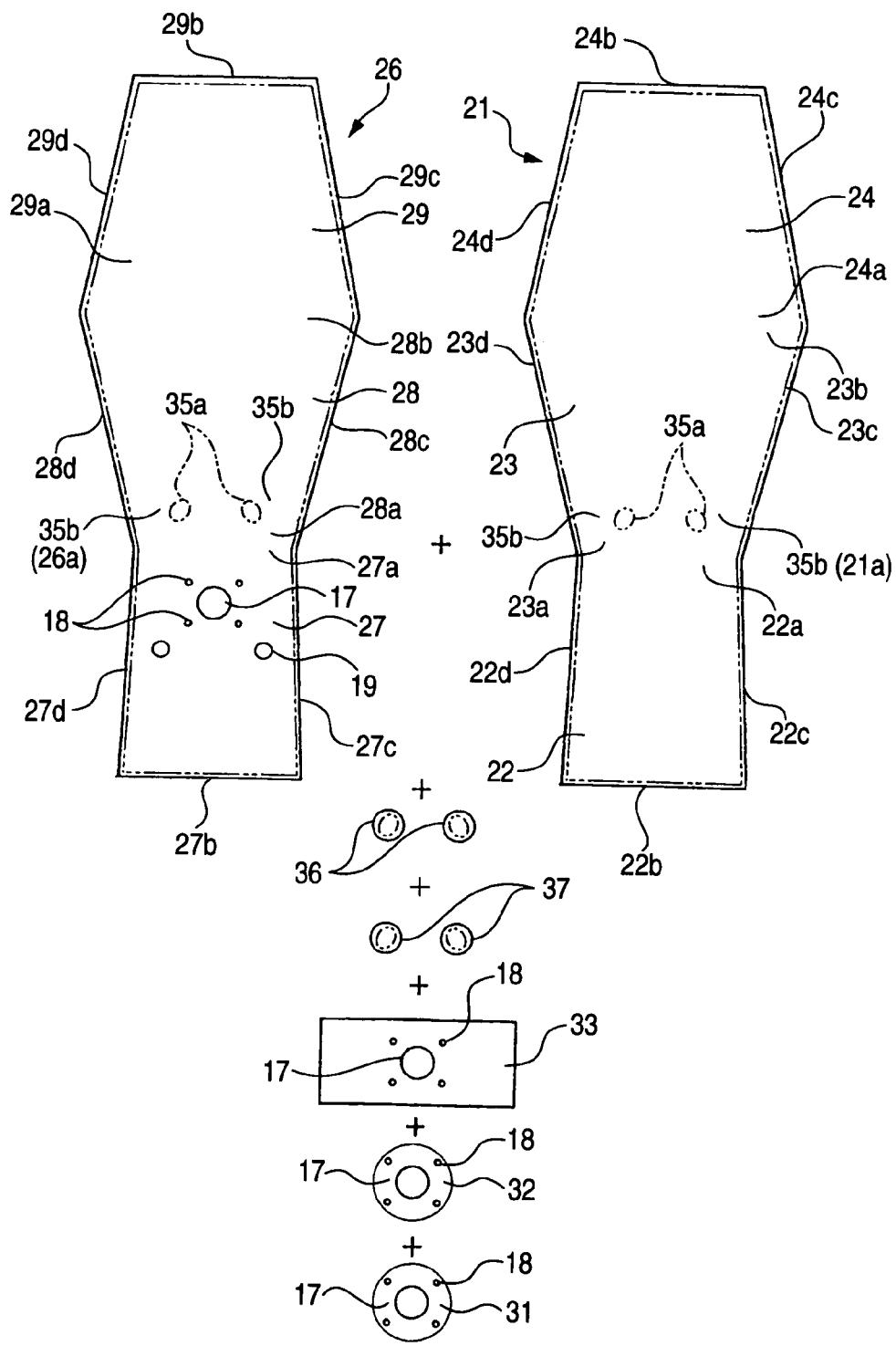
FIG. 8 is a plane view showing members constituting the air bag used in the first embodiment.

As shown by FIG. 8, the inner peripheral side base cloth 21 is constituted by a lower side panel portion 22 constituting a side of the lower face 13b of the lower expanded portion 13, an upper side panel portion 23 constituting a side of a lower face 14b of the upper expanded portion 14, and a rear panel portion 24 constituting a side of a front face 15a of the rear expanded portion 15. Further, in the case of the embodiment, the inner peripheral side base cloth 21 is constituted by a shape of connecting a side of a front edge 22a of the lower panel portion 22 and a side of a front edge 23a of the upper panel portion 23 and connecting a side of a rear edge 23b of the upper panel portion 23 and a side of an upper edge 24a of the rear panel portion 24 to integrate.

The outer peripheral side base cloth 26 is constituted by a lower panel portion 27 constituting a side of an upper face 13a of the lower expanded portion 13, an upper panel portion 28 constituting a side of an upper face 24a of the upper expanded portion 14, and a rear panel portion 29 constituting a side of the rear face 15b of the rear expanded portion 15. Further, the outer side base cloth 26 is constituted by a shape of connecting a side of a front edge 27a of the lower panel portion 27 and a side of a front edge 28a of the upper panel portion 28 and connecting a side of a rear edge 28b of the upper panel portion 28 and a side of the upper edge 29a of the rear panel potion 29 to integrate. Further, the rear panel portion 29 of the outer peripheral side base cloth 26 constitutes the passenger side face 30.

Further, a portion of the outer peripheral side base cloth 26 of the air bag 10 constituting a vicinity of the front edge 27a of the lower panel portion 27 is arranged with the gas flow inlet 17 opened in the circular shape to make an expanding gas G flow and attaching the peripheral edge 16 to the case 54. The peripheral edge 16 of the gas flow inlet 17 is formed with a plurality the attaching holes 18 for attaching the flow inlet peripheral edge 16 to the bottom wall portion 55 of the case 54. The flow inlet peripheral edge 16 on the side of the inner peripheral face of the air bag 10 is arranged to seam with two sheets of reinforcing cloths 31 and 32 and arranged with the reinforcing cloth 33 for protecting the seamed portion on the upper face side of the reinforcing cloth 32 without being seamed thereto. Furthermore, the lower panel portion 27 of the outer peripheral side base cloth 26 are opened with vent holes 19 for exhausting the extra expanding gas G to constitute to be substantially symmetrical with each other in the left and right direction centering on the center in the left and right direction.

Figure 7:
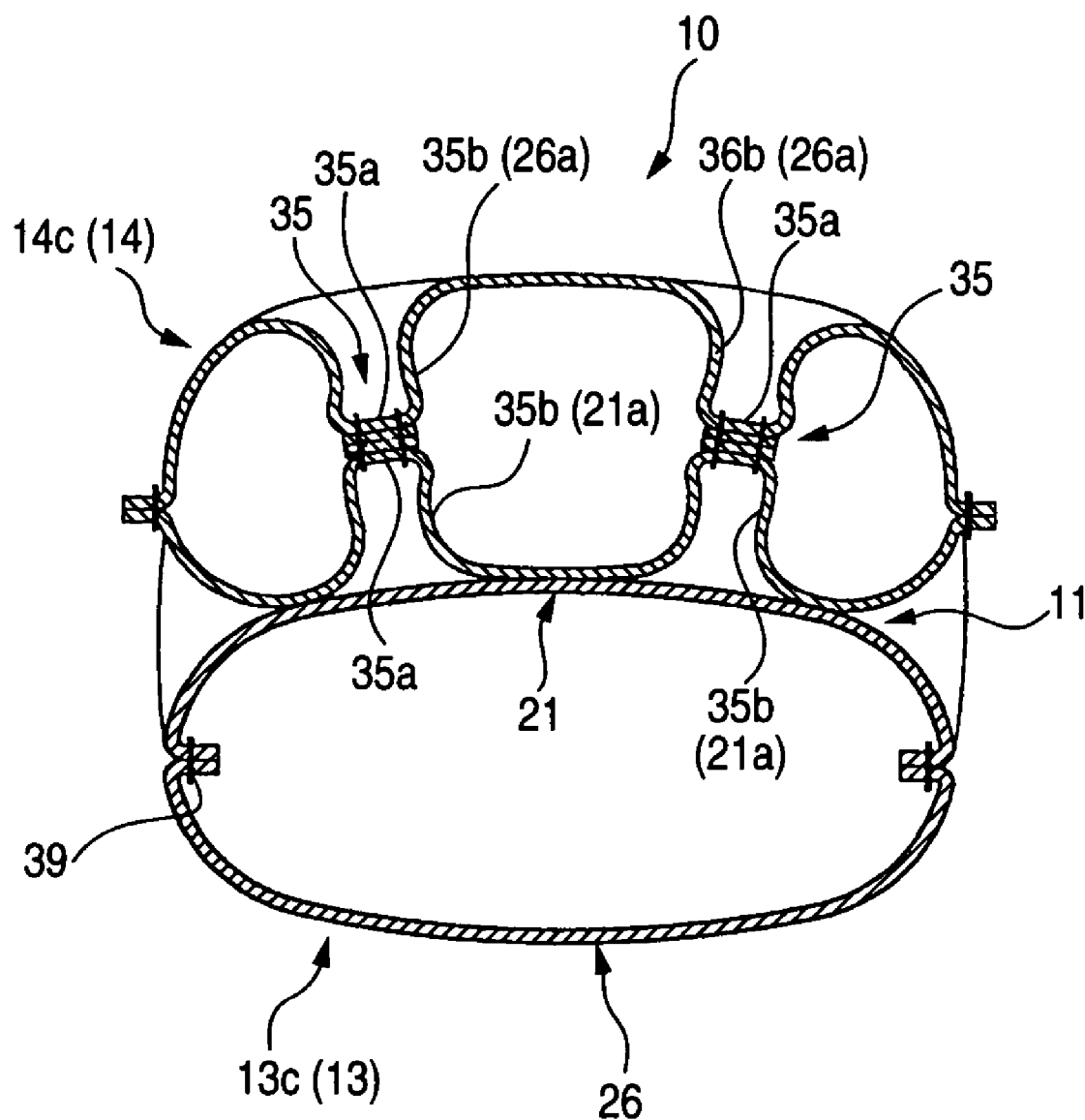
FIG. 7 is a vertical sectional view of a portion of a rectifying portion of the air bag used in the first embodiment in the left and right direction.

Further, adjusting portions 35 as gas amount adjusting means are arranged at portions of the upper expanded portion 14 of the air bag 10 according to the embodiment. The adjusting portions 35 are arranged at two locations substantially symmetrical with each other in the left and right direction centering on the center in the left and right direction at positions constituting vicinities of a front end 4c of the upper expanded portion 14. Each adjusting portion 35 is formed by seaming the inner peripheral side base cloth 21 and the outer peripheral side base cloth 26 to bond in an elliptical shape by interposing reinforcing cloths 36 and 37, and is constituted by respective bond portions 35a of the inner peripheral side base cloth 21 and the outer peripheral side base cloth 26 and portions 21a and 26a (main body portion 36b) substantially in a shape of a truncated circular cone at surroundings of the bond portions 35a (refer to FIGS. 7 and 8). In expanding to develop the air bag 10, when the expanding gas G flows into the ring-like main body portion 12, the outer peripheral side base cloth 26 is pulled to the outer peripheral side, also the inner peripheral side base cloth 21 is pulled to the side of the inner portion to close the through hole 11 and therefore, at the portion of the adjusting portion 35, the bond portion 35a is arranged substantially at a middle portion in the up and down direction of the upper expanded portion 14 while pulling the peripheral portions 21a and 26a (main body portion 35b) of the bond portion 35a at the respective inner peripheral side and outer peripheral side base cloths 21 and 26, That is, the adjusting portion 35 is constituted by a mode of separating a region of the upper expanded portion 14 along the up and down direction (refer to FIG. 7). Therefore, as shown by FIG. 7, in developing to expand the air bag 10, by the adjusting portion 35, an opening area of a vicinity of the front end 14c of the upper expanded portion 14 becomes smaller than an opening area of a vicinity of the front end 13c of the lower expanded portion 13 and the expanding gas G flowing from the gas flow inlet 16 flows more into the lower expanded portion 13 than into the upper expanded portion 14.

Next, fabrication of the air bag 10 will be explained. In the case of the embodiment, the air bag 10 (ring-like main body portion 12) is formed by seaming using seaming string 39 of polyester string or the like. A rear edge 27b of the lower panel portion 27 in the outer peripheral side base cloth 26 previously seamed with the reinforcing cloths 31 and 32 and a lower edge 29b of the rear panel portion 29 are seamed by seaming using seaming string 39 of polyester string or the like to constitute a ring-like shape. At this occasion, the reinforcing cloths 31 and 32 are exposed to the outer peripheral side of the outer peripheral side base cloth 26. Further, a rear edge 22b of the lower panel portion 22 and a lower edge 24b of the rear panel portion 24 are seamed to constitute a ring-like shape to expose a face of the inner peripheral side base cloth 21 constituting the side of an inner portion of the ring-like main body 12 to the outer peripheral side. Further, the gas flowing inlet 17 and the attaching hole 18 may be formed respectively at the base cloth 26 and the reinforcing cloths 31, 32 and 33, or the gas flow inlet 17 and the attaching hole 18 may be formed integrally by boring after seaming the base cloth 26 and the reinforcing cloths 31 and 32 and mounting the reinforcing cloth 33.

Successively, left edges 22c and 27c of the lower panel portions 22 and 27 and right edges 22d and 27d of lower panel portions 22 and 27 are respectively seamed and left edges 24c and 29c of the rear panel portions 24 and 29 and right edges 24d and 29d of the rear panel portions 24 and 29 are respectively seamed. Thereafter, the base cloths 21 and 26 are inverted such that seam margins of the seamed portions are not exposed to the outer peripheral face of the air bag 10. Further, in the state of interposing the reinforcing cloths 35 and 36, the base cloths 21 and 26 are seamed to form the rectifying portions 34, 34. Thereafter, when left edges 23c and 28c of the upper panel portions 23 and 28 and right edges 23d and 28d of the upper panel portions 23 and 28 are respectively seamed, the ring-like main body portion 12 (air bag 10) of the embodiment can be formed.

When an explanation is given to mounting of the air bag 10 fabricated as described above to the vehicle, first, the air bag 10 is folded in a state of arranging the retainer 50 at inside of the air bag 10 to project the bolt 50b from each attaching hole 18, further, the folded air bag 10 is wrapped by the breakable wrapping sheet 47 (refer to FIG. 2) such that the air bag 10 is not unfolded. In folding the air bag 10, the air bog 10 is folded after having been processed by a previously folding step and having been processed by a transverse holding step and a vertical folding step.

Figure 9A:
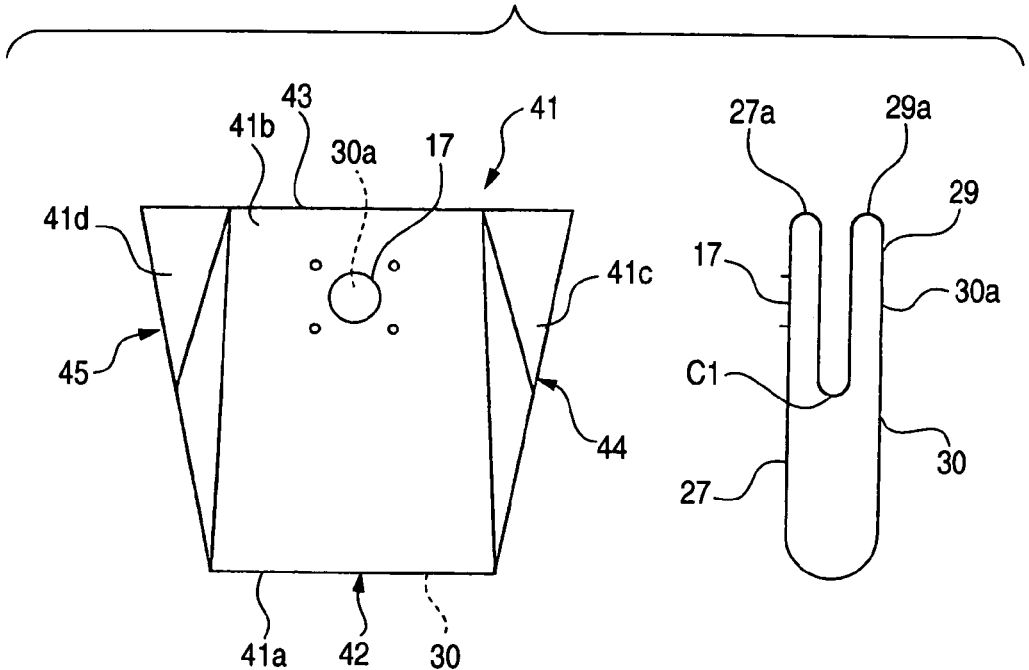
FIGS. 9A to 9B illustrate views showing steps of folding the air bag used in the first embodiment.

In the previously folded step, a previously folded air bag 41 as shown by FIG. 9A is formed. In the previous folding, in a state of not expanding the air bag 10 (ring-like main body portion 12), the gas flow inlet 17 is disposed on the side of the lower face, the inner peripheral face base cloth 21 is interposed above the gas flow inlet 17 and arranged to be opposed to a vicinity of the upper edge 29a of the rear panel portion 29 of the outer peripheral side base cloth 26 (vicinity of the upper end 30a of the passenger face 30) and developed flatly substantially symmetrically in the left and right direction. In the case of the embodiment, the previously folded air bag 41 is formed by making a side of an upper end of the rear expanded portion 15 (the upper edge 29a of the rear panel portion 29) and a side of a front end of the lower expanded portion 13 (front edge 27a of the lower panel 27) substantially coincide with each other and folding the air bag 41 to constitute a crease Cl along the left and right direction at a portion constituting the upper expanded portion 14.

Figure 9B:
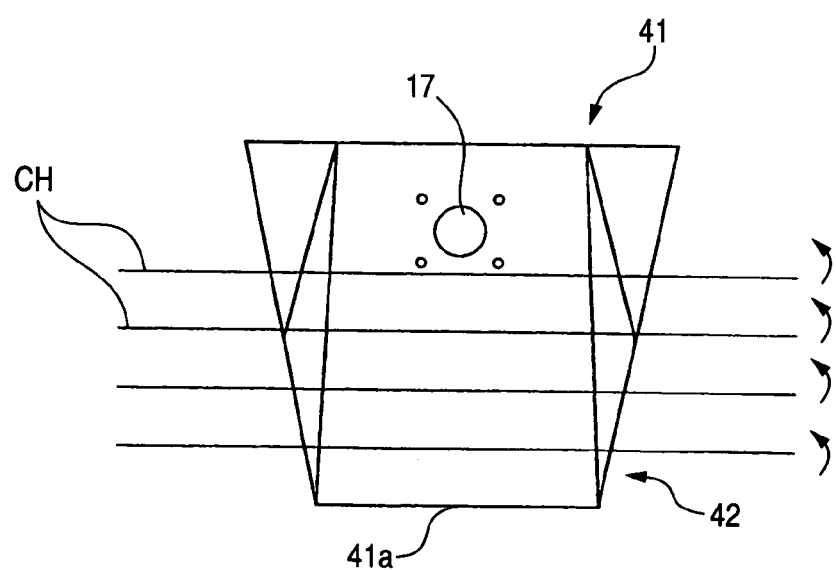
Figure 10A:
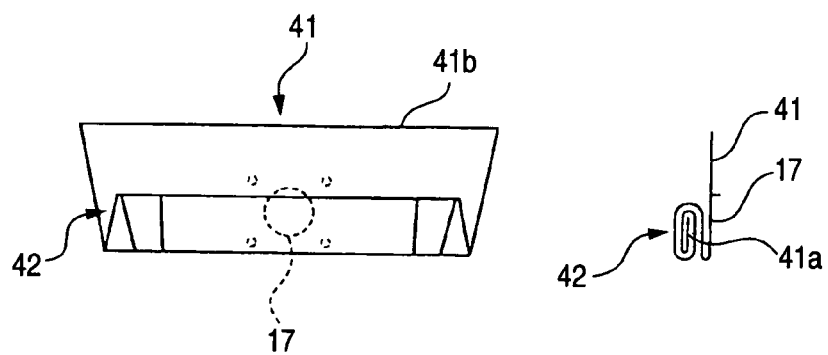
FIGS. 10A to 10C illustrate views showing steps of folding the air bag used in the first embodiment showing steps after FIG. 9.
Figure 10B:
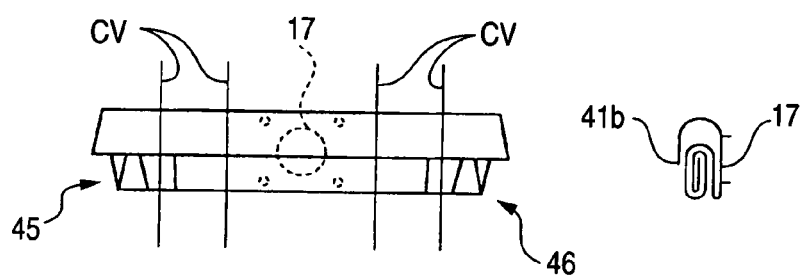
Figure 10C:
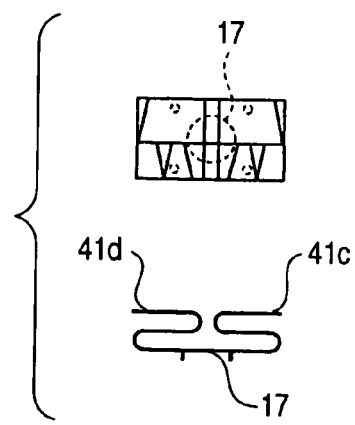

Further, after the previously folding step, as shown by FIG. 9B and FIG. 10, the previously folded air bag 41 is folded by a transversely folding step of narrowing a width direction in the front and rear direction centering on the gas flow inlet 17 by making a crease CH in the left and right direction and a vertically folding step of narrowing a width direction in the left and right direction by making a crease CV in the front and rear direction to constitute a dimension capable of being contained in the case 54. In the case of the embodiment, the transversely folding step is carried out by rolling to fold a portion 42 on the rear side of the gas flow inlet 17 to arrange at a position upward from the gas flow inlet 17 to make the side of the rear edge 41a proximate to the gas flow inlet 17, successively, folding a portion 43 on a side frontward from the gas flow inlet 17 in bellows to mount to a side upward from the rear guide portion 42 to make a side of the front edge 41b proximate to the gas flow inlet 17. Further, the vertically folding step is carried out by folding portions 44 and 45 on sides of left and right edges 41c and 41d in bellows to arrange at a position upward from the gas flow inlet 17 to make sides of left and right edges 41c and 41d proximate to the gas flow inlet 17.

Further, after finishing to fold the air bag 10 after having processed by the vertical folding step, as described above, the folded air bag 10 is wrapped by the breakable wrapping sheet 4 such that the air bag is not unfolded.

Further, the folded air bag 10 is mounted above the bottom wall portion 55 of the case 54 from the opening 54a while inserting the respective bolts 50b into the attaching holes 57 from above. Successively, an upper portion of the main body portion 52a of the inflator 52 is inserted into the inserting hole 56, the gas flow inlet 17 and the base portion 50a of the retainer 50 from below and the respective bolts 50b projected to the lower side from the bottom wall portion 55 are inserted into the attaching holes 52d of the flange portion 52c of the inflator 52. Thereafter, when the nuts 51 are fastened to the respective bolts 50b projected from the flange portion 52c of the inflator 52, the folded air bag 10 and the inflator 52 can be attached to the bottom wall portion 55 of the case 54.

Thereafter, the side wall portion 59 of the case 54 is inserted into the connecting wall portion 65 of the air bag cover 61 in the instrument panel 1 mounted to the vehicle, the respective locking claw portion 60 of the case 54 are inserted into the locking holes 66 of the connecting wall portion 65 and the respective locking claws 60 are locked by the connecting wall portion 65. Furthermore, when the bolts 7 are fastened to the nuts 58a of the respective brackets 58, the air bag apparatus M can be mounted to the vehicle.

Further, in mounting the air bag apparatus M to the vehicle, the air bag apparatus M may be mounted to the vehicle by previously integrating the air bag 10 and the case 54 attached with the inflator 52 and fixedly connecting the air bag apparatus M to the side of the body 6 by utilizing the bolts 7 when the instrument panel 1 is attached to the vehicle.

After mounting the air bag apparatus M to the vehicle, when the expanding gas G is delivered form the gas delivering port 52b of the inflator 52, the air bag 10 is expanded, the wrapping sheet 47 is broken, the portion 64 to be broken of the air bag cover 61 is broken and the door portions 62F and the 62B are opened as shown by two-dotted chain lines of FIGS. 1 and 2. Further, the air bag 10 is considerably projected from an opening 67 constituted by opening the door portions 62f and 62b of the air bag cover 61 to finish expanding and the extra expanding gas G is discharged from the vent hole 19. Further, a member of notation W in FIGS. 1 and 11 designate a windshield.

Further, although the air bag apparatus M of the embodiment is constituted to arrange the through hole 11 substantially penetrated in the left and right direction, the through hole 11 is closed when the air bag 10 is finished to expand. Therefore, a vicinity of the center axis of the through hole 11 of the air bag 10 is prevented from being recessed more considerably than a surrounding thereof and an amount of recessing the air bag 10 when the passenger interfere therewith can substantially be made constant at the passenger side face 30. As a result, even when the passenger interferes with any portion of the passenger side face 30 of the air bag 10 which has finished to expand, the passenger can stably be protected.

Therefore, according to the air bag apparatus M of the embodiment, even when the physical constitution and the attitude of passenger differ, the passenger can stably be protected by the air bag 10 which has finished to expand.

Figure 4:
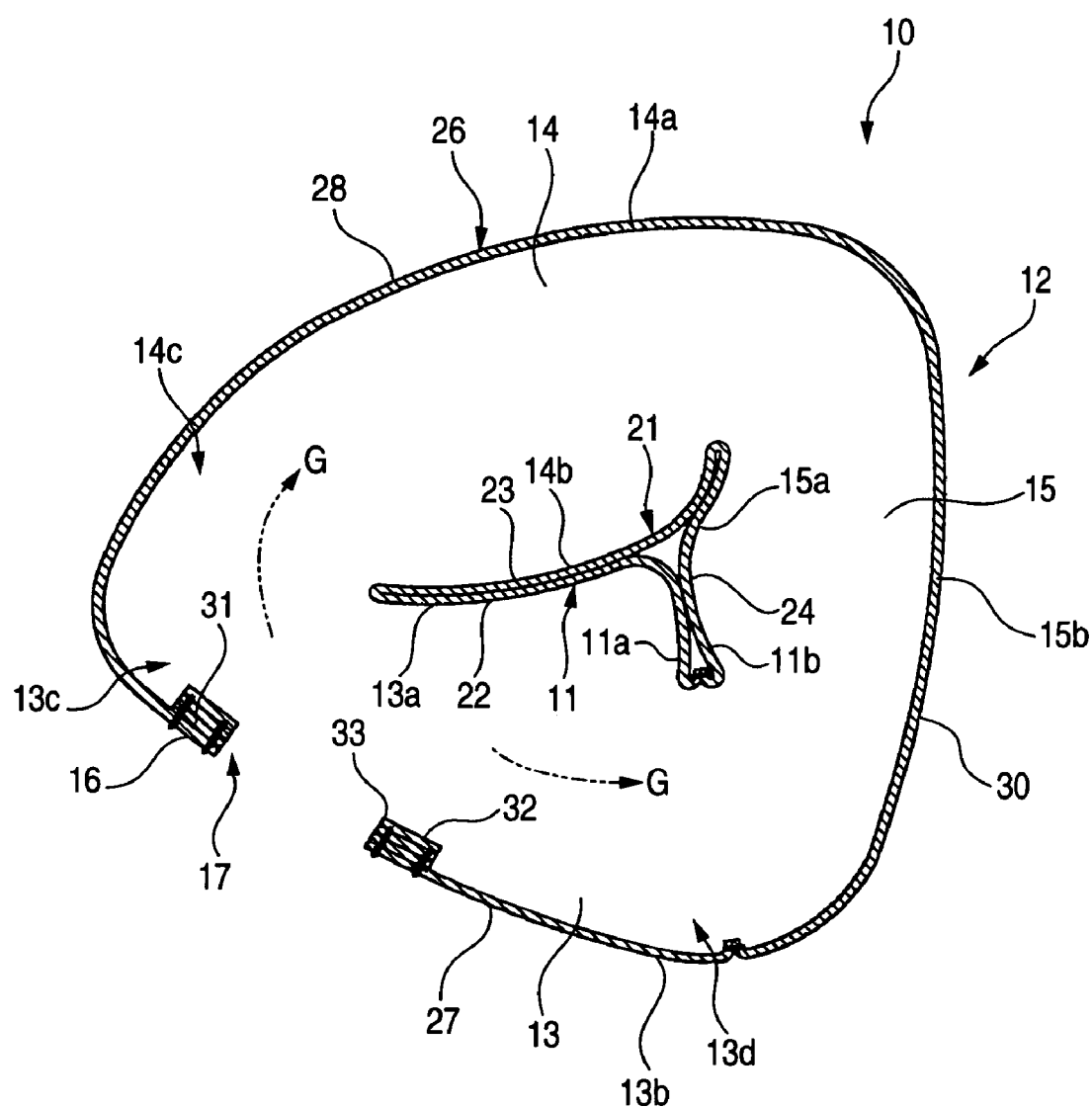
FIG. 4 is a vertical sectional view of the state of expanding the single member of the air bag used in the first embodiment in the front and rear direction of the vehicle.
Figure 5:
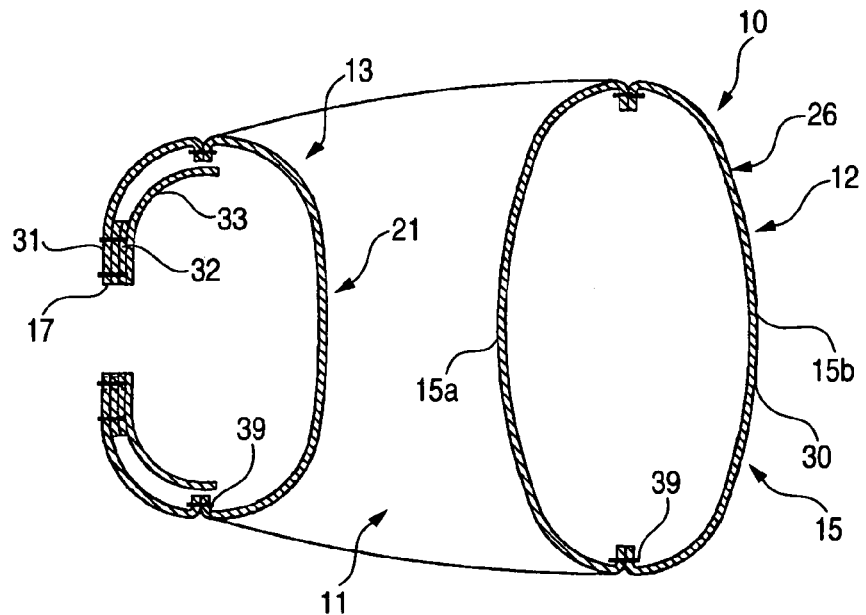
FIG. 5 is a cross-sectional view of the state of expanding the single member of the air bag used in the first embodiment in the front and rear direction of the vehicle.
Figure 6:
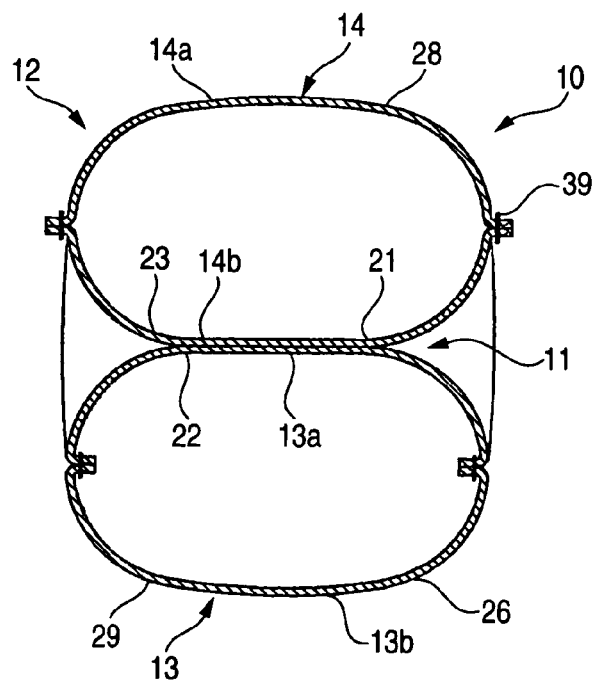
FIG. 6 is a vertical sectional view of the state of expanding the single member of the air bag used in the first embodiment in a left and right direction.
Figure 11:
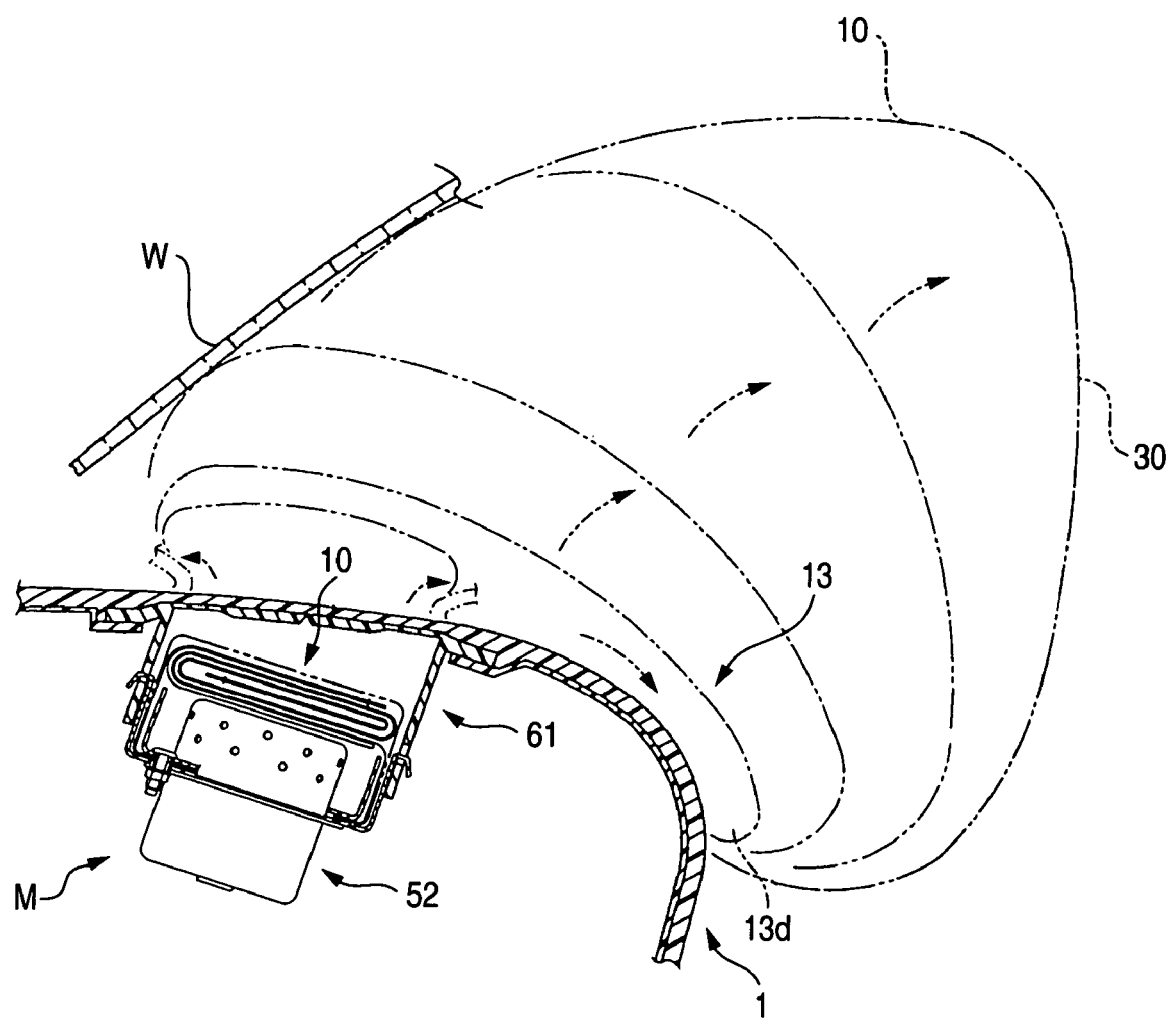
FIG. 11 is a view for explaining the air bag apparatus of the first embodiment when the air bag apparatus is operated showing a state viewed from a side of the vehicle.

Further, according to the air bag apparatus M of the embodiment, since the air bag 10 is constituted by the ring-like member having the through hole 11 penetrated in the left and right direction, at the initial stage of expanding to develop the air bag 10, the expanding gas G flowing from the gas flowing inlet 17 does not flow directly to the side of the passenger but flows to widen to the up and down direction along the shape of the air bag 10 (refer to FIG. 4). Therefore, as shown by FIG. 11, the air bag 10 is moved to the rear side while being expanded to widen considerably in the up and down direction in a state of being restrained from considerably projecting partially to the rear side. As a result, at the initial stage of expanding to develop the air bag 10, the moving speed of the passenger side face 30 to the side of the passenger can be restrained without exerting a partial pressing force to the side of the passenger and the passenger moving forward can precisely be protected.

Further, the air bag apparatus of the embodiment is constituted to make the expanding gas G flowing from the gas flow inlet 17 more considerably to the lower expanded portion 13 than the upper expanded portion 14 by arranging the adjusting portion 35 at inside of a region of the upper expanded portion 14 in the air bag 10, Therefore, the larger amount of the expanding gas flows to the side of the rear end 13d of the lower expanded portion. As a result, in expanding to develop the air bag, the lower expanded portion 13 of the air bag 10 can be developed more swiftly than the upper expanded portion 14 and therefore, in expanding to develop the air bag 10, even when the belly portion of the passenger is proximate to the air bag 10, the air bag 10 can be developed swiftly between the instrument panel 1 constituting the body side and the passenger and the passenger can precisely be protected.

Figure 12:
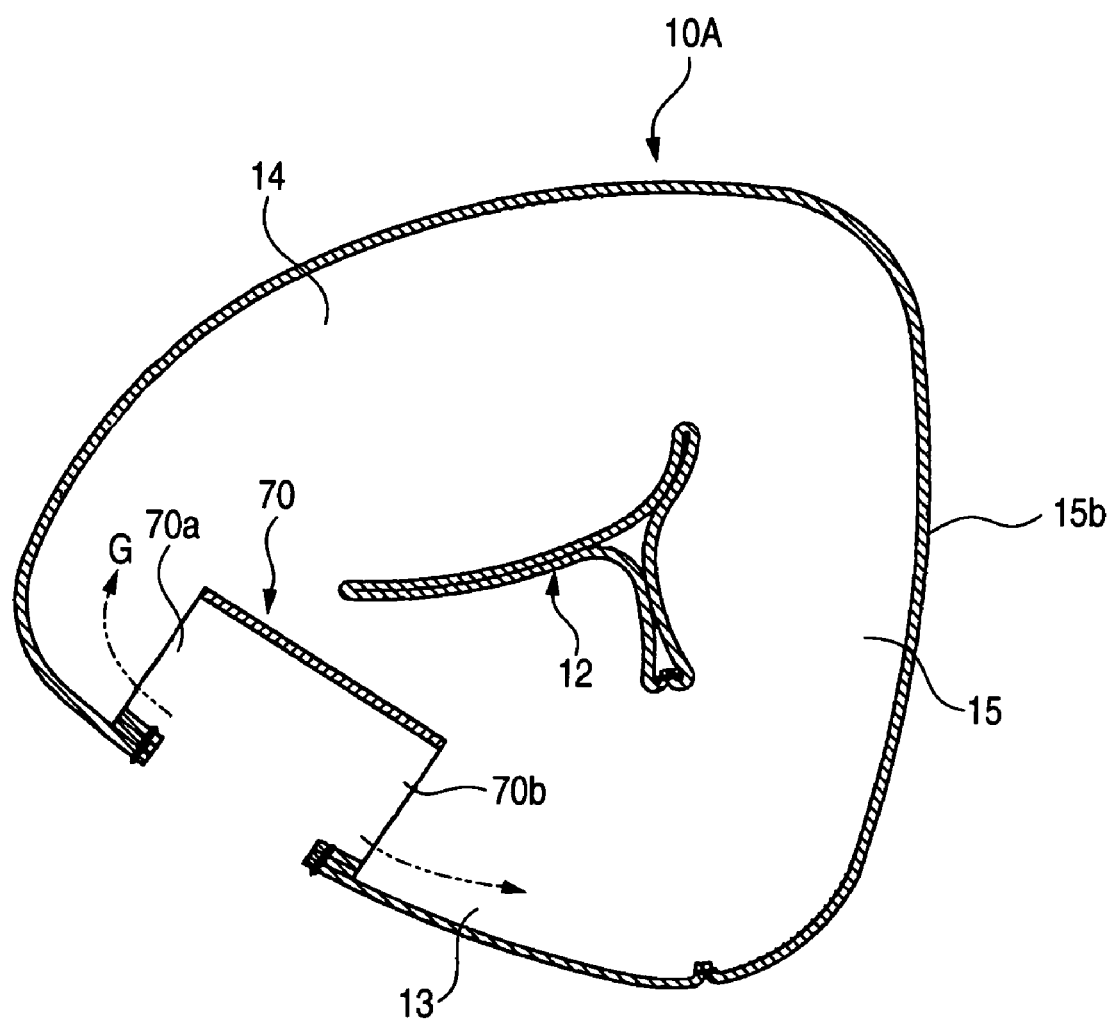
FIG. 12 is a sectional view of a state of expanding a single member of an air bag according to other embodiment of the invention in a front and rear direction of a vehicle.

Further, as shown by FIG. 12, there may be used an air bag 10A having a constitution of arranging a rectifying cloth 70 (rectifying unit) in a cylindrical shape opening both ends 70a and 70b in the up and down direction (both ends in the front and rear direction) to flow the expanding gas G in the up and down direction. When the air bag 10A having such a constitution is used, expanding gas G flowing from the gas flow inlet 17 is made to flow at inside of the air bag 10A to direct to both sides of the upper side and the lower side by the rectifying cloth 70. Therefore, at an initial stage of expansion, the air bag 10A can be developed to considerably widen further in the up and down direction in the state of being restrained from being projected considerably to the rear side.

Further, although the embodiment respectively exemplifies the air bags 10 and 10A arranged with either of the adjusting portion 35 or the rectifying cloth 70 (rectifying unit), naturally, there may be constructed a constitution of arranging both of the rectifying portion and the rectifying cloth in the single air bag. Further, the rectifying unit is not limited to the rectifying cloth 70 but, for example, the rectifying unit may be constructed by a constitution of arranging a tether connecting the inner peripheral side base cloth 21 and the outer peripheral side base cloth 26 by constituting a shape thereof such that the expanding gas flowing into the air bag is directed to the both sides of the upper side and the lower side.

Further, it is possible to mount the air bag apparatus in a steering wheel arranged in front of a driver seat of a vehicle. The air bag 10 as a modified example to be mounted in the steering wheel is constituted to bond a portion 11a of the inner peripheral side base cloth 21 constituting the lower expanded portion 13 and a portion 11b thereof constituting the rear expanded portion 15 seamed substantially in a rectangular shape by utilizing seaming string 39. In this case, a shape of the air bag 10 in finishing to expand is constituted by substantially a shape of a flat triangular prism having an axial direction along the left and right direction of the air bag, set with the large rear expanded portion 15 and set with a small distance between the lower expanded portion 13 and an upper end of the rear expanded portion 15. At an initial stage of expanding the air bag 10, the portion 11b is constituted by a shape of flatly developed in the up and down direction. In expanding to develop the air bag 10, the expanding gas G does not flow directly to the side of the passenger but flows to widen in the up and down direction along the shape of the air bag 10 (through hole 11). Further, the rear expanded portion 15 can be restrained from separating from the lower expanded portion 13 to develop to considerably project to the rear side (passenger side) of the vehicle and the speed of the passenger side face to the side of the passenger can further be restrained. As a result, the driver can stably be protected.

Second Embodiment

An explanation will be given of a second embodiment of an air bag apparatus of the invention.

Figure 14:
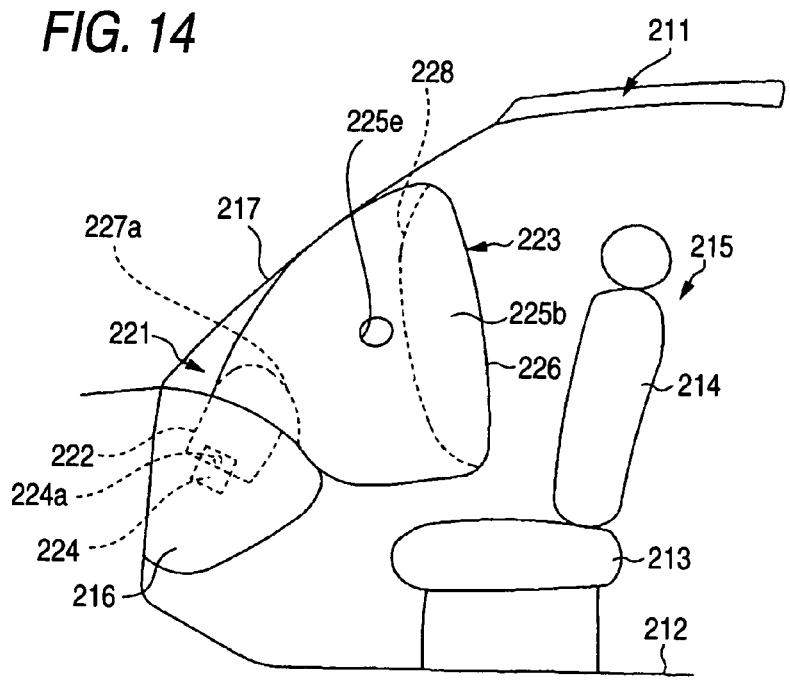
FIG. 14 is a side view showing a state of finishing to expand the air bag apparatus in the second embodiment of the invention.

As shown by FIG. 14, a passenger seat 215 constituted by a seating portion 213 and a backrest portion is arranged at a floor face 212 of a vehicle 211 such that a position in a front and rear direction in a vehicle advancing direction can be adjusted. An instrument panel 216 is arranged in front of the passenger seat 215. Inside of the instrument panel 216 is contained with an air bag apparatus 221 having an air bag 223 expanded to develop between an upper face of the instrument panel 216, an inner face of a windshield 217 disposed on an upper side of the instrument panel 216 and a passenger seated on the passenger seat 215.

The air bag apparatus 221 is constituted by a containing case 222 contained to fix to inside of the instrument panel 216, the air bag 223 folded to contain at inside of the containing case 222, and an inflator 224 arranged to penetrate a bottom portion of the containing case 222 and having an injecting port 224a for supplying a gas at high pressure to the air bag 223 to expand to develop. Further, when the inflator 224 is started based on a detecting signal from an acceleration sensor (not illustrated) for detecting impact of the vehicle 211, the gas at high pressure is supplied from inside of the inflator 224 to inside of the air bag. Thereby, the air bag 223 is expanded to develop to protect the passenger seated on the passenger seat 215.

Next, a constitution of the air bag 223 will be explained.

As shown by a plane of a state of finishing expansion, the air bag 223 is provided with an outer sheet 225 comprising a first front outer sheet 225a disposed on a front side of the vehicle advancing direction, and a left outer sheet 225b and a right outer sheet 225c integrally formed with two left and right sides in a vehicle width direction of the first front outer sheet 225a and developed to a rear side. Further, rear end edges of the left outer and the right outer sheets 225b, 225c are seamed with two left and right side edges of a second front outer sheet 226 for restricting movement of the passenger to the front side. Further, an inner side of the outer sheet 225 is seamed with a lower end edge and an upper end edge of an inner sheet 227 formed in a shape substantially the same as that of the outer sheet 225. The inner sheet 227 is constituted by a first front inner sheet 227a and a left inner sheet 227b and a right inner sheet 227c integrally formed with two left and right sides of the first front inner sheet 227a. Rear end edges of the left inner and the right inner sheets 227b, 227k are seamed with two left and right side edges of a second front inner sheet 228 formed in a shape substantially the same as that of the second front outer sheet 226. Further, also two upper and lower end edges of the second front outer sheet 226 and the second front inner sheet 228 are seamed.

Figure 16:
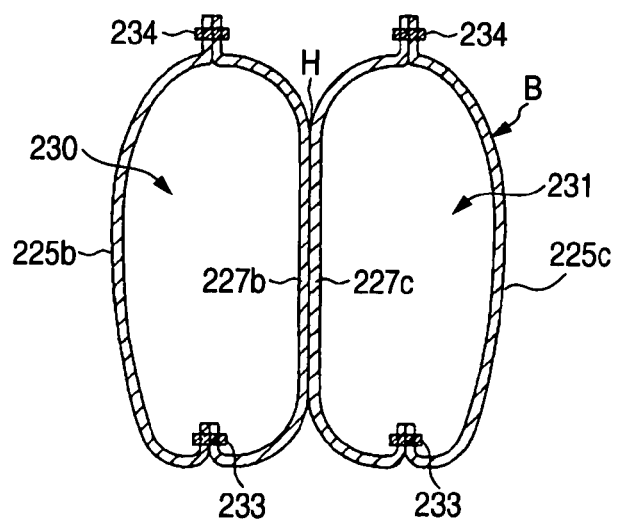
FIG. 16 is a cross-sectional view of the state of finishing to expand the air bag in the second embodiment of the invention.

As shown by FIG. 16, lower end edges of the left outer sheet 225b and the left inner sheet 227b are seamed by sewing string 233, and also lower end edges of the right outer sheet 225c and the right inner sheet 227c are seamed by sewing string 233. Similarly, upper end edges of the left outer sheet 225b and the left inner sheet 227b are seamed by seaming string 234 and also upper end edges of the right outer sheet 225c and the right inner sheet 227c are seamed by seaming string 234.

Figure 17:
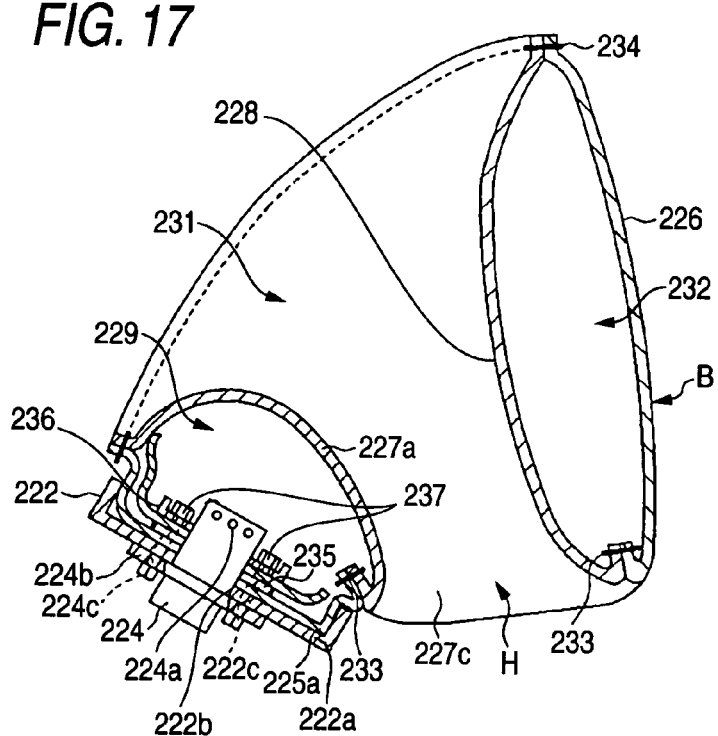
FIG. 17 is a sectional view taken along a line XVII-XVII of FIG. 15.

As shown by FIG. 17, lower end edges of the first front outer sheet 225a and the front inner sheet 227a are seamed by sewing string 233 and upper end edges thereof are seamed by sewing string 234. Further, lower end edges of the second front outer sheet 226 and the second front inner sheet 227 are seamed by the sewing string 233 and upper end edges thereof are seamed by the sewing string 234.

Figure 15:
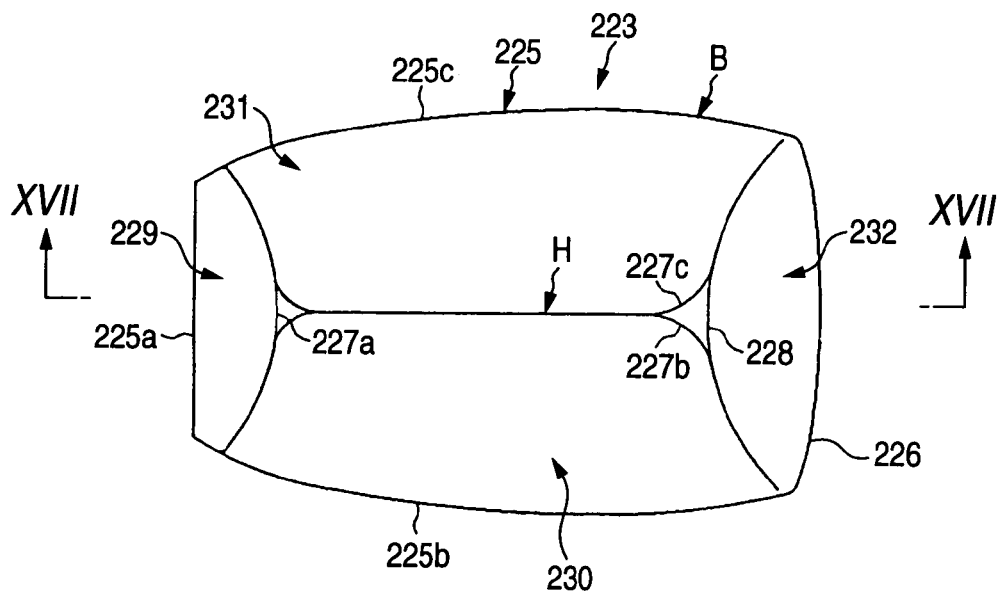
FIG. 15 is a plane view showing a state of finishing to expand an air bag in the second embodiment of the invention.

As shown by FIG. 15, in normally finishing to expand the air bag 223, a front expanded portion 229 is formed between the first front outer sheet 225a and the first front inner sheet 227a. Further, a left expanded portion 230 is formed between the left outer sheet 225b and the left inner sheet 227b, and a right expanded portion 231 is formed between the right outer sheet 225c and the right inner sheet 227c. Further, a rear expanded portion 232 is formed between the second front outer sheet 226 and the second front inner sheet 228.

According to the embodiment, the front expanded portion 229, the left and the right expanded portions 230, 231 and the rear expanded portion 232 are communicated with each other in the front and rear direction at respective insides thereof and an expanded portion B in a cylindrical shape is formed as a whole. A through hole H penetrating in an up and down direction is formed on an inner side of the expanded portion B in the cylindrical shape.

Figure 20:
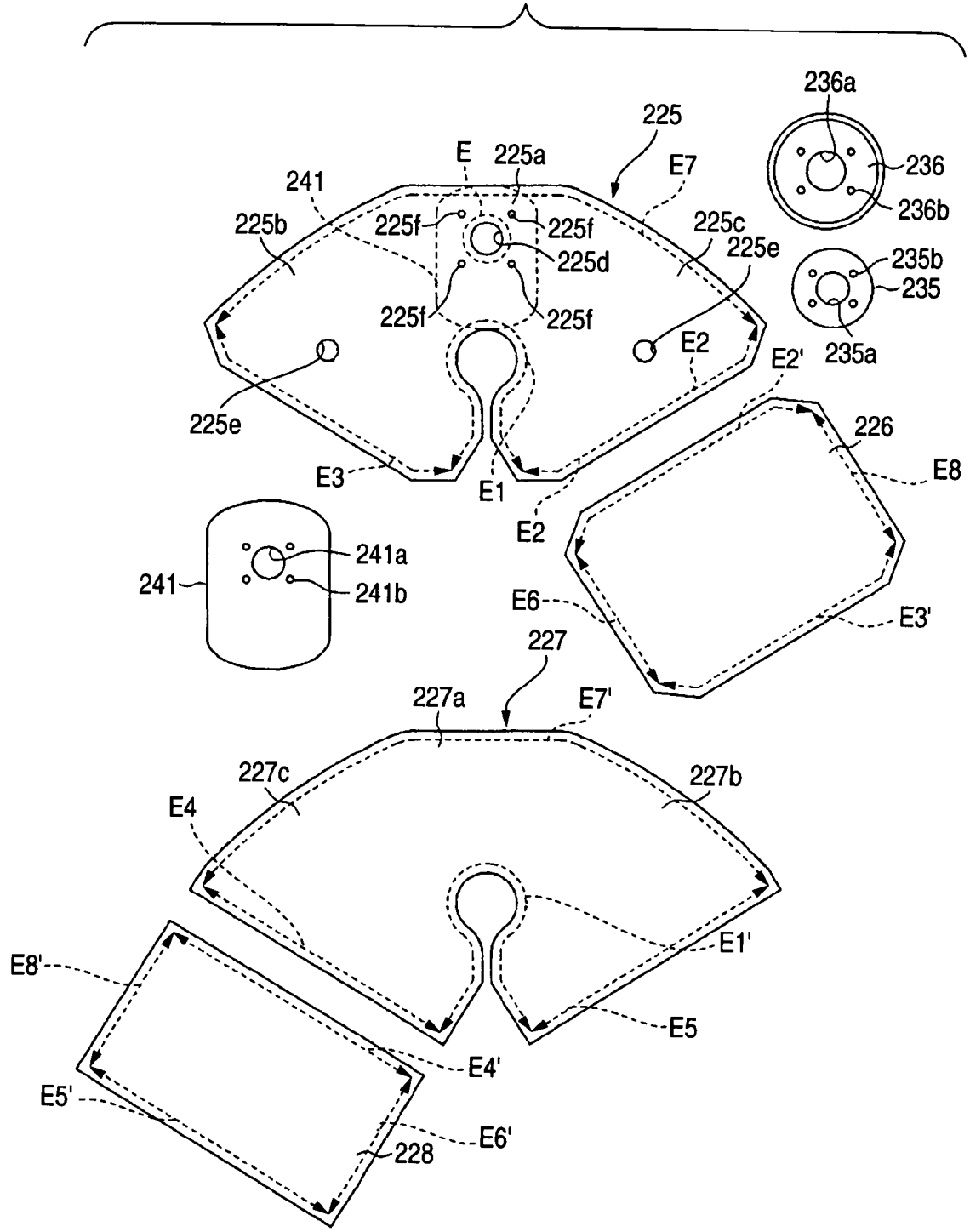
FIG. 20 is a front view of developing respective sheets of the air bag in the second embodiment of the invention.

FIG. 20 shows a state of developing the outer sheet 225, the second front outer sheet 226, the inner sheet 227 and the second front inner sheet 228, a reinforcing cloth 235 for reinforcing a vicinity of an inflator inserting hole 225d formed at the first front outer side sheet 225a and a protecting cloth 241 for protecting sewing string in order to constitute the air bag 223. The reinforcing cloth 235 and the protecting cloth 241 are formed with inflator inserting holes 235a, 241a. The left outer and the right outer sheets 225b, 225c are formed with vent holes 225e to thereby contract the air bag 223 by discharging a gas to outside at a final stage of expanding to develop the air bag 223. The first front outer sheet 225a, the reinforcing cloth 235 and the protecting cloth 241 are formed with bolt inserting holes 225f, 235b, 241b at respective four locations to surround the inflator inserting holes 225d, 235a, 241a.

An explanation will be given of a method of fabricating the air bag 223 by using the respective sheets shown in FIG. 20.

First, a plurality of sheets (only one sheet is illustrated in FIG. 17) of the reinforcing cloths 235 are laminated to mount on an inner surface side (head side of paper face of FIG. 20) of the first front outer side sheet 225a of the outer sheet 225 in correspondence with the inflator inserting hole 225d. Next, the protecting cloth 241 is mounted on an upper face thereof. Further, the sheet 225a, the reinforcing cloth 235 and the protecting sheet 241 are seamed to connect to each other by sewing string E in a circular ring shape.

Next, a lower end edge E1 disposed on a lower side of a central portion of the outer sheet 225 and a lower end edge E1' of the inner sheet 227 shown in FIG. 20 are seamed by sewing string. Next, one end edge E2 of the outer sheet 225 and a left end edge E2' of the second front outer sheet 226 are seamed by sewing string. Other end edge E3 of the outer sheet 225 and a right end edge E3' of the second front outer sheet 226 are seamed by sewing string. Further, one end edge E4 of the inner side sheet 227 and a right end edge E4' of the second front inner sheet 228 are seamed and other end edge E5 of the inner sheet 227 and a left end edge E5' of the second front inner sheet 228 are seamed respectively by sewing string. Further, a lower end edge E6 of the second front outer sheet 226 and a lower end edge E6' of the second front inner sheet 228 are seamed by sewing string.

Next, the outer sheet 225, the second front outer sheet 226, the inner sheet 227 and the second front inner sheet 228a are inverted. Thereafter, upper end edges E7, E7' of the outer sheet 225 and the second front outer sheet 226 and upper end edges E8, E8' of the inner sheet 227 and the second front inner sheet 228 are seamed by sewing string. The air bag 223 is fabricated in this way.

As shown by FIG. 17, the air bag 223 constituted in this way is attached to a bottom plate 222a of the containing case 222 along with the inflator 224. That is, as shown by FIG. 17, a retainer 236 (refer to FIG. 20) having an inflator inserting hole 236a and an inserting hole 236b of a bolt 237 is brought into contact with a surface of the protecting cloth 241. The inflator 224 is penetrated through an attaching hole 222b formed at the bottom plate 222a of the containing case 222 and a flange 224b fixedly fitted to an outer periphery thereof is brought into contact with a lower face of the bottom plate 222a. Further, four pieces of the bolts 237 are inserted through the respective inserting holes 236b, 235b, 241b, 225 of the bolts 237 and bolt inserting holes 222c, 224c formed at the bottom plate 222a and the flange 224b. Further, nuts are screwed to the respective bolts 237 to fix the air bag 223 to the bottom plate 222a. Further, the air bag 223 is contained at inside of the containing case 222 in a folded state, although not illustrated, and an upper face of the instrument panel 216 is formed with a breakable portion (not illustrated) broken to open in expanding to develop the air bag 223.

Next, operation of the air bag apparatus 221 constituted as described above will be explained.

Figure 18:
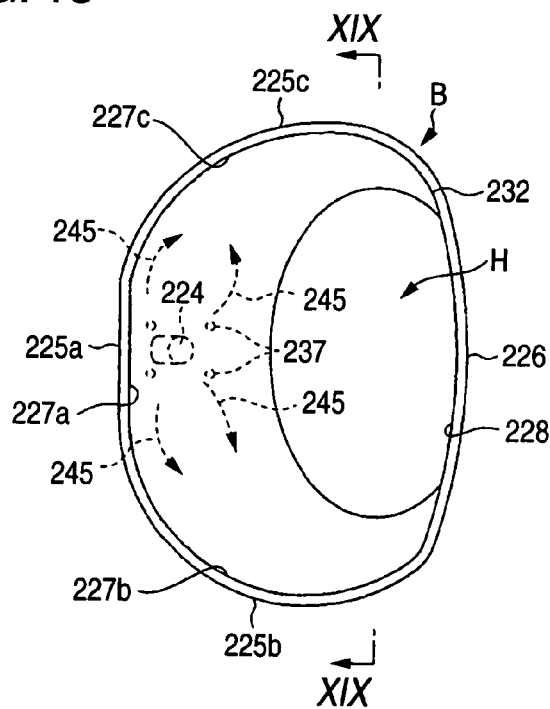
FIG. 18 is a plane view showing an initial state of expanding the air bag in the second embodiment of the invention.
Figure 19:
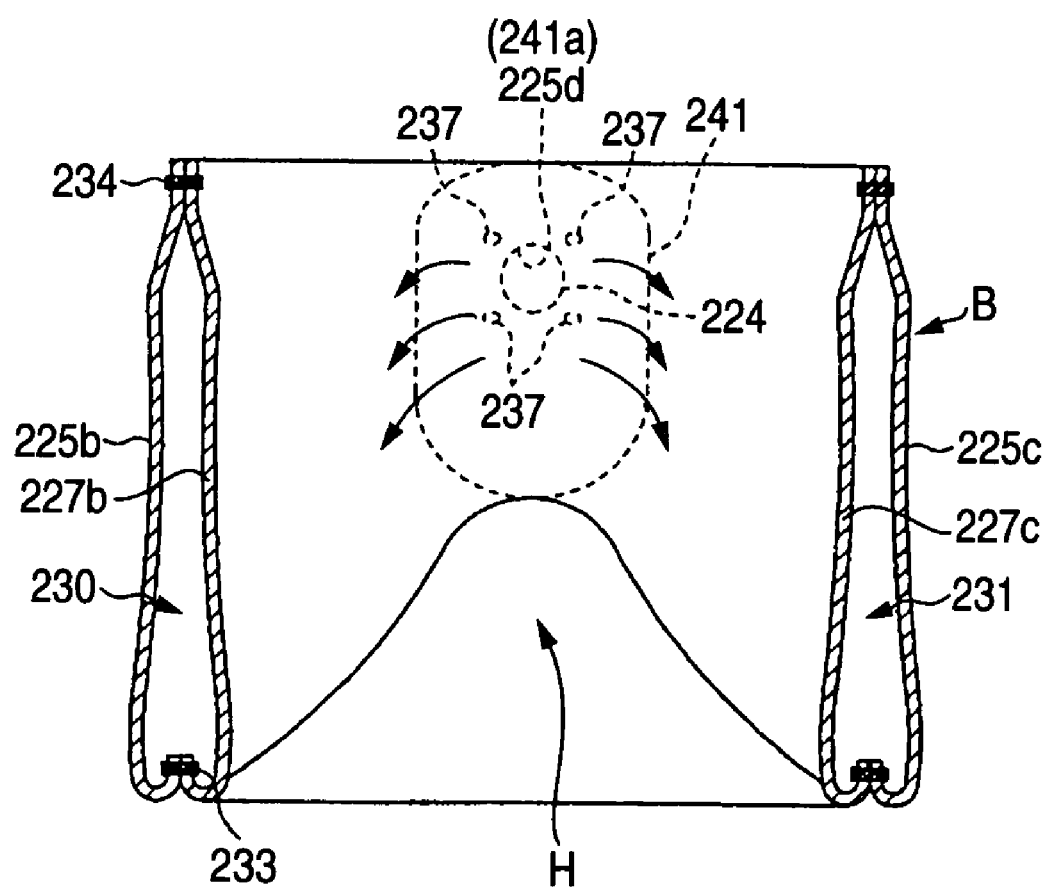
FIG. 19 is a sectional view taken along a line XIX-XIX of FIG. 18.

FIG. 15 shows the plane of the air bag 223 in finishing to expand, FIG. 17 shows a section of FIG. 15 taken along a line XVII-XVII, and FIG. 18 shows a plane view at an initial stage of developing the air bag 223. Further, FIG. 19 shows a section of FIG. 18 taken along a line XIX-XIX. When the vehicle 211 is impacted to, for example, an opposed vehicle and the acceleration sensor, not illustrated, is operated, the inflator 224 is operated and the gas is supplied from the injecting port 224a of the inflator 224 shown in FIG. 18 into the front expanded portion 229 of the air bag 223. Thereby, first, the front side expanded portion 219 is expanded to develop, the gas is supplied from two left and right side portions of the front expanded portion 229 into the left expanded portion 230 and the right expanded portion 231 as shown by arrow marks in FIGS. 18, 19, and the left side and the right side expanded portions 230, 231 are expanded to develop. Thereafter, the gas is supplied from front end edges of the left and the right expanded portions 230, 231 to inside of the rear expanded portion 232 to expand to develop the rear expanded portion 232.

At a final stage of a state of expanding to develop the air bag 223, the gas is discharged to outside by the vent holes 225e and the volume of the air bag 223 is reduced to thereby resolve an excessive pressing force exerted to the passenger.

Figure 13:
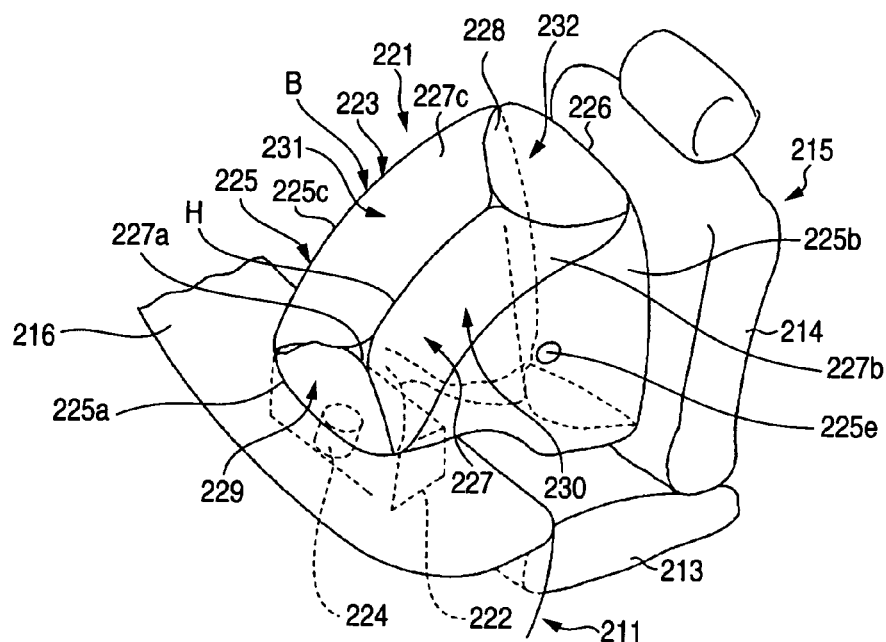
FIG. 13 is a perspective view showing a state of finishing to expand an air bag apparatus in a second embodiment of the invention.

In a normal state of finishing to expand the air bag 223, as shown by FIGS. 13, 15, the first front inner sheet 227a on the inner side forming the front expanded portion 229, and the left inner sheet 227b and the right inner sheet 227c forming the left expanded portion 230 and the right expanded portion 231 are brought into contact with each other, and the left inner and the right inner sheets 227b, 227c and the second front inner sheet 228 forming the rear expanded portion 232 are brought into contact with each other. Thereby, the through hole H is completely closed. Further, under the state, most of the through hole H is formed to dispose on a rear side of the instrument panel 216. As shown by FIG. 14, a front end portion of the through hole H may be disposed frontward from a rear end of the instrument panel 216.

According to the air bag apparatus of the above-described embodiment, the following characteristics can be achieved.

(1) Since the through hole H is provided on the inner side of the air bag 223, the introduced gas firstly expands the front expanded portion 229. Successively, the gas flowing from the front expanded portion 229 to the left and the right expanded portions 230, 231 successively expands the left and the right expanded portions 230, 231 while pressing to widen in the left and right direction. As a result, the developing speed to the rear side is reduced. Further, after finishing to expand the air bag, the through hole H is closed and therefore, the passenger can effectively be constrained. Further, vehicle members of the instrument panel 216, the windshield 217 and the like are not related to a reduction in the developing speed and therefore, the air bag apparatus achieves a high degree of freedom of mounting to the vehicle.

(2) In the state of finishing to expand the rear bag, the through hole H is completely closed, the left and right expanded portions 230, 231 are disposed to support the rear side expanded portion 232 and therefore, even when the passenger invades a rear face of the rear expanded portion 232 after finishing to expand the air bag, the passenger can effectively be constrained. Further, when the through hole H is substantially closed (50% or more of peripheral lengths of the inner sheets are brought into contact with each other) in finishing to expand the air bag, an effect substantially equivalent to that in the case of completely closing the through hole H (entire peripheries of the inner sheets are brought into contact with each other) is achieved and therefore, the through hole H needs not to close completely.

(3) Further, even when the rear expanded portion 232 is brought into contact with an obstacle accidentally in a procedure of developing the air bag 223, the through hole H which is not closed yet permit to deform the rear expanded portion 232 and therefore, the rear expanded portion 232 can be restrained from strongly pressing the obstacle.

(4) Further, even when an obstacle is accidentally present at a height to a degree the same as that of the instrument panel 216 on the rear side of the instrument panel 216, only the obstacle invades the through hole H which is not closed yet of the air bag 223 developing to the lower side and an influence on the obstacle can be restrained.

Third Embodiment

Next, a third embodiment of the invention will be explained.

Figure 21:
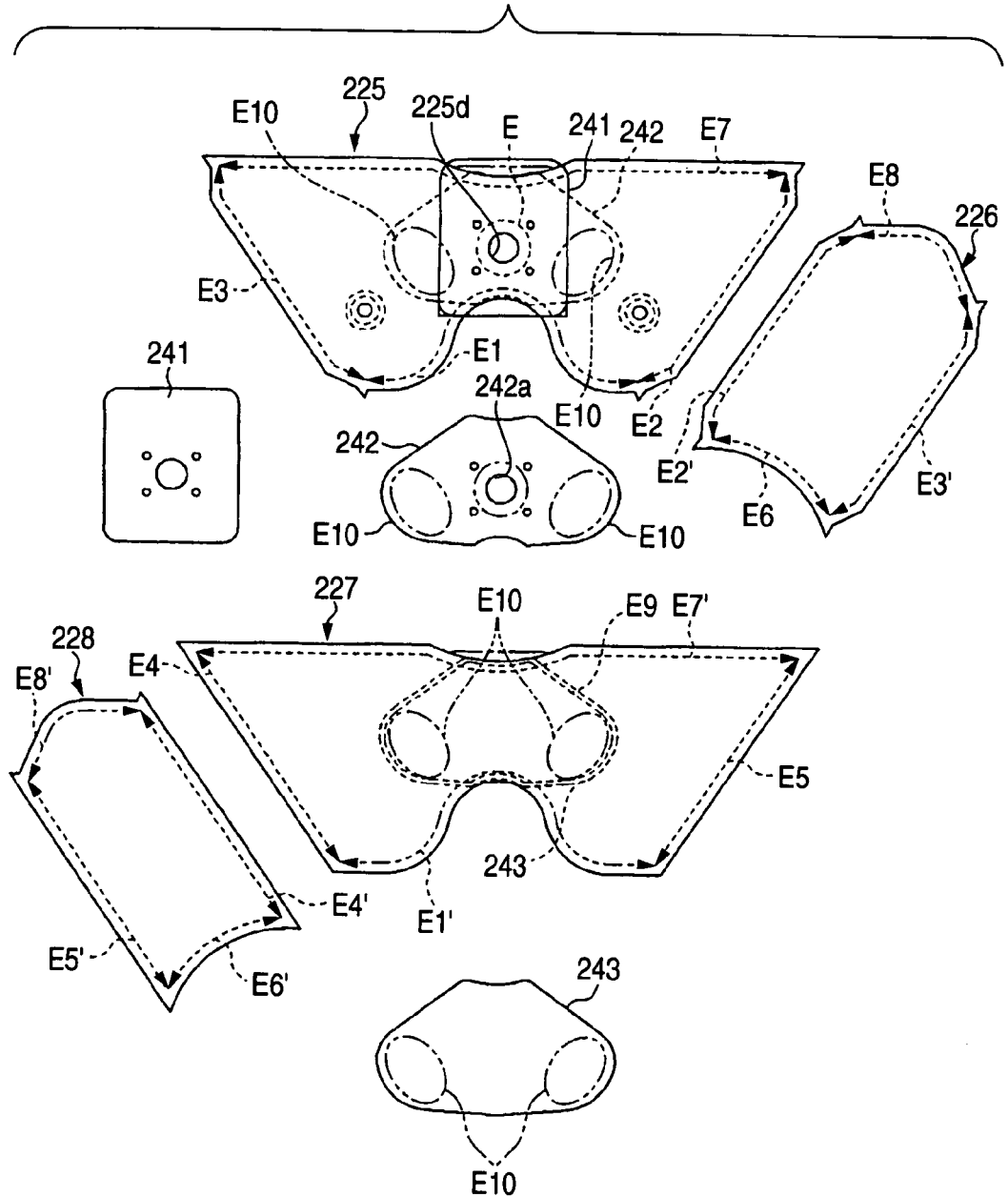
FIG. 21 is a front view of developing respective sheets of an air bag showing a third embodiment of the invention.
Figure 22:
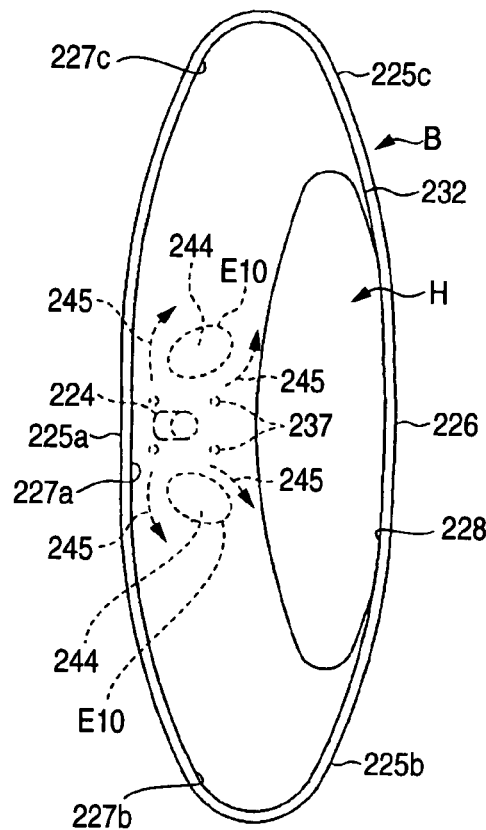
FIG. 22 is a plane view of an initial state of expanding the air bag using the respective sheets shown in FIG. 21.
Figure 23:
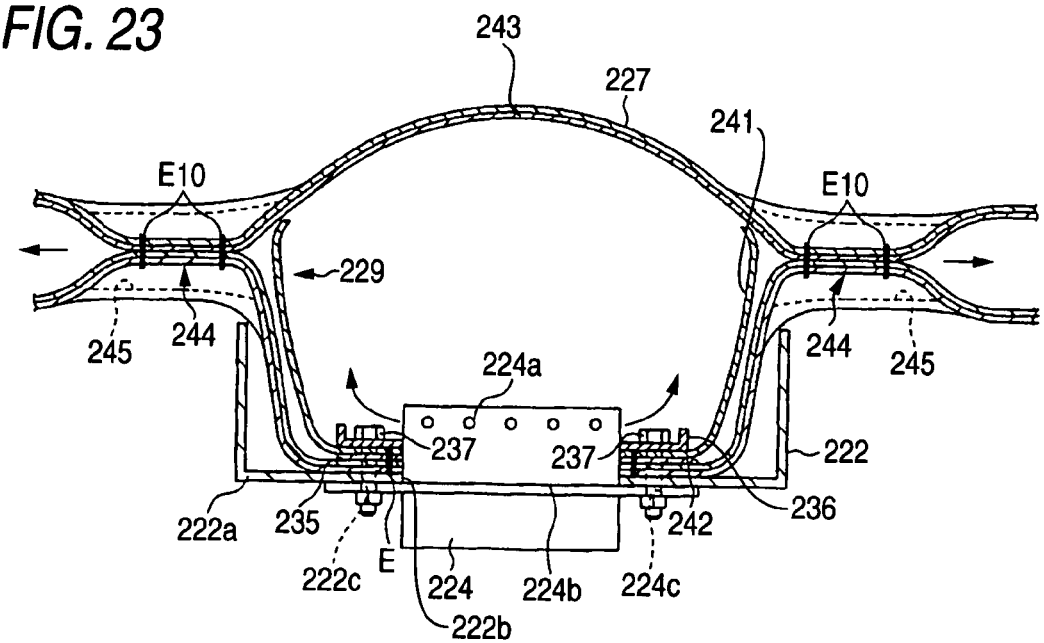
FIG. 23 is an enlarged sectional view passing an inflator and a head and tail integrated portion of FIG. 22.

FIG. 21 is a front view of developing respective sheets and the like constituting the air bag 223, FIG. 22 is a plane view of an initial state of expanding the air bag 223, and FIG. 23 is an enlarged sectional view passing the inflator 224 and a head and tail integrated portion 244 of FIG. 22.

According to the embodiment, the air bag 223 is made to expand to develop in the left and right direction widely in the width direction by deflecting the gas injected from the injecting port 224a of the inflator 224 into the front expanded portion 229 in the left and right direction. In fabricating the air bag 223, as shown by FIG. 21, an outer peripheral edge E9 of a reinforcing cloth 242 is seamed to a side of an inner face of the outer sheet 225 by sewing string. Similar thereto, also an outer peripheral edge E9 of the reinforcing cloth 243 is seamed to an inner face of the inner sheet 227 by sewing string. Next, as shown by FIG. 23, regions E10 in an elliptical shape in correspondence with two left and right side portions of the reinforcing cloths 242, 243 are seamed by sewing string. Thereby, the head and tail integrated portion 244 is formed between the outer sheet 225 and the inner sheet 227 and paths 245 of the gas are formed respectively at two upper and lower side portions of the head and tail integrated portion 244.

According to the embodiment, a deflecting portion is constituted by the head and tail integrated portion 244 and the path 245 of the gas.

According to the embodiment, the gas injected into the front expanded portion 229 can be deflected in the left and right direction and therefore, the left and the right expanded portions 230, 231 are expanded to develop in the vehicle width direction and as shown by FIG. 22, the through hole H is further increased in the vehicle width direction. Therefore, the developing speed of the rear expanded portion 232 to the rear side is further reduced, and even an obstacle disposed on the rear side of the inserted panel is displaced in the vehicle width direction, the obstacle is made to be able to invade the through hole H.

Further, the above-described embodiment may be modified as follows.

Figure 24:
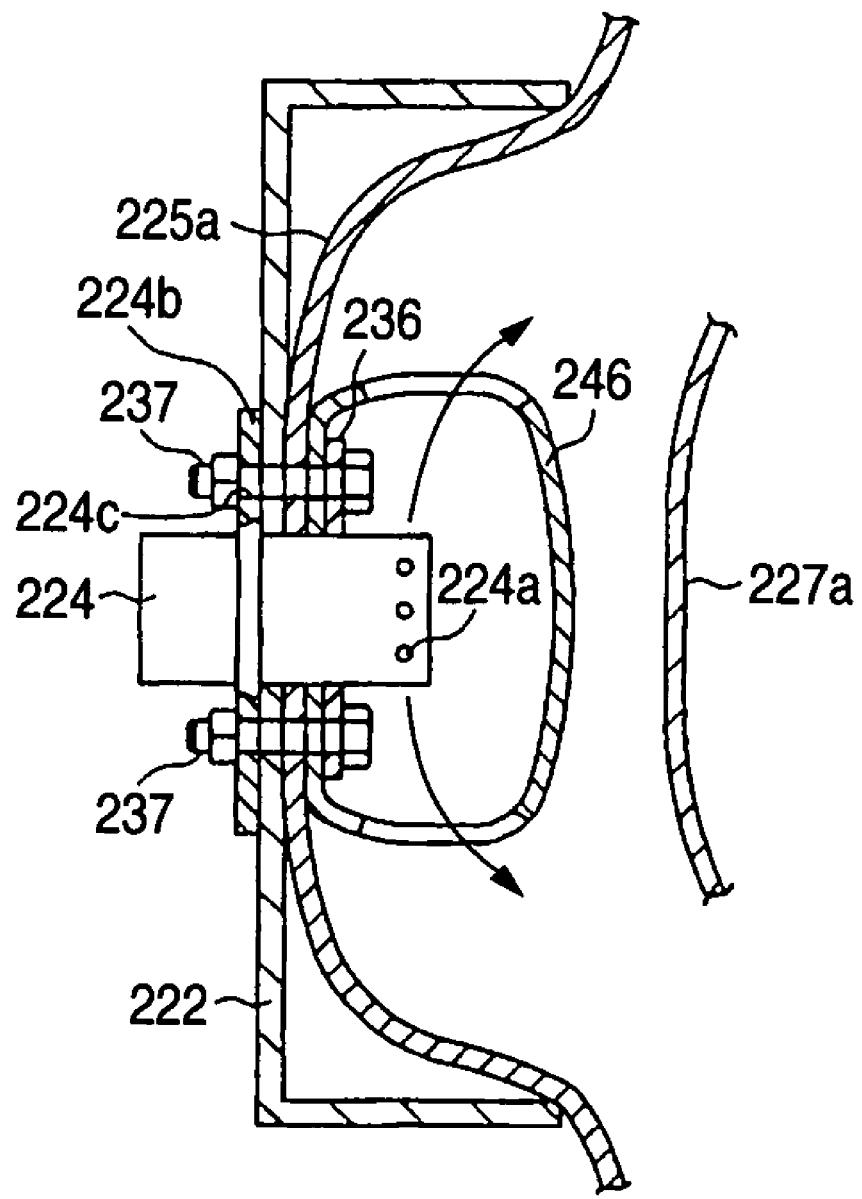
FIG. 24 is a partial sectional view showing other example of the invention.

As shown by FIG. 24, as a deflecting portion, a gas flow deflecting sheet 46 for deflecting flow of the gas in the left and right direction may be provided on a side of the first front outer sheet 225a. Further, the gas flow deflecting sheet 46 and the first front inner sheet 227a may be connected.

Figure 25:
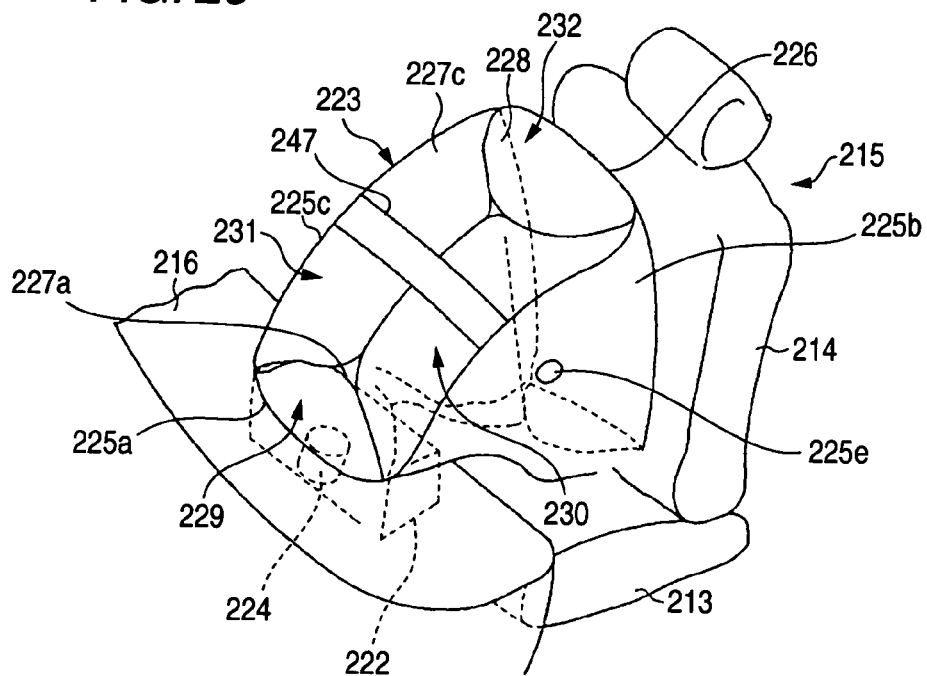
FIG. 25 is a perspective view of an air bag apparatus showing other example of the invention.

As shown by FIG. 25, a tether 247 in a strip-like shape may be connected to upper end edges of the left and the right expanded portions 230, 231 as an upper portion width restricting member. According to the other example, when the passenger invades the rear expanded portion 232 after finishing to expand the air bag, deformation of upper portion of the air bag is further effectively restrained and performance of restraining the passenger is promoted. Although the developing speed of the upper portion of the air bag is more or less accelerated, the through hole H is not closed in the developing procedure and therefore, an effect similar to that of the first embodiment is achieved in restraining an influence on an obstacle.

Figure 26:
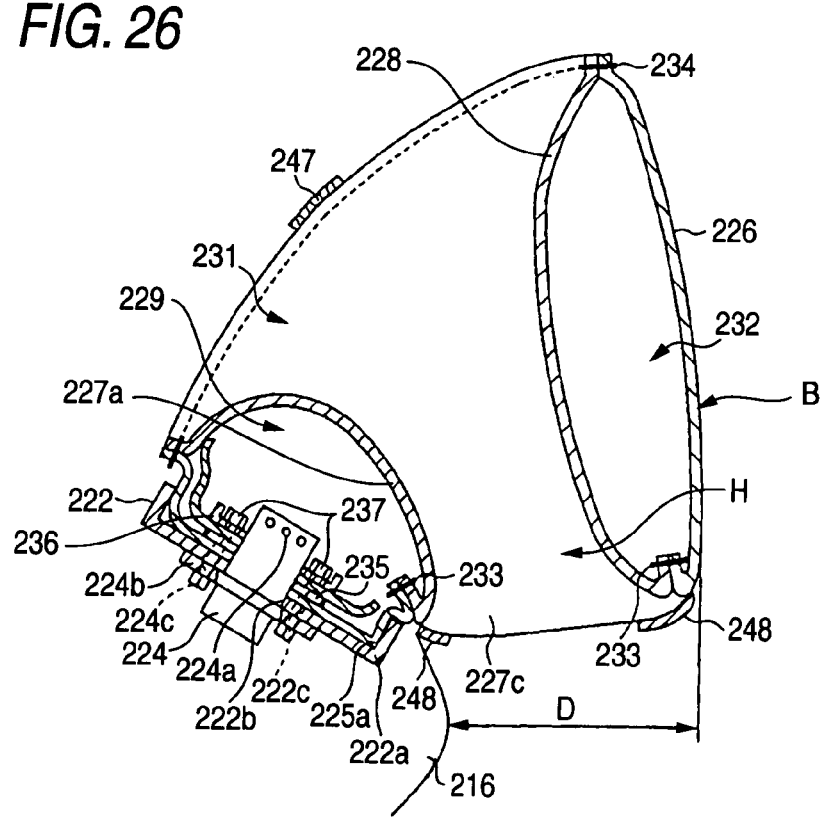
FIG. 26 is a sectional view of an air bag apparatus showing other example of the invention.

As shown by FIG. 26, a tether 248 in a strip-like shape may similarly be connected to a lower end edge of the air bag 223 as a lower portion width restricting member. A position of the tether 248 is set to a rear end portion or a front end portion of the through hole H. When the tether 248 is provided at the rear end portion, the tether 248 is disposed in a region of a half of distance D in the horizontal direction between a rear end of the instrument panel 216 and a rear end of the air bag 223 in the state of finishing to expand the air bag.

According to the other example, deformation of the air bag is further restrained and the performance of restraining the passenger is further promoted.

In other example shown in FIG. 26, lengths of the respective inner sheets 227a, 227b, 227c, 228 in the up and down direction may be made to be longer than those of the outer sheets 225a, 225b, 225c, 226 in correspondence therewith such that a slackened portion is formed at least a portion of contact faces of the first front inner sheet 227a, the left inner sheet 227b, the right inner sheet 227c, and the second front inner sheet 228. In this case, tension of the inner sheet becomes smaller than that of the outer sheet in finishing to expand the air bag, the contact area of the inner sheet is increased and when the passenger invades the rear expanded portion 232 after finishing to expand the air bag, deformation of the air bag is further effectively restrained and the performance of constraining the passenger is promoted.

Either of the front expanded portion 229 and the rear expanded portion 232 may be omitted to form the expanded portion in the cylindrical shape as a whole by the three expanded portions.

Although according to the above-described embodiments, contact interfaces on the inner sides of the front expanded portion 229, the left and right expanded portions 230, 231 and the rear expanded portion 232 are penetrated in the up and down direction, the contact interfaces may be constituted to close at the upper portion.

As has been described in details, according to the invention, the degree of freedom of mounting to the vehicle is high and an initial developing speed of the air bag can be reduced.

Fourth Embodiment

Figure 27:
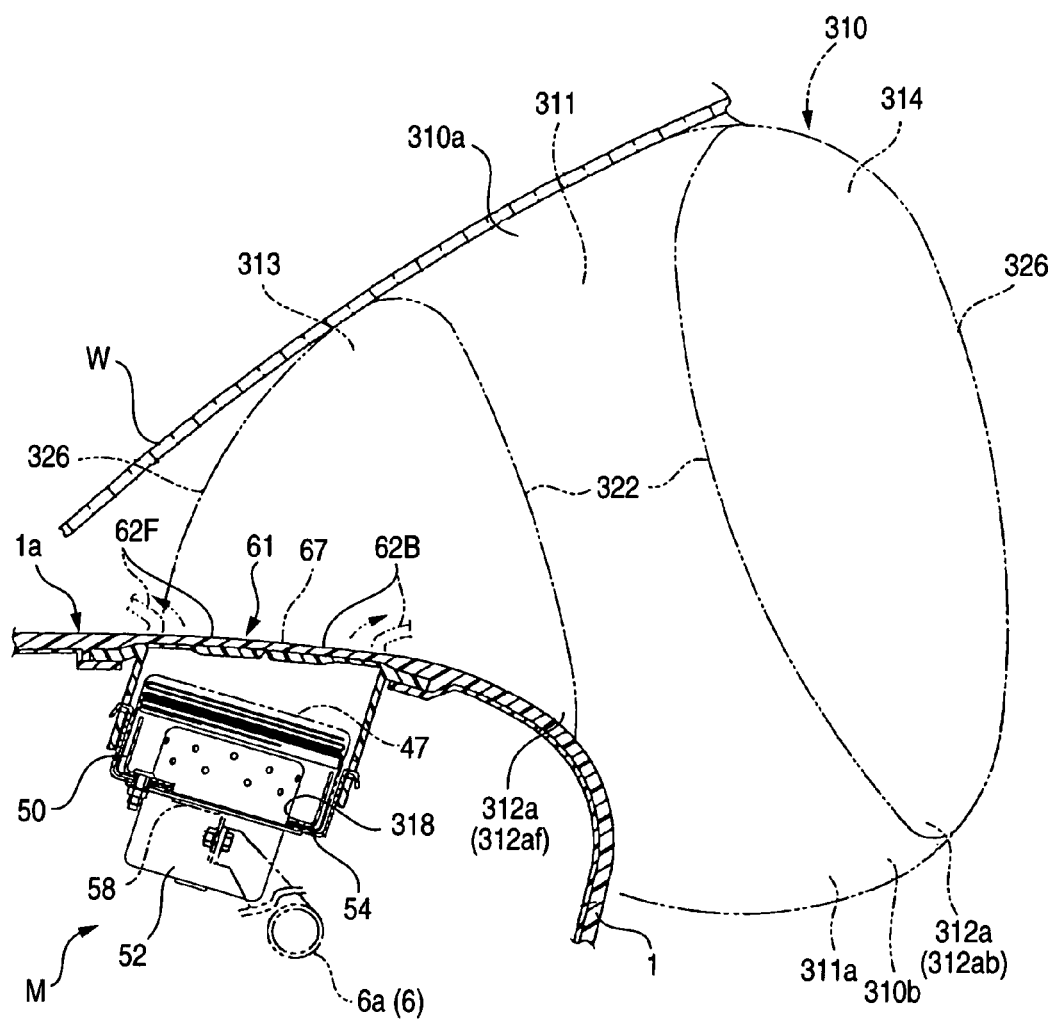
FIG. 27 is an outline vertical sectional view showing a state of mounting an air bag apparatus according to a fourth embodiment of the invention to a vehicle.
Figure 28A:
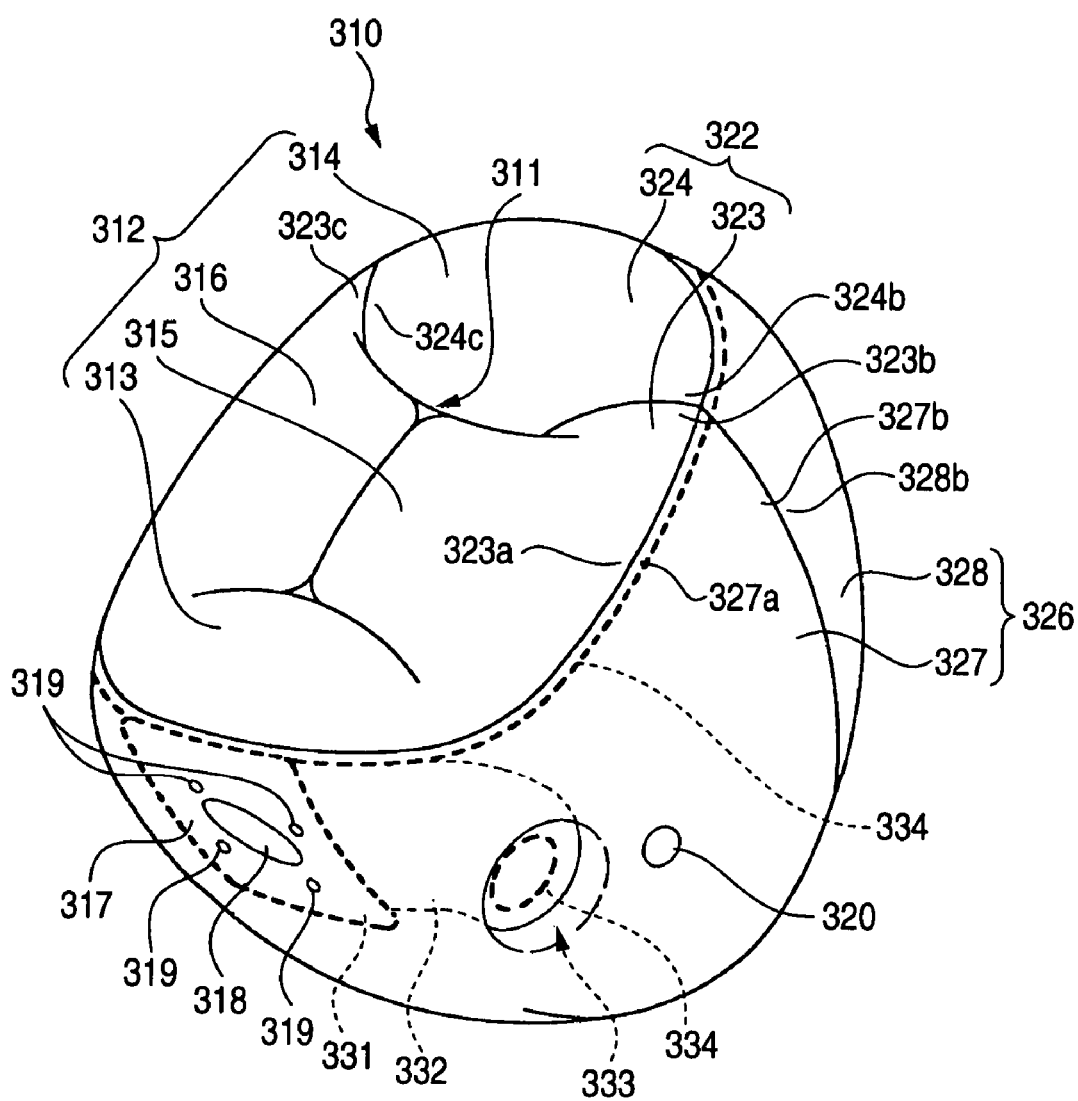
FIG. 28A is a perspective view showing a state of expanding a single member of an air bag used in the air bag apparatus of the fourth embodiment of the invention.
Figure 28B:
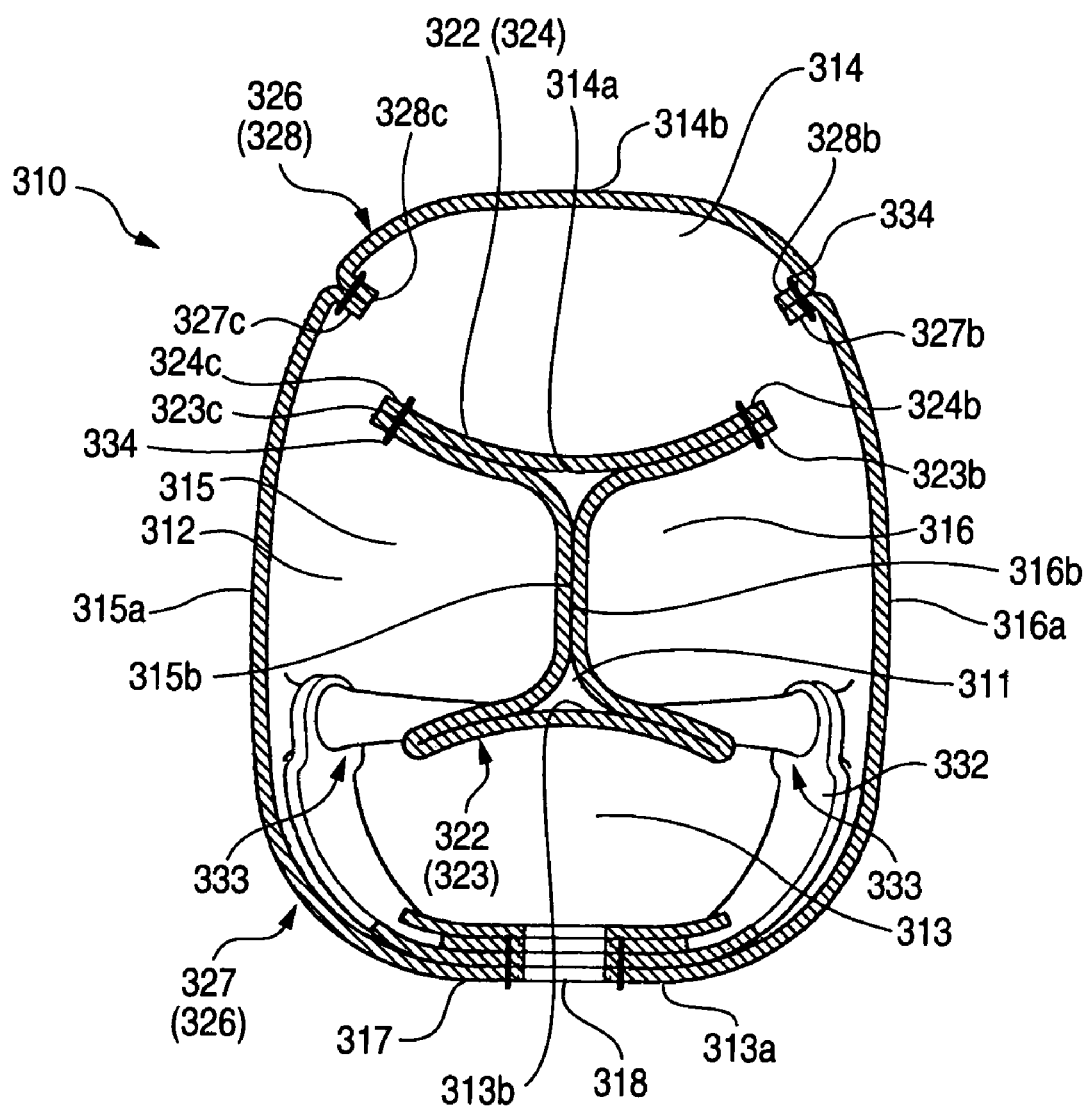
FIG. 28B is a cross-sectional view of an outline of the state of expanding the single member of the air bag according to the forth embodiment of the invention.

As shown by FIGS. 27, 28A and 28B, the air bag 310 is constituted as a ring-like member constituted by a shape of expanding in a shape of substantially a square prism constituting a bottom face by a wall portion 328 on a side of a passenger and narrowed to a front side, further, arranged with a through hole 311 penetrated substantially in an up and down direction from a front upper portion 310a to a rear lower portion 310b in finishing to expand the air bag and finishing expansion to close through hole 311 by an expanding base cloth 322 at a surrounding thereof. That is, according to the air bag 310, a ring-like main body portion 312 expanded to bulge is constituted by a front expanded portion 313, a rear expanded portion 314, a left expanded portion 315 and a right expanded portion 316 at a surrounding of the through hole 311.

Further, a sheet member constituting the ring-like main body portion 312 is constituted by including an inner peripheral side base cloth 322 disposed on an inner peripheral side of the through hole 311, and an outer peripheral side base cloth 326 disposed on an outer peripheral face side of the air bag 310 to be opposed to the inner peripheral side base cloth 322 in finishing to expand the air bag. Further, the inner peripheral side base cloth 322 is constituted by a first inner side base cloth 323 on a front side a side of a lower edge 323d of which is recessed considerably, and a second inner side base cloth 324 in a shape of a rectangular shape on a rear side. Further, the outer peripheral side base cloth 326 is constituted by a first outer side base cloth 327 on a front side a side of a lower edge 327a of which is recessed considerably, and a second outer side base cloth 328 in a shape of a rectangular plate for constituting a passenger side wall portion on the rear side. The base cloths 323, 324, 327, 328 are formed by flexible woven cloths of polyester string or polyamide string or the like along with reinforcing cloths 330, 331, 332, mentioned later, as noncoated cloths on which a coating agent of silicone or the like is not coated. The first inner side base cloth 323 is constituted by arranging portions constituting sides of inner faces 315b, 316b of the left expanded portion 315 and the right expanded portion 316 to extend to both left and right sides on skewed upper rear sides from a portion constituting a side of a rear face 313b of the front expanded portion 313. The first outer side base cloth 327 is constituted by arranging portions constituting sides of outer faces 315a, 316a of the left expanded portion 315 and the right expanded portion 316 to extend to both left and right sides on skewed upper rear sides from a portion constituting a side of a front face 313a of the front expanded portion 313. The second inner side base cloth 324 becomes a portion constituting a front face 314a of the rear expanded portion 314 and the second outer base cloth 328 becomes a portion constituting a rear face 314b of the rear expanded portion 314.

Further, a gas flow inlet 318 which is opened in a circular shape to flow an expanding gas G and a peripheral edge 317 of which is attached to the case 54 is arranged at a portion constituting a side of the front face 313a of the front expanded portion 313 by constituting a center in a left and right direction of the outer peripheral side base cloth 326 of the air bag 310. The peripheral edge 317 of the gas flow inlet 318 is formed with a plurality of attaching holes 319 for attaching the flow inlet peripheral edge 317 to the bottom wall portion 55 of the case 54. The flow inlet peripheral edge 317 on a side of an inner peripheral face of the air bag 310 is seamed to arranged with two sheet of reinforcing cloths 330, 332 and a reinforcing cloth 331 protecting a seamed portion is arranged on a side of an upper face of the reinforcing cloth 330 without being seamed thereto. Also the respective reinforcing cloths 330, 331, 332 are arranged with the gas flow inlet 318 and the attaching hole 319. Furthermore, the outer peripheral side base cloth 326 is opened with vent holes 320 for discharging an extra expanding gas at portions of the left and right expanded portions 315 and 316.

Figure 35:
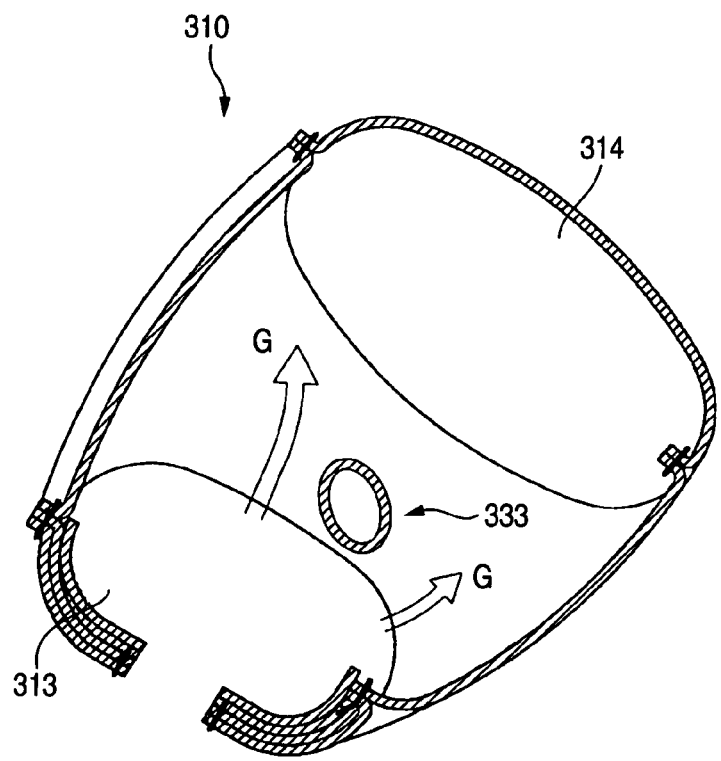
FIG. 35 is a view for explaining operation of a rectifying portion of the air bag of the fourth embodiment of the invention.
Figure 36:
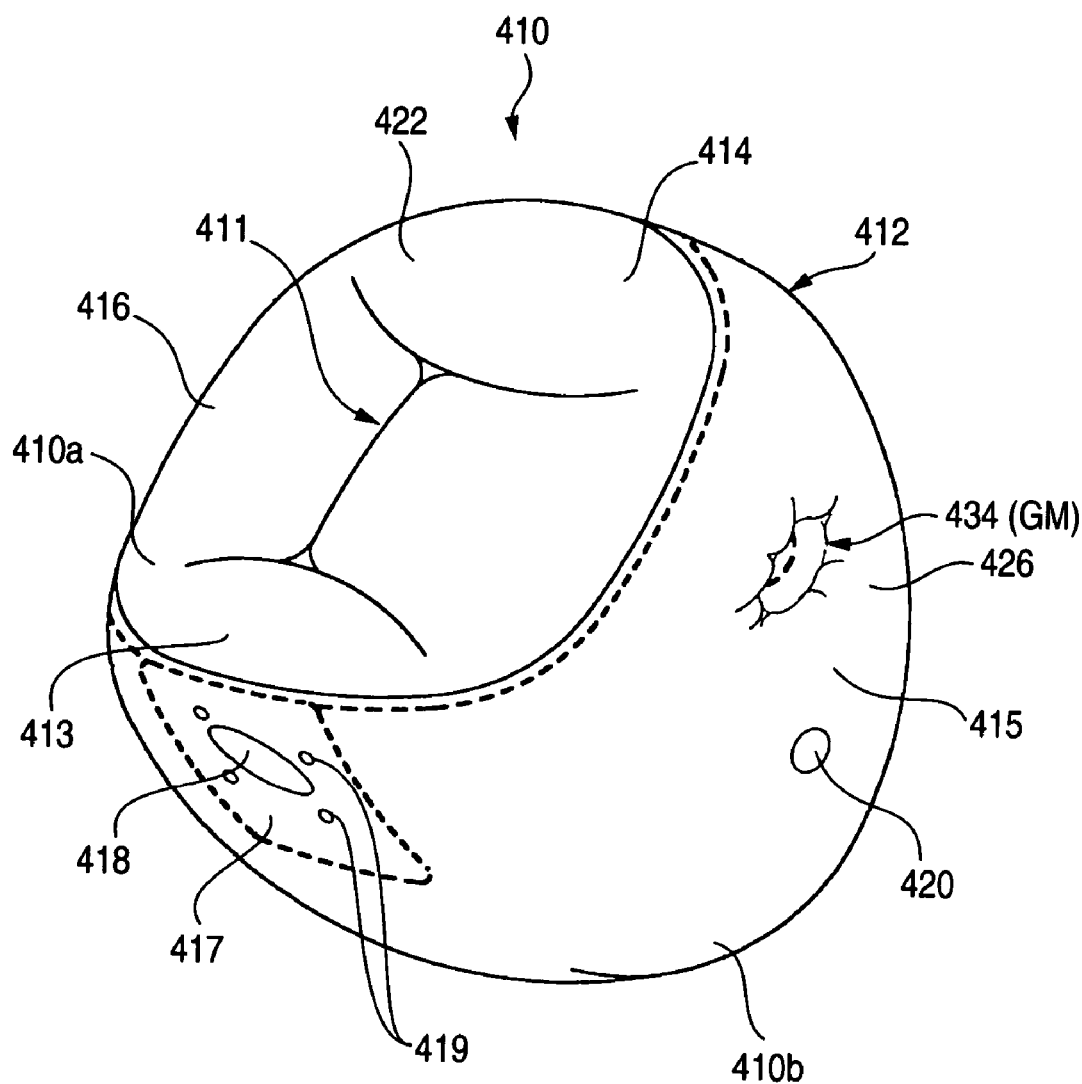
FIG. 36 is a perspective view of a state of expanding a single member of the air bag used in a fifth embodiment of the invention.
Figure 37:
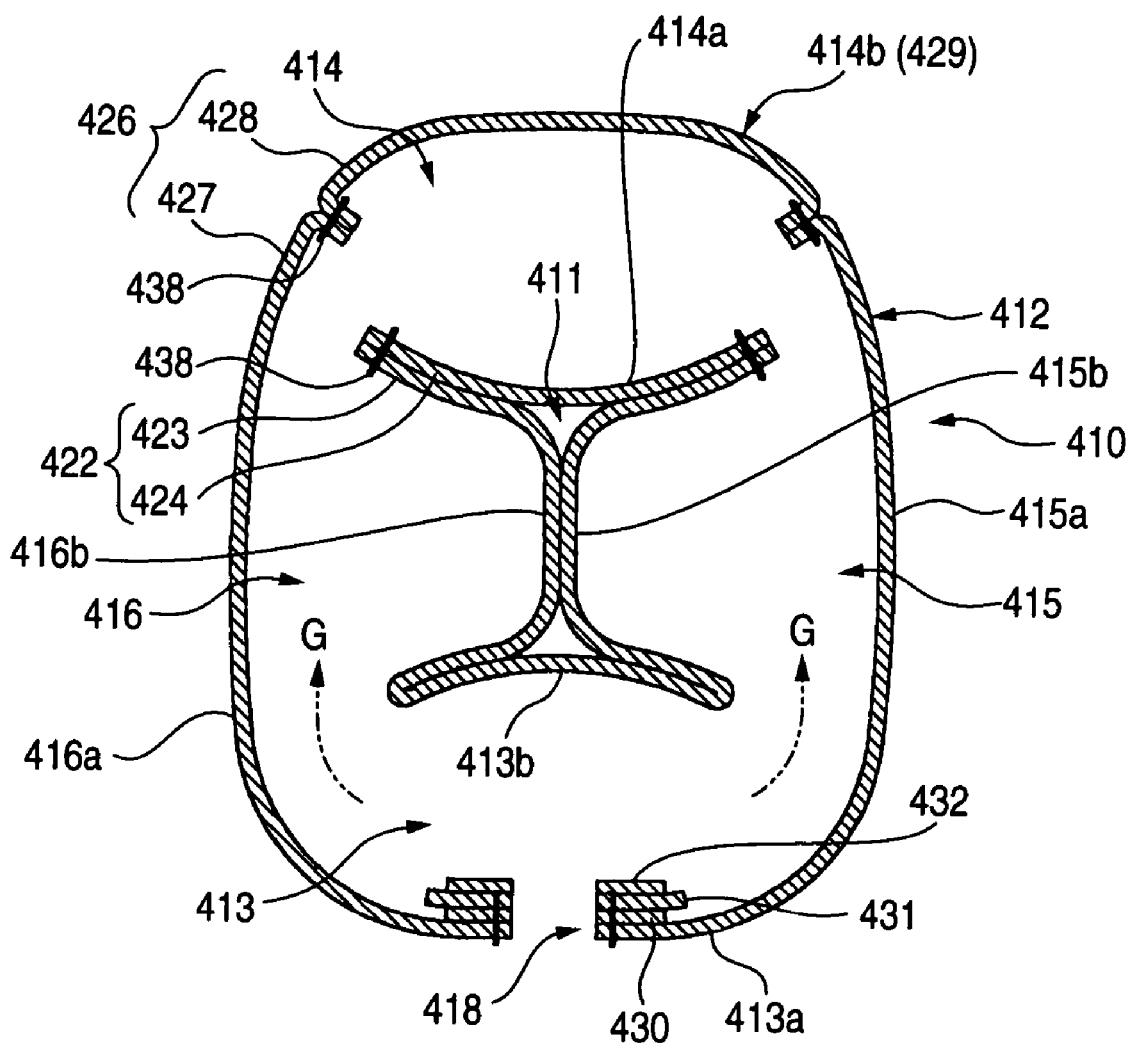
FIG. 37 is a sectional view in the front and rear direction of the state of expanding the single member of the air bag used in the fifth embodiment of the invention.

Further, the air bag 310 is formed with a rectifying portion 333 to branch the expanding gas G in the up and down direction at vicinities of boundary portions of the front expanded portion 313 and the left and the right expanded portions 314 and 315. The rectifying portions 333, 333 are formed by seaming to bond the inner peripheral side base cloth 322 and the outer peripheral side base cloth 326 in an elliptical shape by interposing the reinforcing cloth 332. As shown in FIG. 35, the rectifying portions 333 rectify the expanding gas G by branching the expanding, gas G in the up and down direction then passing to the back side, while passing the expanding gas G to the upper side mostly.

Further, in forming the ring-like main body portion 312, in the case of the embodiment, the ring-like main body portion 312 is formed by seaming using seaming string 334 of polyester string or the like, first, lower edges 323d and 327d of the first inner side base cloth 323 and the first outer side base cloth 327 are seamed, successively, a left edge 324b of the second inner side base cloth 324 and an edge 23b on a left end side of the first inner side base cloth 323 are seamed, a right edge 327a of the second inner side base cloth 324 and an edge 323c on a right end side of the first inner side base cloth 323 are seamed to thereby form the inner peripheral side base cloth 322 in the ring-like shape, further, a left edge 328b of the second outer base cloth 328 and an edge 327b of left end side of the first outer side base cloth 327 are seamed, and a right edge 328c of the second outer base cloth 328 and an edge 327c on a right end side of the first outer side base cloth 327 are seamed to thereby form the outer peripheral side base cloth 327 in the ring-like shape. Further, the reinforcing cloths 330 and 332 are previously seamed at the first outer side base cloth 327. The gas flow inlet 318 and the attaching hole 319 may respectively be formed to the base cloth 327 and the reinforcing cloths 330, 331 and 332, or after seaming the base cloth 327 and the reinforcing cloths 330 and 332 and mounting the reinforcing cloth 331, the gas flow inlet 318 and the attaching holes 319 may integrally be formed by boring.

Successively, a lower edge 324d of the second inner side base cloth 324 of the inner peripheral side base cloth 322 and a lower edge 328d of the second outer base cloth 328 of the outer peripheral side base cloth 322 are seamed, the base cloths 322 and 326 are inverted such that seam margins of seamed portions are not exposed to the outer peripheral face of the air bag 310, further, upper edges 323a and 327a of the first inner side base cloth 323 and the first outer side base cloth 327 are seamed and upper edges 324a and 328a of the second inner base cloth and the second outer base cloth 328 are seamed.

Further, when the rectifying portions 333, 333 are formed by seaming the inner peripheral side base cloth 322 and the outer peripheral side base cloth 326 at vicinities of front ends of the left and the right expanded portions 315 and 316, the ring-like main body portion 312 (air bag 310) of the embodiment can be formed.

Explaining mounting of the air bag 310 fabricated as described above to the vehicle, first, the air bag 310 is folded in a state of arranging the retainer 50 at inside thereof to project the bolts 50b on the respective attaching holes 319 and the folded air bag 310 is wrapped by a breakable wrapping sheet 47 (refer to FIG. 2) such that the air bag 310 is not unfolded. Further, in folding the air bag, the air bag is folded after being processed by a transversely folding step and a vertically folding step after having been processed by a previously folding step.

Figure 29A:
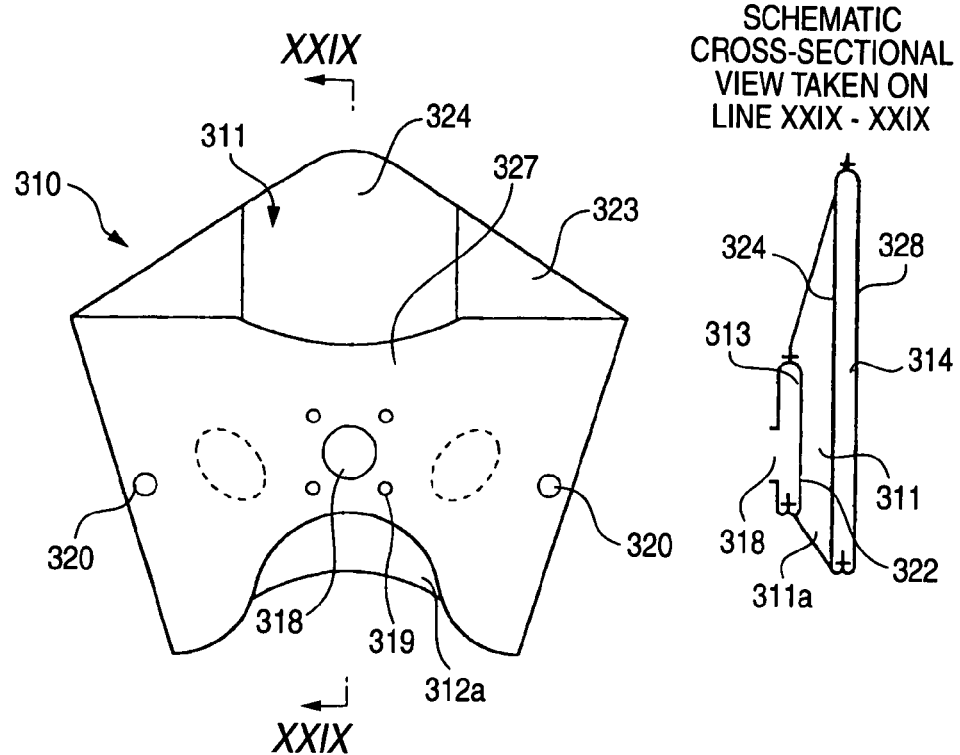
FIGS. 29A and 29B illustrate views explaining a step of previously folding the air bag of the fourth embodiment of the invention and FIG. 29A illustrates views which are a view viewed from a side of a gas flow inlet of the air bag and FIG. 29B illustrates a view viewed from a side of a wall portion of a side of a passenger.
Figure 29B:
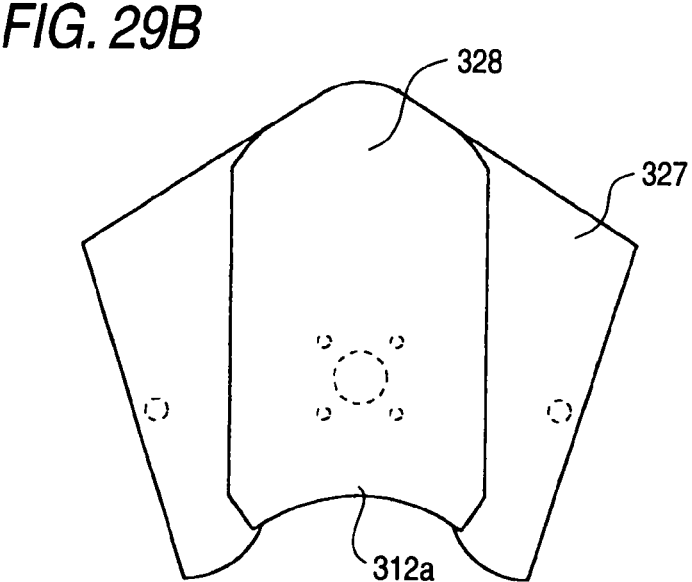
Figure 33:
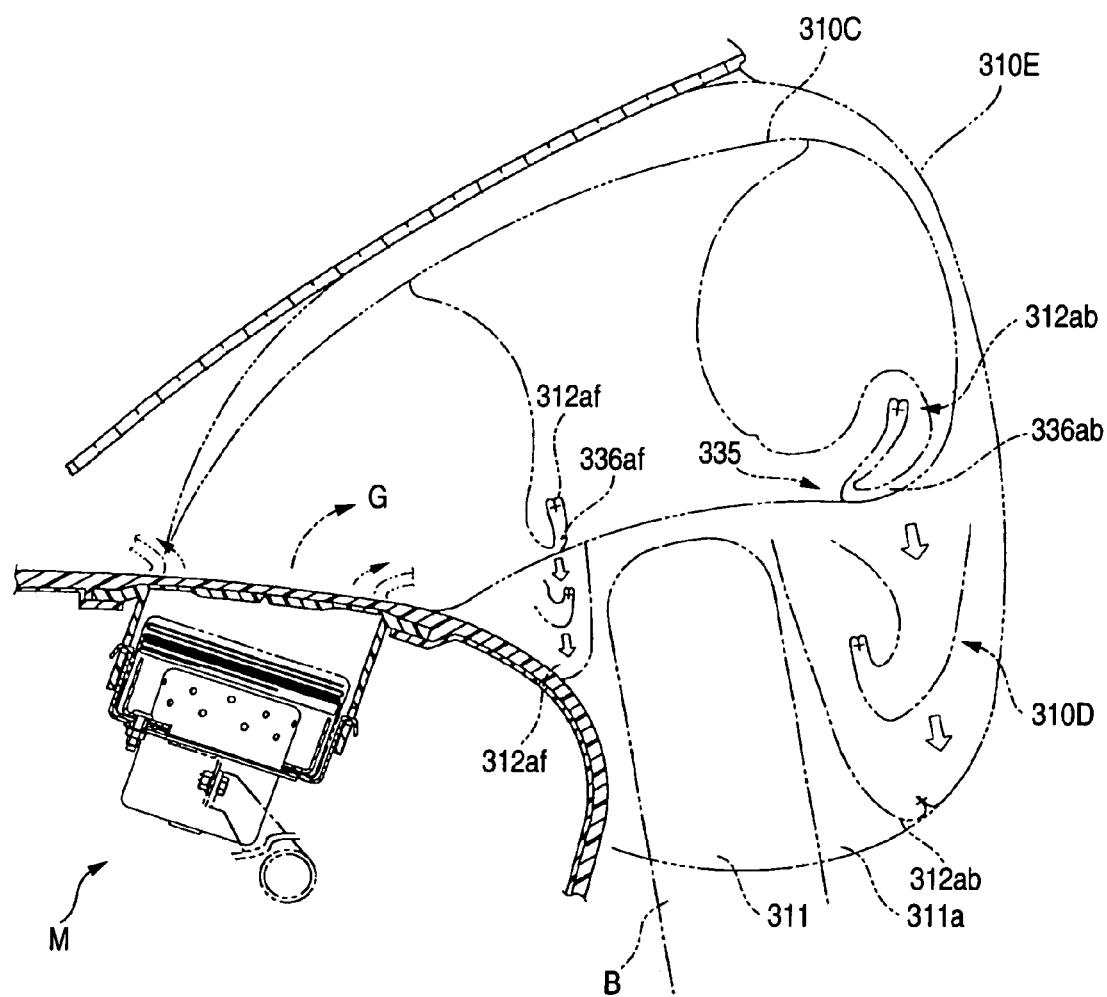
FIG. 33 is a view for explaining the air bag apparatus of the fourth embodiment of the invention when the air bag apparatus is operated, showing a state after FIG. 32.

In the previously folding step, a previously folded air bag 336 as shown by FIG. 30 is formed. In the previously folding step, first, basically, as shown by FIG. 29, in a state of not expanding the air bag 310 (ring-like main body portion 312), the gas flow inlet 318 is disposed on a side of a lower face thereof, the inner peripheral side base cloth 322 is interposed above the gas flow inlet 318, and the outer peripheral side base cloth 326 is arranged to develop flatly substantially symmetrically in the left and right direction. Further, at this occasion, as shown by FIG. 30, the lower side peripheral edge 312a of the through hole 311 in finishing to expand the air bag is folded back to the upper side 311b in the through hole 311 to thereby form a folded-back portion 335. A front center 336af of a lower edge 336a after having been folded back is disposed at a position at a vicinity of the flow inlet peripheral edge 317 pressed by the retainer 50 and an amount of folding back a rear side 312ab is made to be larger than that of a front side 312af of a lower peripheral edge 312a such that the rear center 336ab is disposed on an upper side of the front center 336af in a state immediately before resolving the creases of the folded-back portions by constituting a state of opening the through hole 311 in expanding the air bag 310 substantially in a circular shape as shown by FIG. 33.

Figure 31A:
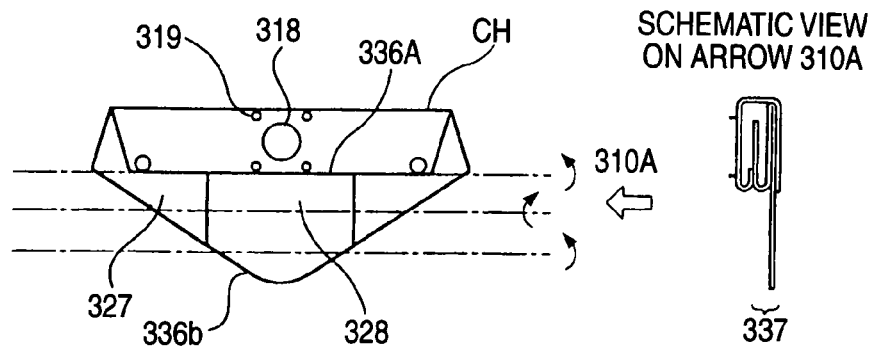
FIGS. 31A to 31C illustrate views for explaining a step of transversely folding and a step of vertical folding the air bag of the fourth embodiment of the invention.
Figure 31B:
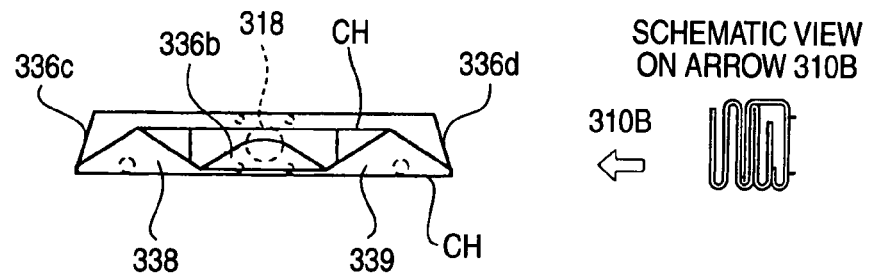
Figure 31C:
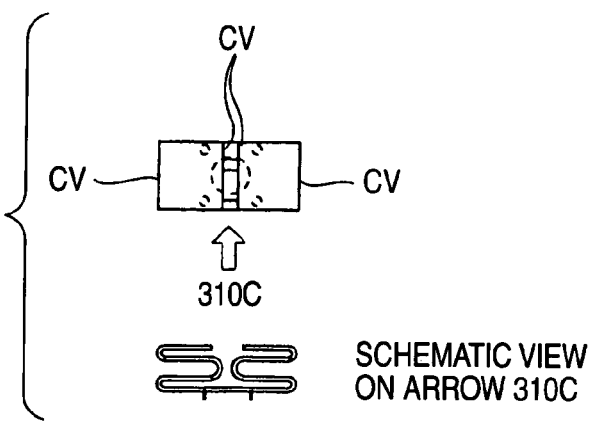

After the previously folding step, the previously folded air bag 336 is folded by the laterally folding step of narrowing a width direction in the front and rear direction centering on the gas flow inlet 318 by making a crease CH in the left and right direction in order to constitute a dimension capable of being contained in the case 54 as shown by FIGS. 31A and 31B and the vertically folding step of narrowing a width direction in the left and right direction by making a crease CV in the front and rear direction as shown by FIG. 31C. In the case of the embodiment, in the laterally folded step, a portion 337 frontward from the gas flow inlet 318 (refer to FIGS. 30 and 31A) is arranged at a position on an upper side of the gas flow inlet 318 by being folded in bellows such that a side of a front edge 336b is made to be proximate to the gas flow inlet 318. Further, in the vertically folding step, portions 338 and 339 on sides of left and right edges 336c and 336d are folded in bellows to arrange at a position upward from the gas flow inlet 318 such that the sides of the left and right edges 336c and 336d are made to be proximate to the gas flow inlet 318.

Further, when the air bag 310 is finished to fold after having been processed by the vertical folding step, as described above, the folded air bag 310 is wrapped by the breakable wrapping sheet 47 such that the air bag is not unfolded.

Thereafter, the folded air bag 310 is mounted above the bottom wall portion 55 of the case 54 while inserting the respective bolts 50b into the attaching holes 57 from above. Successively, the upper portion of the main body portion 52a of the inflator 52 is inserted into the inserting hole 56, the gas flow inlet 318 and the base portion 50a of the retainer 50 from below and the respective bolts 50b projected to the lower side from the bottom wall portion 55 are inserted into the attaching holes 52d of the flange portion 52c of the inflator 52. Thereafter, when the nuts 42 are fastened to the respective bolts 50b projected from the flange portion 52c of the inflator 52, the folded air bag 310 and the inflator 52 can be attached to the bottom wall portion 55 of the case 54.

Thereafter, the side wall portion 50 of the case 54 is inserted into the connecting wall portion 65 of the air bag cover 61 in the instrument panel 1 mounted to the vehicle, and the respective locking claws 60 of the case 54 are inserted into the locking holes 66 of the connecting wall portion 65 to thereby lock the respective locking claws 60 by the connecting wall portion 65. Furthermore, when the bolts 7 are fastened to the nuts 58a of the respective brackets 58 via the attaching seats 6c, the air bag apparatus M can be mounted to the vehicle.

Further, in mounting the air bag apparatus M to the vehicle, the air bag apparatus M may be mounted to the vehicle by integrating the case 54 attached with the air bag 310 and the inflator 52 previously to the air bag cover 61 of the instrument panel 1 and connecting to fix the air bag apparatus M to a side of the body 6 by utilizing the bolts 7 in attaching the instrument panel 1 to the vehicle.

After mounting the air bag apparatus M to the vehicle, when the expanding gas G is delivered from the respective gas delivering ports 52b of the inflator 52, the air bag 310 is expanded to break the wrapping sheet 47 and break the portion 64 to be broken of the air bag cover 61 to thereby open the door portions 62F and 62B as shown by two-dotted chain lines of FIG. 27 to thereby considerably project the air bag 310 from an opening 59 opened with the door portions 62F and 62B of the air bag cover 61. Further, the air bag is finished to expand and the extra expanding gas G is discharged from the vent holes 320. Further, a member of notation W of FIG. 27 designates a windshield.

According to the air bag apparatus M of the embodiment, the air bag 310 is constituted as the ring-like main body portion 312 including the through hole 311 from the front upper portion 310a to the rear lower portion 310b in finishing to expand the air bag and is constituted by arranging the gas flow inlet 318 the peripheral edge 317 of which is attached to the case 54 and which is opened for making the expanding gas G flow thereinto on the side of the front face 313a of the outer peripheral side base cloth 326 of the main body portion 312. Therefore, at the initial stage of expanding the air bag 310, when the expanding gas G from the inflator 52 inserted into the gas flow inlet 318 is made to flow from the front expanded portion 313 to the left and right expanded portions 315 and 316 in the left and right direction, the crease CV in the vertical folding and the crease CH in the transverse folding are resolved, as shown by air bags 310A, 310B, 310C, 310D and 310E illustrated to expand in an order to FIGS. 32, 33, 34, the air bag is expanded to constitute a state of widening the opening 311a on the lower side of the through hole 311 and finish to expand while moving the rear expanded portion 314 from the upper side to the lower side.

Figure 32:
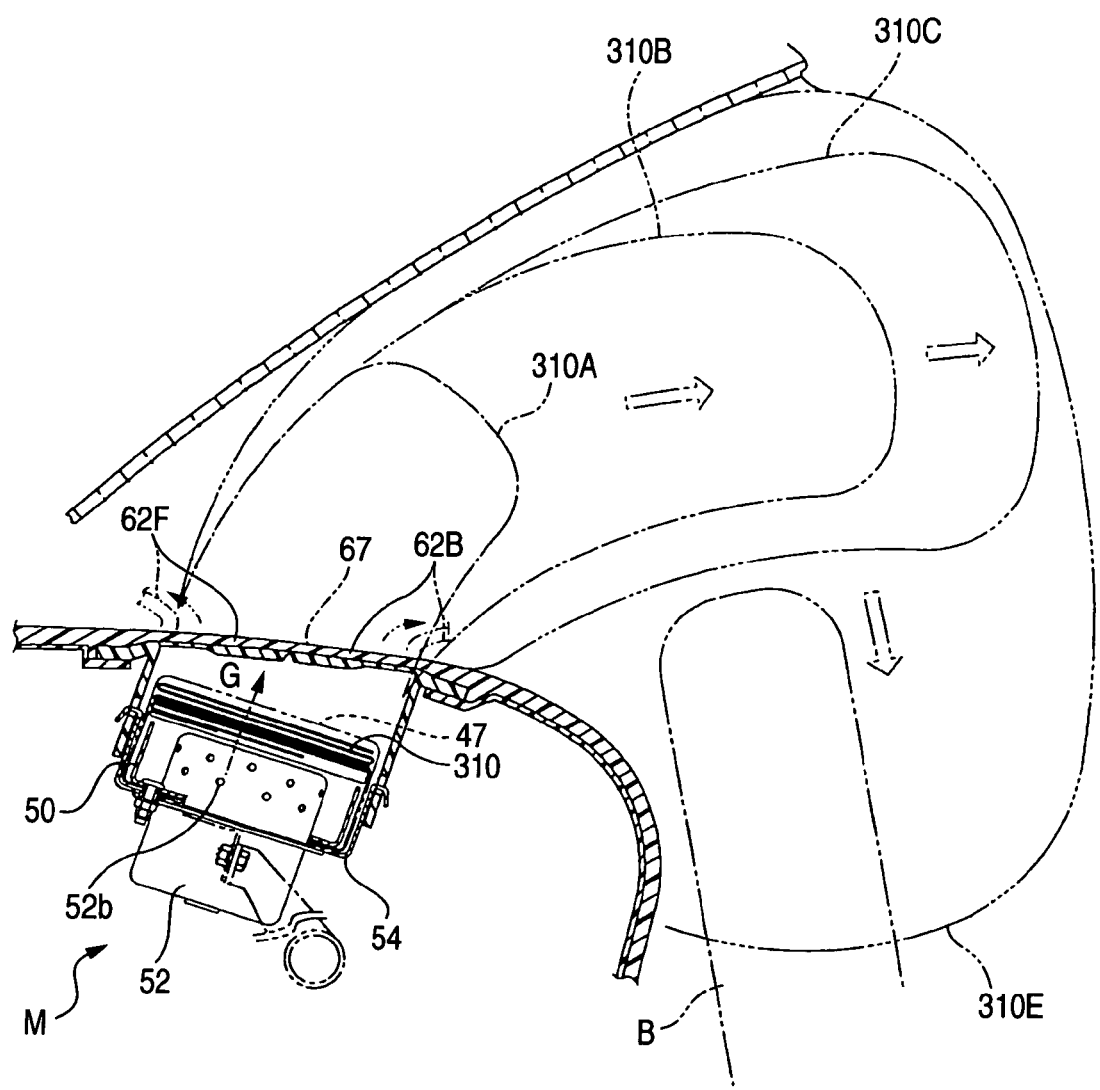
FIG. 32 is a view of the air bag apparatus of the fourth embodiment of the invention when the air bag apparatus is operated.

That is, according to the air bag 310, as shown by the air bags 310A, 310B, 310C, 310D and 310E shown in FIGS. 32 and 33, the lower peripheral edge 312a of the through hole 311 is moved from the upper side to the lower side, further, the air bag 310 finish to expand to close the through hole 311 by resolving the creases of the folded-back portion 335 and therefore, before closing the through hole 311, even when there is an obstacle B having a height up to a vicinity of the upper face 1a of the instrument panel 1 at a vicinity of the instrument panel 1, the air bag 310 can insert the obstacle B from the lower side into the through hole 311. That is, the air bag 310 finish to expand while restraining interference with the obstacle B to strongly push down the obstacle B or to push the obstacle B to the rear side of the vehicle.

Figure 34:
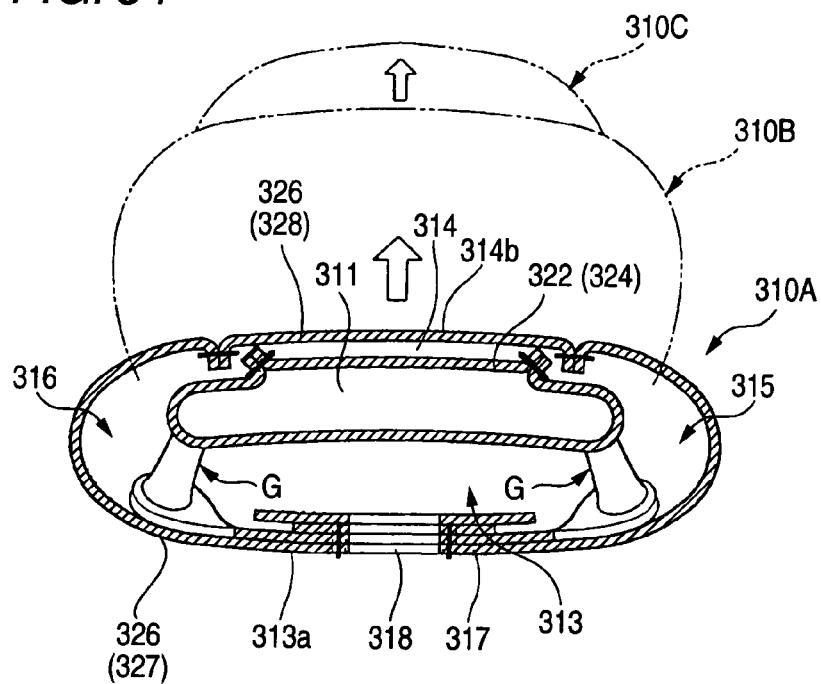
FIG. 34 is an outline cross-sectional view for explaining an initial state of expanding the air bag of the fourth embodiment of the invention.

Further, even when there is not the obstacle B, the air bag 310 is constituted by the ring-like shape when the expanding gas G is made to flow from the gas flow inlet 318 and therefore, as shown by the air bags 310A, 310B and 310C shown in FIG. 34, the expanding gas G is made to flow to both left and right sides between the outer peripheral side base cloth 326 and the inner peripheral side base cloth 322 to thereby widen the passenger side wall portion 328 and a portion proximate thereto of the outer peripheral side base cloth 326 in the left and right direction while opening the through hole 311 to move to the rear aside of the vehicle and therefore, even when the passenger seated by arranging the back at a vicinity of a backrest portion of a seat, that is, the passenger seated at a vicinity of a proper position moves forward, the passenger can precisely be constrained by portions on the side of the passenger widths of which are widened in the left and right direction, that is, the wall portion 328 per se and the first outer peripheral side base cloth 327 at the vicinity of the wall portion 328 without partially operating the pressing force.

Therefore, according to the air bag apparatus M for a passenger seat of the embodiment, the air bag 310 expanding to develop can constrain the passenger at the vicinity of the proper position by the wide face and even when the obstacle B having the height up to the vicinity of the upper face 1a of the instrument panel 1 is arranged, interference with the obstacle B can be restrained by inserting the obstacle B into the through hole 311.

Further, according to the air bag 310 of the embodiment, in folding the air bag, in the state of not expanding the air bag, the lower peripheral edge 311a of the through hole 311 is folded back to the upper side 311b, the gas flow inlet 318 is brought into the state of being disposed on the side of the lower face, the outer peripheral side base cloth 326 is arranged above the gas flow inlet 318 by interposing the inner peripheral side base cloth 322, the air bag is previously folded to develop flatly substantially symmetrically in the left and right direction, and the air bag is folded by the lateral folding narrowing the width direction in the front and rear direction centering on the gas flow inlet 318 by making the crease CH in the left and right direction and by the vertical folding of narrowing the width dimension in the left and right direction by making the crease CV in the front and rear direction to constitute the dimension which can be contained into the case 54 from the previously folded states.

When the air bag 310 is folded in this way, the air bag 310 in expanding the air bag can open the through hole 311 in the state in which expanding gas is not made to flow to the folded-back portion 335 at the lower peripheral edge 312a of the through hole 311 and therefore, in comparison with the case in which lower opening 311a of the through hole 311 is expanded without folding back the lower peripheral edge 312a of the through hole 311, the air bag can be opened by a wide inner diameter dimension, the obstacle can be further facilitated to insert into the through hole 311 and the air bag 310 can finish to expand by further restraining interference with the obstacle B of pushing down the obstacle B or pushing the obstacle B to the rear side of the vehicle. Further, the air bag 310 folded in this way is facilitated to provide a mode of finishing to expand by moving the lower peripheral edge 312a of the through hole 311 from the upper side to the lower side by expanding the folded-back portion 335 on the lower side after expanding the portion upward from the folded-back portion 335.

Further, as shown by FIG. 35, the air bag 310 of the embodiment is provided with the rectifying portions 333 as rectifying unit for restricting flow of the gas G such that the expanding gas G is branched in the up and down direction and made to flow more out to the upper side, in expanding the air bag 310, the mode of finishing to expand by moving the lower peripheral edge 312a of the through hole 311 from the upper side to the lower side, that is, a mode of moving to rotate the rear expanded portion 314 to the lower side by constituting a center of rotation by a vicinity of the peripheral edge 317 of the gas flow inlet 318 is easy to provide. Further, such the rectifying portion 333 can be constituted by a tether for restricting flow of the gas G by connecting the base cloths 322 and 326 to each other, or a rectifying cloth in a cylindrical shape for guiding the gas G.

Furthermore, the mode of finishing to expand by moving the lower peripheral edge 312a of the through hole 311 from the upper side to the lower side in expanding the air bag 310 (the mode of moving to rotate the rear expanded portion 314 to the lower side by constituting the center of rotation by the vicinity of the peripheral edge 317 of the gas flow inlet 318) can be achieved even when the side of the upper edge 328a of the passenger side wall portion 328 is previously folded to be opposed to the gas flow inlet 318 in the previously folding and the air bag is constituted to finish to expand by disposing the side of the upper edge 328a of the passenger side wall portion 328 swiftly to the upper side such as the rear face 314b of the rear expanded portion 314 is made to be along substantially the vertical direction in expanding the air bag and the above-described mode can be provided even by the folding means for previously folding the air bag in this way.

Further, a single or a plurality of the through holes 311 penetrated substantially in the up and down direction of the air bag 310 may be partially set on the inner peripheral side of the inner peripheral side base cloth 322 by seaming portions of the inner peripheral side base cloth 322 to bond.

Fifth Embodiment

As shown by FIGS. 36 through 39, the air bag 410 according to a fifth embodiment is constituted as a ring-like member constituted by a shape of expanding substantially in a shape of a quadrangular prism constituting a bottom face by a face 429 on a side of a passenger and narrowed to a side of a front part thereof, arranged with the through hole 411 penetrated substantially in an up and down direction from a front upper portion 411a over to a rear lower portion 411b in finishing to expand the air bag, and finishing to expand the air bag to close the through hole 411 by bulging base cloths 422 and 426 at a surrounding thereof. That is, according to the air bag 410, a ring-like main body portion 412 expanding to bulge is arranged with a front expanded portion 413, a rear expanded portion 414, a left expanded portion 415 and a right expanded portion 416 at a surrounding of the through hole 411.

Figure 40:
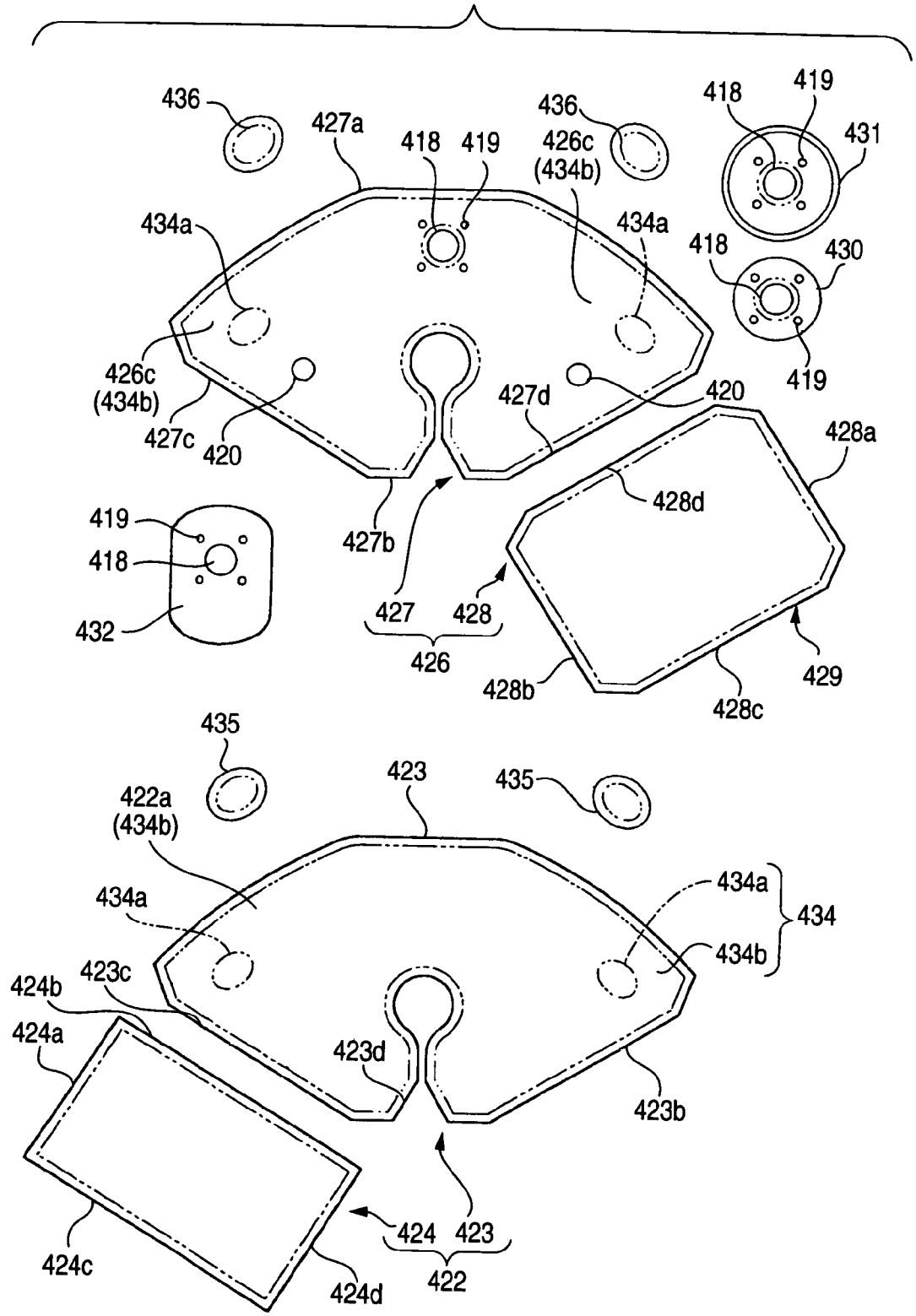
FIG. 40 is a plane view showing members constituting the air bag used in the fifth embodiment of the invention.

Further, a sheet member constituting the ring-like main body portion 412 is constituted by including the inner peripheral side base cloth 422 disposed on an inner peripheral face side of the through hole 411 and an outer peripheral side base cloth 426 disposed on an outer peripheral face side of the air bag 410 to be opposed to the inner peripheral side base cloth 422 in finishing to expand the air bag. As shown by FIG. 40, the inner peripheral side base cloth 422 is constituted by a bent first inner side base cloth 423 on a front side and a second inner side base cloth 424 in a shape of a rectangular plate on a rear side. The outer peripheral side base cloth 426 is constituted by a bent first outer side base cloth 427 on the front side and a second outer side base cloth 428 constituting a side face of a passenger at the rear side. The base cloths 423, 424, 427 and 428 are formed from flexible woven cloth comprising polyester string, polyamide string or the like and constituted as noncoated cloths which are not coated with a coating agent of silicone or the like.

Further, the first inner side base cloth 423 is constituted by arranging portions constituting sides of inner faces 415b and 416b of the left expanded portion 415 and the right expanded portion 416 from a portion constituting a side of a rear face 413b of the front expanded portion 413 to bend to extend to both sides on the rear side. The first outer side base cloth 427 is constituted by arranging portions constituting sides of outer faces 415a and 416a of the left expanded portion 415 and the right expanded portion 416 from a portion constituting a side of a front face 413a of the front expanded portion to bend to extend to both sides of the rear side. The second inner side base cloth 424 becomes a portion constituting a front face 414a of the rear expanded portion 414 and the second outer base cloth 428 becomes a portion constituting a rear face 414b of the rear expanded portion 414. Further, in the case of the embodiment, the rear face 414b of the rear expanded portion 414 constitutes a face 429 constituting a side of the passenger in expanding to develop the air bag 410.

Further, a portion of a side of a front part 426a (side of front face 413a) of the outer peripheral side base cloth 426 of the air bag 410 is arranged with a gas flow inlet 418 for attaching a peripheral edge 417 to the case 54 by being opened in a circular shape to make an expanding gas G flow thereinto. The peripheral edge 417 of the gas flow inlet 418 is formed with a plurality of attaching holes 419 for attaching the flow inlet peripheral edge 417 to the bottom wall portion 55 of the case 54 by inserting the bolts 50b of the retainer 50. The flow inlet peripheral edge 417 on the inner peripheral face side in the air bag 410 is seamed to arrange with two sheets of reinforcing cloths 430 and 431, further, an upper face side of the reinforcing cloth 431 is arranged with a reinforcing cloth 432 for protecting a seamed portion with out being seamed. Further, the outer peripheral side base cloth 426 is opened with bent holes 420 for discharging the extra expanding gas G at portions of the left and the right expanded portions 415 and 416.

Figure 38:
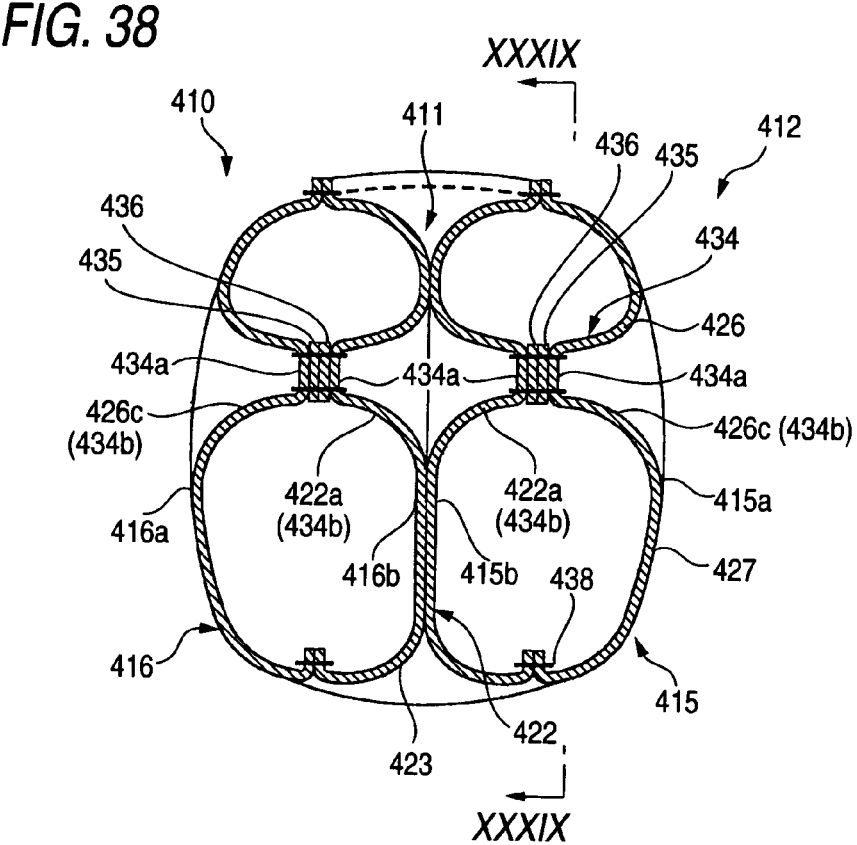
FIG. 38 is a sectional view in the up and down direction of a portion of a rectifying portion of the air bag used in the fifth embodiment of the invention.
Figure 39:
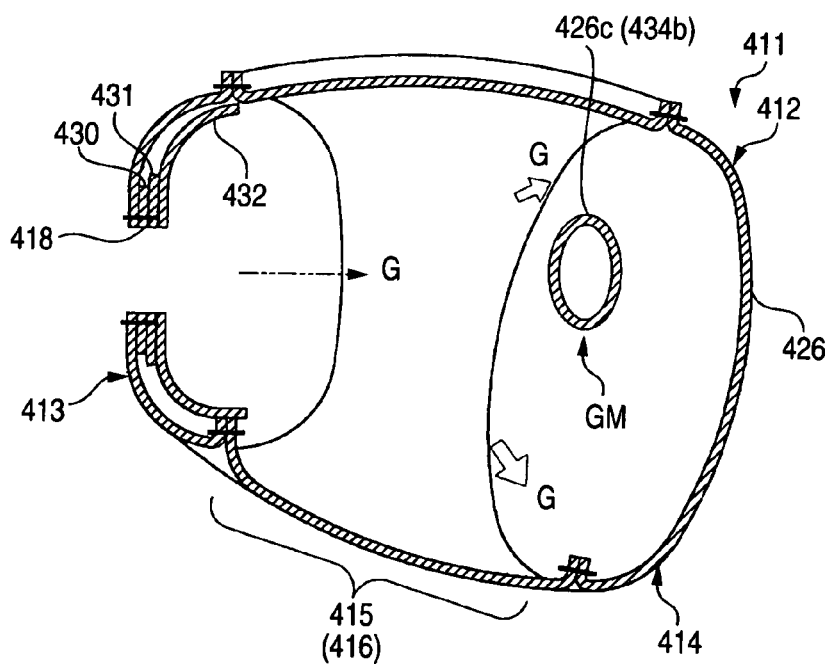
FIG. 39 is a sectional view in the up and down direction of the portion of the rectifying portion of the air bag used in the fifth embodiment of the invention showing a portion of XXXIX-XXXIX of FIG. 38.

Further, the air bag 410 of the embodiment is arranged with a rectifying portion 434 (rectifying unit) as means GM for moving to guide the rear face 414b (passenger side face 429) of the rear expanded portion 414 in expanding to develop the air bag. The rectifying portions 434 are for branching the expanding gas G flowing into the ring-like main body portion 412 in the up and down direction and respectively arranged at positions on the rear side of the center in the front and rear direction and on the upper side of the center in the up and down direction within regions of the left and the right expanded portions 414 and 415 (refer to FIGS. 36 and 38). The respective rectifying portions 434 are formed by seaming to bond the inner peripheral side base cloth 422 and the outer peripheral side base cloth 426 in an elliptical shape by interposing the reinforcing cloths 435 and 436 and are constituted by mutual bond portions 434a of the inner peripheral side and the outer peripheral side base cloths 422 and 426, and portions 422a and 426c (main body portions 434b) substantially in a shape of a truncated cone at surroundings of the bond portions 434a (refer to FIGS. 38 through 40) That is, when the expanding gas G flows into the ring-like main body portion 412 in expanding to develop the air bag 410, the outer peripheral side base cloth 426 is pulled to the outer peripheral side and the inner peripheral side base cloth 422 is also pulled to the inner peripheral side to close the through hole 411. Therefore, at portions arranged with the rectifying portions 434, as shown by FIG. 38, the bond portions 434a are respectively arranged substantially at middle portions in the left and right direction of the left and the right expanded portions 415 and 416 while pulling the portions 422a and 426c (main body portions 434b) constituting the surroundings of the bond portions 434a in the respective inner peripheral side and the outer peripheral side base cloths 422 and 426. That is, there is constituted a mode of dividing the left and the right expanded portions 415 and 416 along the left and right direction by the bond portions 434a and the main body portions 434b (refer to FIGS. 38 and 39). As a result, according to the air bag 410 of the embodiment, the expanding gas G flowing into the ring-like main body portion 412 from the gas flow inlet 418 flows to widen in the left and right direction along the shape of the ring-like main body portion 412 from the front expanded portion 413 over to the left and the right expanded portions 415 and 416 and thereafter, branched in the up and down direction by the bond portions 434a and the main body portions 434b of the rectifying portions 434 in the respective left and right expanded portions 414 and 415 and flows to widen in the up and down direction over to the rear expanded portion 414 (refer to FIG. 39).

Next, an explanation will be given of fabrication of the air bag 410. In the case of the embodiment, the air bag 410 (ring-like main body portion 412) is formed by seaming using seaming string 438 of polyester string or the like. Lower edges 423d and 427d of the first inner side base cloth 423 and the first outer side base cloth 427 are seamed. Next, a left edge 424b of the second inner side base cloth 424 and an edge 423b of a left end side of the bent first inner side base cloth 423 are seamed and a right edge 424c of the second inner side base cloth 424 and an edge 423c of a right end side of the first inner side base cloth 423 are seamed to thereby form the inner side base cloth 422 are seamed in a ring-like shape. Further a left edge 428b of the second outer side base cloth 428 and an edge 427b of a left end side of the first outer side base cloth 427 are seamed and a right edge 428c of the second outer side base cloth 428 and an edge 427c on a right end side of the first outer side base cloth 427 are seamed to thereby form the outer side base cloth 426 in a ring-like shape. Further, reinforcing cloths 430 and 431 are previously seamed to the first outer side base cloth 427. The gas flow inlet 418 and the attaching hole 419 may respectively be formed at the base cloth 427 and the reinforcing cloths 430, 431 and 432, or the gas flow inlet 418 and the attaching hole 419 may be formed after seaming the base cloth 427 and the reinforcing cloths 430 and 431 and mounting the reinforcing cloth 432 integrally by boring.

Successively, a lower edge 424d of the second inner side base cloth 424 of the inner peripheral side base cloth 422 and a lower edge 428d of the second outer side base cloth 428 of the outer peripheral side base cloth 426 are seamed and the base cloths 422 and 426 are inverted such seam margins of seamed portions are not exposed to the outer peripheral face of the air bag 410. Further, the base cloths 422 and 426 are seamed in a state of interposing the reinforcing cloths 435 and 436 to thereby form the rectifying portions 434, 434. Thereafter, when upper edges 423a and 427a of the first inner side base cloth 423 and the first outer side base cloth 427 are seamed to each other and upper edges 424a and 428a of the second inner side base cloth 424 and the second outer side base cloth 428 are seamed to each other, the ring-like main body portion 412 (air bag 410) of the embodiment can be formed.

Explaining mounting the air bag 410 fabricated as described above to the vehicle, first, the air bag 410 is folded in a state of arranging the retainer 50 at inside thereof to project the bolts 50b from the respective attaching holes 419, further, the folded air bag 410 is wrapped by a breakable wrapping sheet 47. Further, in folding the air bag 410, the air bag 410 is folded after having been processed by a laterally folding step and a vertically folding step after having been processed by a previously folding step.

Figure 41:
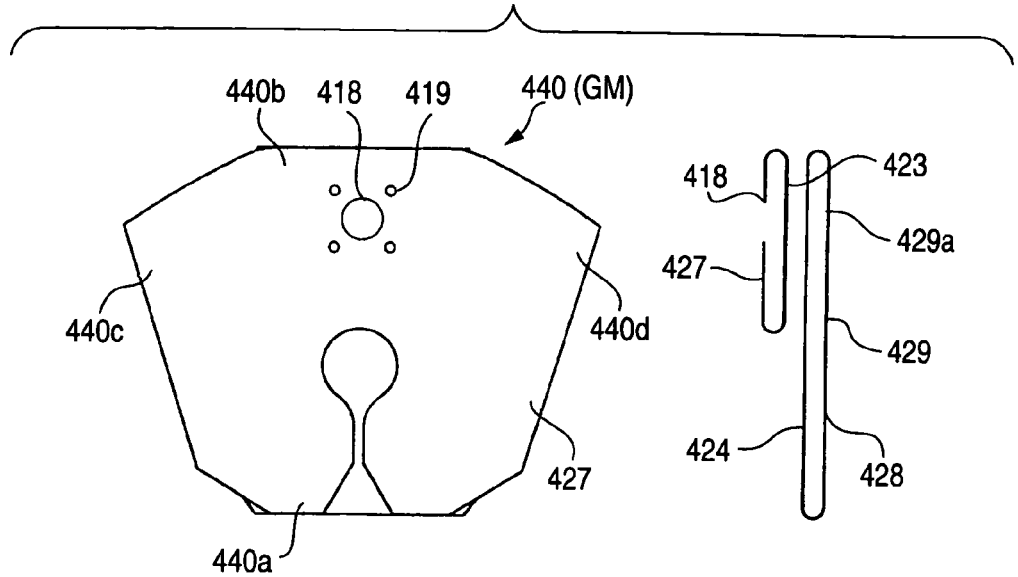
FIG. 41 is a view showing a state after previously folding the air bag used in the fifth embodiment of the invention viewed from a side of a gas flow inlet.
Figure 42:
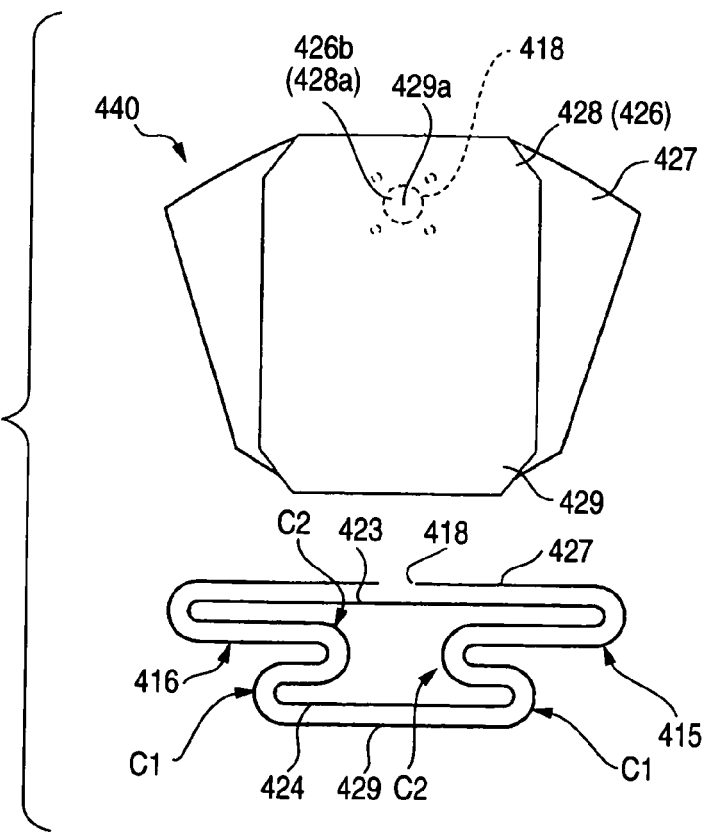
FIG. 42 is a view showing the state after previously folding the air bag used in the fifth embodiment of the invention viewed from a side of a passenger side face.
Figure 43A:
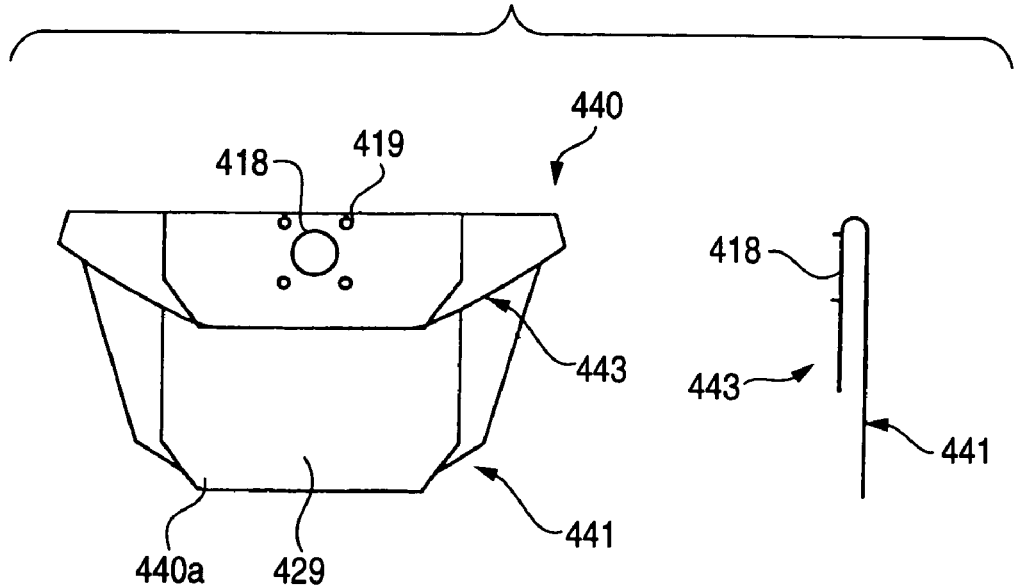
FIGS. 43A and 43B are views showing a folding step after previously folding the air bag used in the fifth embodiment of the invention.
Figure 43B:
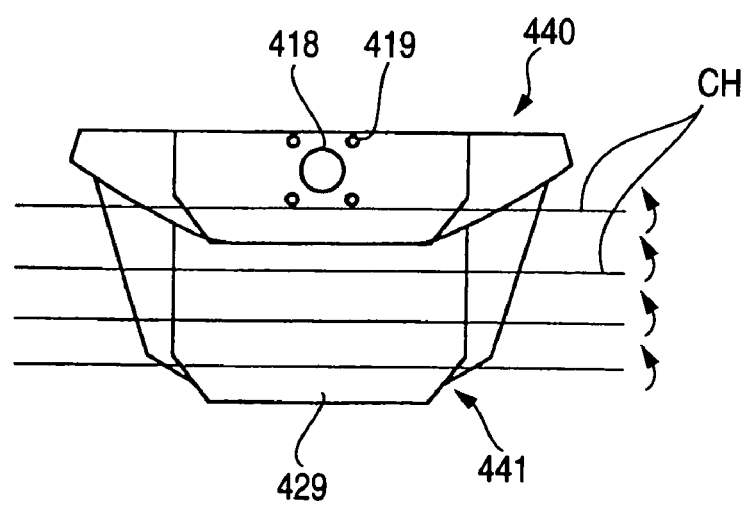
Figure 44A:
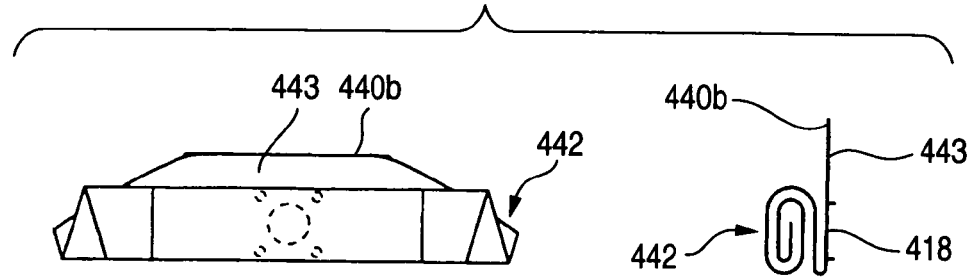
FIGS. 44A to 44C are views showing a step of folding the air bag used in the fifth embodiment of the invention showing the step after FIGS. 43A and 43B.
Figure 44B:
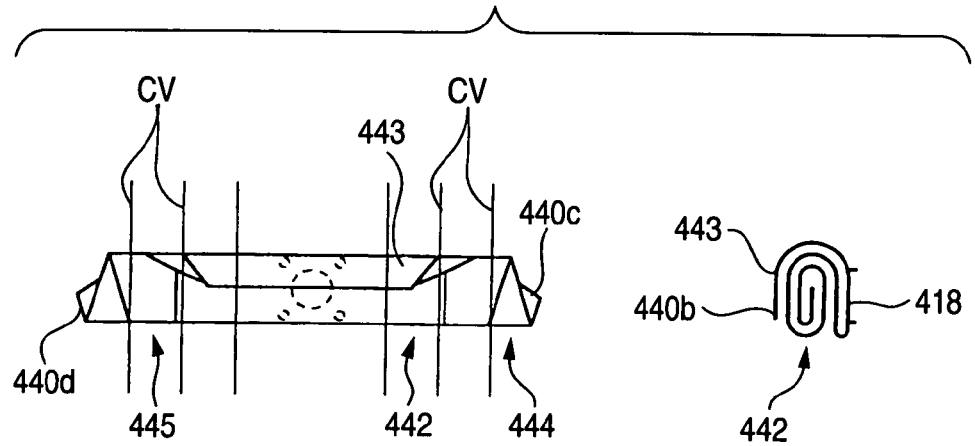
Figure 44C:
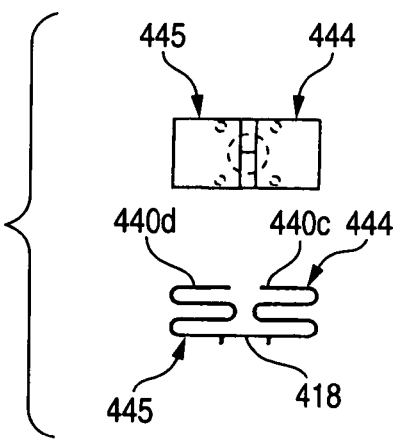

In the previously folding step, a previously folded air bag 440 as shown by FIGS. 41 and 42 is formed. In the previously folding step, in a state in which the air bag 410 (ring-like main body portion 412) is not expanded, the gas flow inlet 418 is disposed on a lower face side, the inner peripheral side base cloth 422 is interposed above the gas flow inlet 418, and a vicinity of a rear upper portion 26b of the outer peripheral side base cloth 426 (vicinity of the upper edge 428a of the second outer side base cloth 428) is oppositely arranged to thereby develop flatly and substantially symmetrically in the left and right direction. Further, according to the air bag 410 of the embodiment, the previously folded air bag 440 is formed by folding portions of the first outer side base cloth 427 constituting the left and the right expanded portions 415 and 416 such that substantially an entire region of the second outer side base cloth 428 constituting the passenger side face 429 is flatly developed in expanding to develop the air bag 410. Specifically, the second outer side base cloth 428 (second inner side base cloth 423) is arranged to be proximate to the gas flow inlet 418 to fold by making a crease C1 constituting ridge folding and a crease C2 constituting valley folding respectively to portions of the first outer side base cloth 427

(first inner side base cloth 423) constituting the left and the right expanded portions 415 and 416.

After the previously folding step, as shown by FIGS. 43A, 43B, 44A, 44B, and 44C, the previously folded air bag 440 is folded by the transverse folding step narrowing a width dimension in the front and rear direction centering on the gas flow inlet 418 by making a crease CH in the left and right direction and a vertically folding step of narrowing a width dimension in the left and right direction by making a crease CV in the front and rear direction to constitute a dimension containable in the case 54. In the case of the embodiment, the laterally folding step is carried out by rolling to fold a portion 441 rearward from the gas flow inlet 418 to arrange at a position upward from the gas flow inlet 418 such that the side of a rear edge 440a thereof is proximate to the gas flow inlet 418, successively, folding a portion 443 frontward from the gas inlet 418 in bellows to mount on a side upward from the roll folding portion 442 such that a side of a front edge 449 is proximate to the gas flow inlet 418. Further, the vertically folding step is carried out by folding portions 444 and 445 on sides of left and right edges 440c and 440d in bellows to arrange at a position upward from the gas flow inlet 418 such that sides of the left and right edges 440c and 440d are proximate to the gas flow inlet 418. In the case of the embodiment, by folding the air bag 410, there is constituted the guide moving mans GM of the rear face 414b (passenger side face 429) of the rear expanded portion 414 in expanding to develop the air bag 410.

Further, when the air bag 410 has been finished to fold after having been processed by the vertical folding step, as described above, the folded air bag is wrapped by the breakable wrapping sheet 47 such that the air bag is not unfolded.

Further, the folded air bag 410 is mounted onto the bottom wall portion 55 of the case 54 from the opening 54a while inserting the respective bolts 50b into the attaching holes 57 from above. Successively, an upper portion of the main body portion 52a of the inflator 52 is inserted into an inserting hole 56, the gas flow inlet 418 and the base portion 50a of the retainer 50 from below and the respective bolts 50b projected to the lower side from the bottom wall portion 55 are inserted into the attaching holes 52d of the flange portion 52c of the inflator 52. Thereafter, when the nuts 51 are fastened to the respective bolts 50b projected from the flange portion 52c of the inflator 52, the folded air bag 410 and the inflator 52 can be attached to the bottom wall portion 55 of the case 54.

Thereafter, the side wall portion 59 of the case 54 is inserted into the connecting wall portion 65 of the air bag cover 61 of the instrument panel 1 mounted to the vehicle, the respective locking claws 60 of the case 54 are inserted into the locking holes 66 of the connecting wall portion 65 and the respective locking claws 60 are locked by the connecting wall portion 65. Furthermore, when the bolts 7 are fastened to the nuts 58a of the respective brackets 58 via the attaching sheets 6c, the air bag apparatus M for a passenger seat can be mounted to the vehicle.

Further, in mounting the air bag apparatus to the vehicle, the air bag apparatus M may be mounted to the vehicle by previously integrating the case 54 attached with the air bag 410 of and the inflator 52 to the air bag cover 61 of the instrument panel 1 and fixedly connecting the air bag apparatus M to the side of the body 6 by utilizing the bolts 7 in attaching the instrument panel 1.

Figure 46:
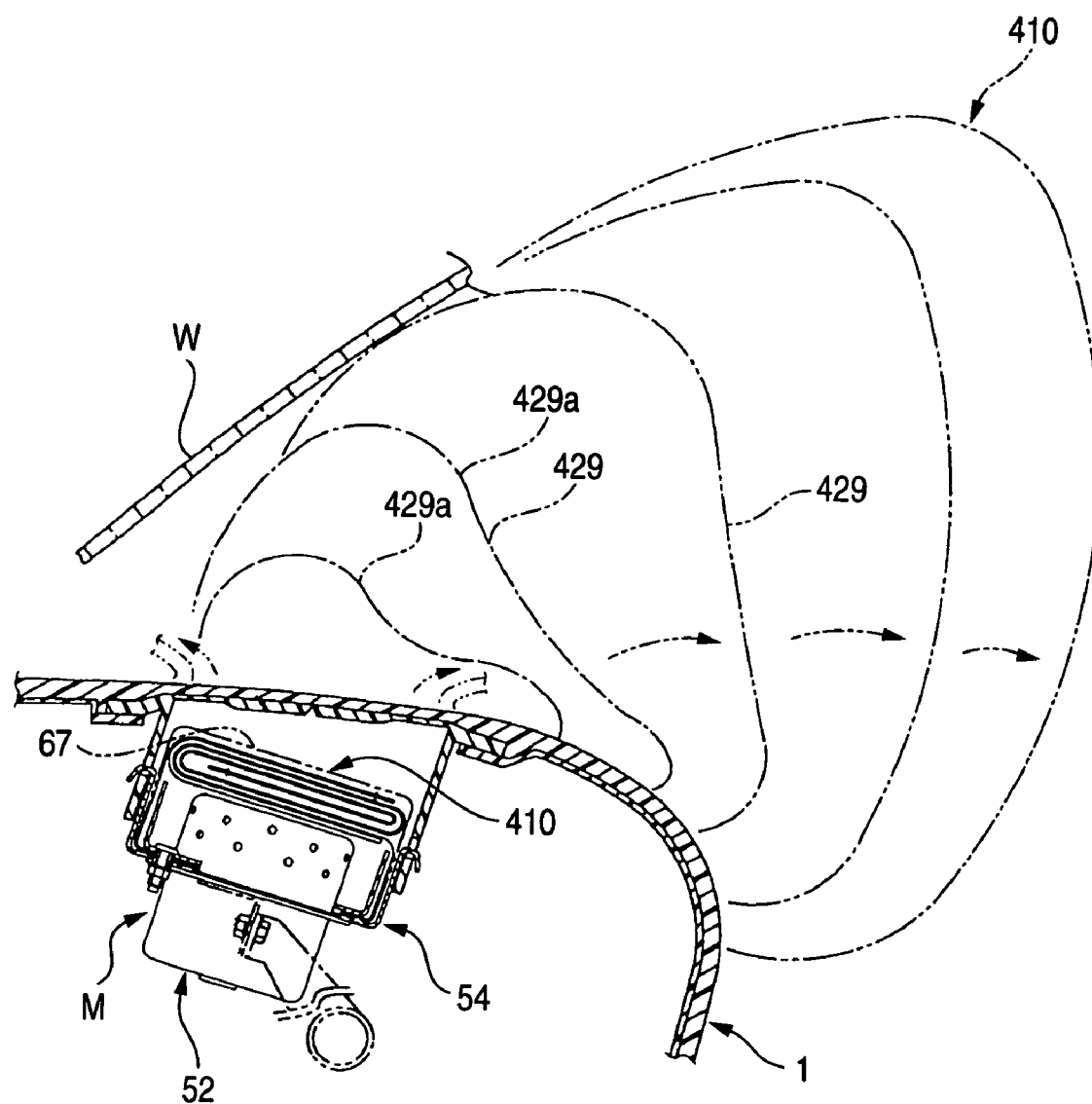
FIG. 46 is a view for explaining the air bag apparatus of the fifth embodiment of the invention when the air bag apparatus is operated viewed from a side of the vehicle.

After mounting the air bag apparatus M to the vehicle, when the expanding gas G is delivered from the gas delivering port 52b of the inflator 52, the air bag 410 is expanded to break the wrapping sheet 47 and break the portion 64 to be broken of the air bag cover 61 and open the door portions 62F and 62B as shown by two-dotted chain lines of FIG. 46. Further, the air bag 410 is considerably projected from an opening 67 opening the door portions 62F and 62B of the air bag cover 61 to finish to expand and discharges the extra expanding gas G from the vent hole 20. Further, a member of notation W of FIG. 46 designates a windshield.

Figure 45:
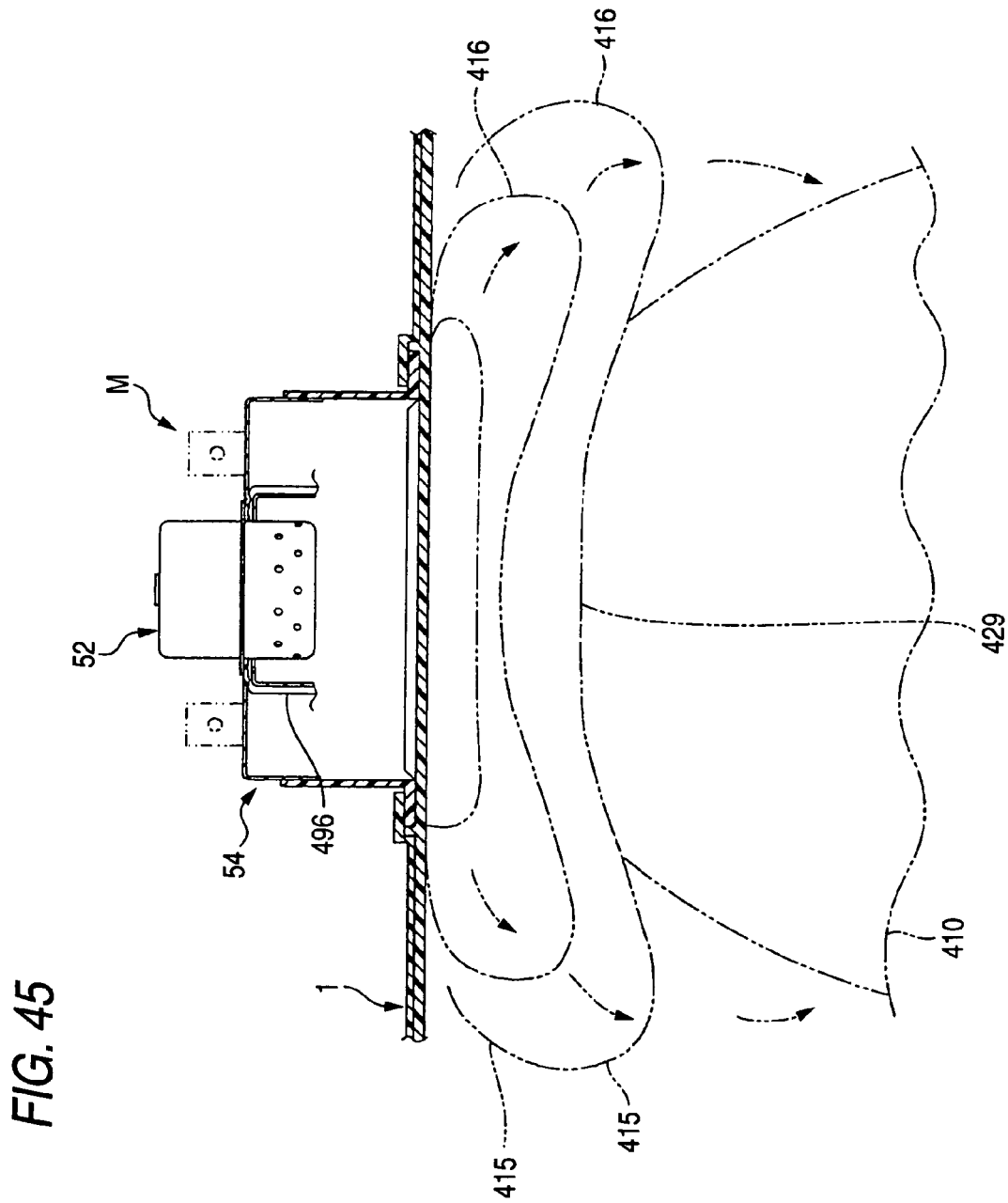
FIG. 45 is a view for explaining the air bag of the fifth embodiment of the invention when the air bag apparatus is operated viewed from a rear side of the vehicle.

Further, according to the air bag apparatus M of the embodiment, the air bag 410 is constituted as the ring-like member arranged with the through hole 411 penetrated substantially in the up and down direction. That is, in expanding to develop the air bag 410, the expanding gas G flowing from the gas flow inlet 418 does not directly flow to the side of the passenger side face 429 but temporarily flows to widen in the left and right direction along the shape of the air bag 410 (ring-like main body portion 412) (refer to FIG. 37). Therefore, the air bag 410 is expanded considerably to widen in the left and right direction in the state of being restrained from considerably projecting to the rear side as shown by two-dotted chain lines of FIG. 45. As a result, a moving speed of the passenger side face to the rear side can be restrained in expanding to develop the air bag 410.

Further, according to the air bag apparatus M of the embodiment, in expanding to develop the air bag 410, the passenger side face 429 is constituted substantially by the planar shape along substantially the vertical direction and widely developed in the up and down direction and in the left and right direction and by providing the guide moving means GM of the passenger side face 429 such that the air bag apparatus M is movable to the rear side of the vehicle. Specifically, according to the apparatus M of the embodiment, the guide moving means GM is constituted by folding the air bag 410 and the rectifying portions (rectifying unit) 434, 434 provided at the air bag 410.

According to the air bag apparatus M of the embodiment, a portion of the air bag 410 constituting a vicinity of the upper edge 428a of the second outer peripheral side base cloth 28 constituting the passenger side face 429 is arranged at the position opposed to the gas flow inlet 418 in the previously folded air bag 440 (refer to FIG. 42). Therefore, at an initial stage of expanding the air bag, the portion 429a at a vicinity of the upper end of the passenger side face 429 is precedingly pushed up to the upper side via the inner peripheral side cloth 422 by a pressing force of the expanding gas G flowing from the gas flow inlet 418 (refer to FIG. 46). Further, by pushing up the portion 429a at the vicinity of the upper end of the passenger side face 429, the creases of the lateral folding and the vertical folding are swiftly resolved. Further, according to the air bag apparatus M of the embodiment, since the rectifying portions 434, 434 for rectifying the expanding gas G in the up and down direction are arranged in regions of the left and right expanded portions 415 and 416 of the air bag 410, the expanding gas G flowing from the gas flow inlet 418 flows to widen in the left and right direction along the shape of the ring-like main body portion 412 from the front expanded portion 413 over to the left and the right expanded portions 415 and 416 and thereafter, branched in the up and down direction by the rectifying portions 434 in the respective left and right expanded portions 415 and 416 and flows to the rear expanded portion 414 to widen in the up and down direction (refer to FIG. 39). Therefore, according to the air bag apparatus M of the embodiment, the air bag 410 is expanded to widen considerably not only in the left and direction but also in the up and down direction and therefore, at the initial stage of expanding to develop the air bag, the passenger side face 429 (the second outer side base cloth 428 and portions of the first outer side base cloth 427 on sides of the left and right expanded portions 415 and 416 constituting the surrounding of the second outer side base cloth 428) is moved to the rear side of the vehicle by constituting substantially the planar shape widely developed in the up and down direction and in the left and right direction (refer to FIG. 46). As a result, even when the passenger side face 429 interferes with the passenger moving forward, the passenger can precisely be protected without operating the pressing force partially to the side of the passenger.

Therefore, according to the air bag apparatus M for a passenger of the embodiment, in expanding to develop the air bag 410, the face constituting the side of the passenger is constituted by substantially the planar shape along substantially the vertical direction and widely developed in the up and down direction and in the left and right direction and the passenger can stably be protected by making the air bag 410 movable to the rear side of the vehicle in the state of further restraining the moving state.

Further, according to the air bag apparatus M of the embodiment, even when the air bag 410 is constituted to include the through hole 411 penetrated substantially in the up and down direction, the through hole 411 is closed in finishing to expand the air bag 410. Therefore, a predetermined inner pressure can be ensured and the passenger can stably be protected by the air bag 410 finishing to expand.

Particularly, according to the air bag 410 of the air bag apparatus M of the embodiment, the previously folded air bag 440 is formed by folding portions of the first outer side base cloth 427 constituting the left and right expanded portions 415 and 416 such that substantially the entire region of the second outer side base cloth 428 constituting the passenger side face 429 is flatly developed in expanding to develop the air bag 410. Therefore, in expanding to develop the air bag 410, in comparison with a case of folding the second outer side base cloth 428, the passenger side face 429 is easier to move to the passenger side in the state of being developed widely in the up and down direction and in the left and right direction and the moving speed of the passenger side face 429 to the passenger side can further be restrained.

Further, according to the air bag 410 of the embodiment, as rectifying unit, the rectifying portions 434 constituted by seaming to bond the inner peripheral side base cloth 422 and the outer peripheral side base cloth 426 in the circular shape are arranged at the positions rearward from the centers in the front and rear direction in the regions of the left and the right expanded portions 15 and 16 and upward from the centers in the up and down direction and therefore, the expanding gas flowing into the left and the right expanded portions 415 and 416 are rectified to widen in the up and down direction at the portion proximate to the rear expanded portion 414, further, the expanding gas G flows more to the lower side than to the upper side in the expanded portion 414. Therefore, more expanding gas G flows to the portion constituting the rear side portion 41 of the previously folded air bag 440, as a result, the rear lower portion 410b of the air bag 410 can swiftly be developed.

When the above-described point is not taken into consideration, the rectifying portions 434 may be constituted to arrange at positions rearward from the centers in the front and rear direction in the regions of the left and the right expanded portions 415 and 416. When the rectifying portions 434 are arranged to such positions, the expanding gas flowing into the left and right expanded portions 415 and 416 is rectified to widen in the up and down direction at a portion proximate to the rear expanded portion 414 and therefore, the rear expanded portion 414 can effectively be developed to widen in the up and down direction. Further, the rectifying portions 434 may be constituted to arrange at positions upward from the centers in the up and down direction in the regions of the left and the right expanded portions 415 and 416. When the rectifying portions 434 are arranged at such positions, in the rear expanded portion 414, the expanding gas G flows more to the lower side than the upper side. Therefore, more expanding gas G flows to the portion constituting the rear side portion 41 of the previously folded air bag 440. Further, when such a point is not taken into consideration, the rectifying portions may be constituted to arrange at positions proximate to the centers in the up and down direction in the regions of the left and the right expanded portions 10 and 16, further, may be constituted to arrange at the vicinities of boundary portions of the front side expanded portion 13 and the left and the right expanded portions 415 and 416. Further, also the shape of the rectifying unit is not limited thereto. For example, rectifying unit may be constituted to arrange a tether connecting the inner peripheral side base cloth 422 and the outer peripheral side base cloth 426.

Figure 47:
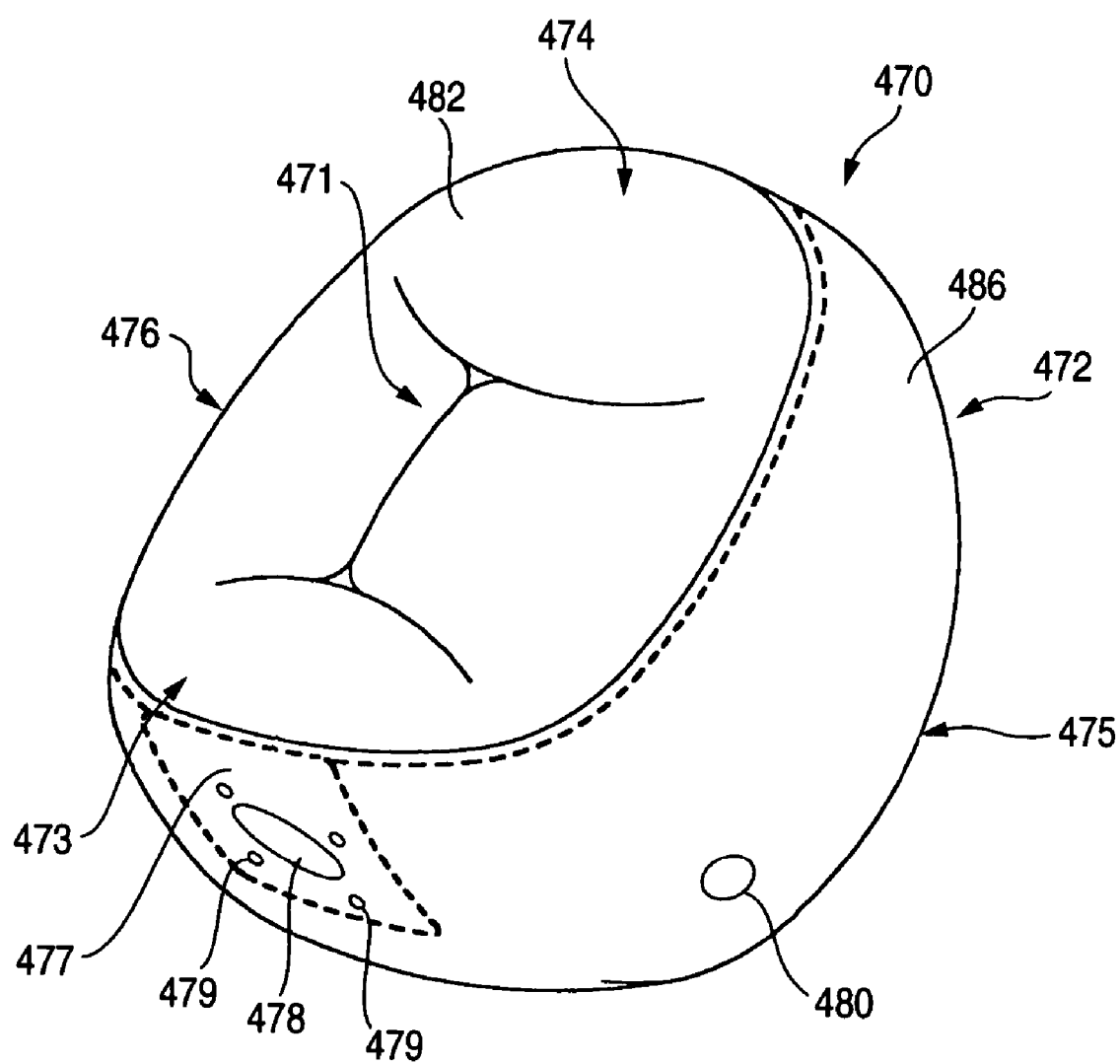
FIG. 47 is a perspective view of a state of expanding a single member of an air bag in the fifth embodiment of the invention; according to other embodiment of the invention.

Further, although according to the air bag 410 of the embodiment, the guide moving means GM of the passenger side face 429 is constituted by folding the air bag 410 and the rectifying portions 434 (rectifying unit) arranged at the air bag 410, an air bag having a constitution in which rectifying unit is not arranged may be used as in, for example, an air bag 470 shown in FIG. 47.

The air bag 470 is constituted as a ring-like member arranged with a through hole 471 penetrated substantially along an up and down direction from a front upper portion over to a rear lower portion in finishing to expand the air bag and finishing to expand to close the through hole 471 by bulging base cloths 482 and 486 at a surrounding thereof. Further, according to the air bag 470, a ring-like main body portion 472 expanded to bulge is constituted by arranging a front expanded portion 473, a rear expanded portion 474, a left expanded portion 475 and a right expanded portion 476 at a surrounding of the through hole 471 similar to the above-described air bag 410.

Figure 48:
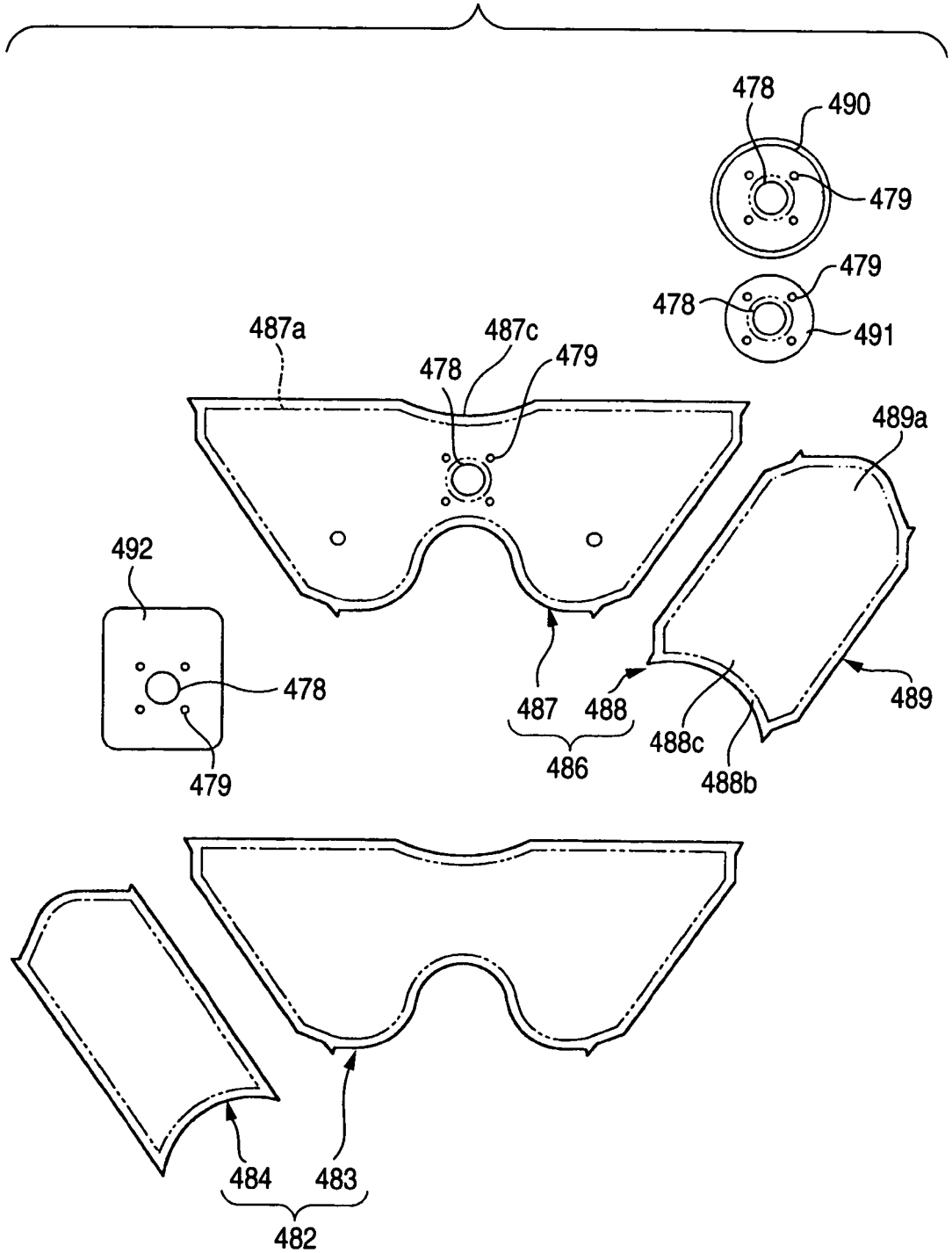
FIG. 48 is a plane view showing members constituting the air bag used in the embodiment of the invention.

The ring-like main body portion 472 is constituted by the inner peripheral side base cloth 482 and the outer peripheral side base cloth 486 as shown by FIG. 48 similar to the above-described air bag 410. The inner peripheral side base cloth 482 is constituted by a bent first inner side base cloth 483 on a front side and a second inner side base cloth 484 in a shape of a rectangular plate on a rear side. The outer peripheral side base cloth 486 is constituted by a bent first outer side base cloth 487 on a front side and a second outer side base cloth 488 constituting a passenger side face on a rear side.

Further, the first inner side base cloth 483 is constituted by arranging portions constituting inner face sides of the left side expanded portion 475 and the right side expanded portion 476 to extend from a portion thereof constituting a rear face side of the front expanded portion 473 to both left and right sides. The first outer side base cloth 487 is constituted by arranging portions constituting outer face sides of the left expanded portion 475 and the right expanded portion 476 to extend from a portion thereof constituting a front face side of the front expanded portion 473 to both left and right sides. The second inner side base cloth 484 becomes a portion constituting a front face of the rear side expanded portion 474 and the second outer side base cloth 488 becomes a portion constituting a rear face of the rear side expanded portion 474. Further, a rear face (second outer side base cloth 488) of the rear expanded portion 474 constitutes a face 489 constituting a passenger side in expanding to develop the air bag 470.

Further, the air bag 470 is constituted to include a gas flow inlet 478 and an attaching hole 479 similar to the above-described air bag 410 and a flow inlet peripheral edge 477 on an inner peripheral side in the air bag 470 is arranged with two sheets of reinforcing cloths 490 and 491 and a reinforcing cloth 492 protecting seamed portions similar to the above-described air bag 410. Further, the outer peripheral side base cloth 486 is opened with a vent hole 480.

The air bag 470 of the embodiment is fabricated by using seaming string similar to the above-described air bag 410. Further, the air bag 470 of the embodiment is folded after having been processed by a laterally folding step and a vertically folding step after having been processed by a previously folding step similar to the above-described air bag 410.

In the previously folding step, in a state in which the air bag 470 (ring-like main body portion 472) is not expanded, the gas flow inlet 478 is arranged on a lower face side, the inner peripheral side base cloth 472 is interposed above the gas flow inlet 478, and a vicinity of a rear upper portion of the outer peripheral side base cloth 476 (vicinity of an upper edge 488a of the second outer side base cloth 488) is oppositely arranged to develop flatly substantially symmetrically in the left and right direction.

However, whereas in the above-described air bag 410, the upper edge 27a of the first outer side base cloth 427 is formed to bend to project the vicinity of the center to the upper side, according to the air bag 470 of the embodiment, an upper edge 87a of the first outer side base cloth 487 is formed linearly to increase a volume of an upper side of the rear expanded portion 474 (refer to FIGS. 40 and 48). That is, a distance from the gas flow inlet 478 to a center of the upper edge 42Ba of the second outer side base cloth 428 is set to be relatively longer than that of the above-described air bag 410. As a result, when the air bag 470 is folded by arranging the second outer side base cloth 488 (second inner side base cloth 484) to be proximate to the gas flow inlet 478 by simply making creases constituting valley folding to portions constituting the left and right expanded portions 485 and 486 of the first outer side base cloth 487 centering on the through hole 471 similar to the above-described air bag 410, the gas flow inlet 478 is not arranged at the vicinity of the upper edge 488a of the second outer side base cloth 488 (passenger guide face 489) but arranged to a side downward from a vicinity of substantially a center in the up and down direction of the passenger side base 489.

Therefore, a crease C3 constituting ridge folding and a crease C4 constituting valley folding are made to be along the front and rear direction at portions constituting the left and right expanded portions 475 and 476 of the first outer side base cloth 487 (first inner side base cloth 483) such that the gas flow inlet 478 is made to be proximate to the side of the upper edge 488a to be opposed to a vicinity of an upper end portion 489a of the passenger side face 489 and a crease C5 constituting ridge folding along the left and right direction is made at a vicinity of a lower edge 488b of the second outer side base cloth 488 (second inner side base cloth 484) to fold back the lower edge 488b to the side of the gas flow inlet 478 to fold to thereby form the previously folded air bag 495. The previous folding can be carried out by grasping the vicinity 487c of a center in the left and right direction of the upper edge 487a of the first outer side base cloth 487 and a vicinity 488c of a center in the left and right direction of a vicinity of the lower edge 488b of the second outer side base cloth 488 and pulling the grabbed portions 487c and 488c in the front and rear direction to separate from each other (refer to FIG., 48). Further, at this occasion, it is preferable to make the grabbed portion 488c of the second outer side base cloth 488 to be proximate to the lower edge 488b of the second outer side base cloth 488 as possible such that substantially an entire region of the second outer side base cloth 488 constituting the passenger side face 489 can be flatly developed.

The previously folded air bag 495 formed as described above is folded by being processed by the laterally folding step and the vertically folding step similar to the above-described air bag 410 (previously folded air bag 440). That is, the laterally folding step is carried out by rolling to fold a portion 496 rearward from the gas flow inlet 478 of the previously folded air bag 495 by making a crease CH along the left and right direction and folding a portion 497 frontward from the gas flow inlet 478 in bellows by making a crease CH along the left and right direction and the vertically folding step is carried out by folding portions 498 and 499 on both left and right sides after having been folded laterally in bellows by making a crease CV along the front and rear direction. In the case of the air bag 470 of the embodiment, by folding the air bag 470, the guide moving means GM of the rear face 474b (passenger side face 489) of the rear expanded portion 474 is constituted in expanding to develop the air bag 470.

Figure 49:
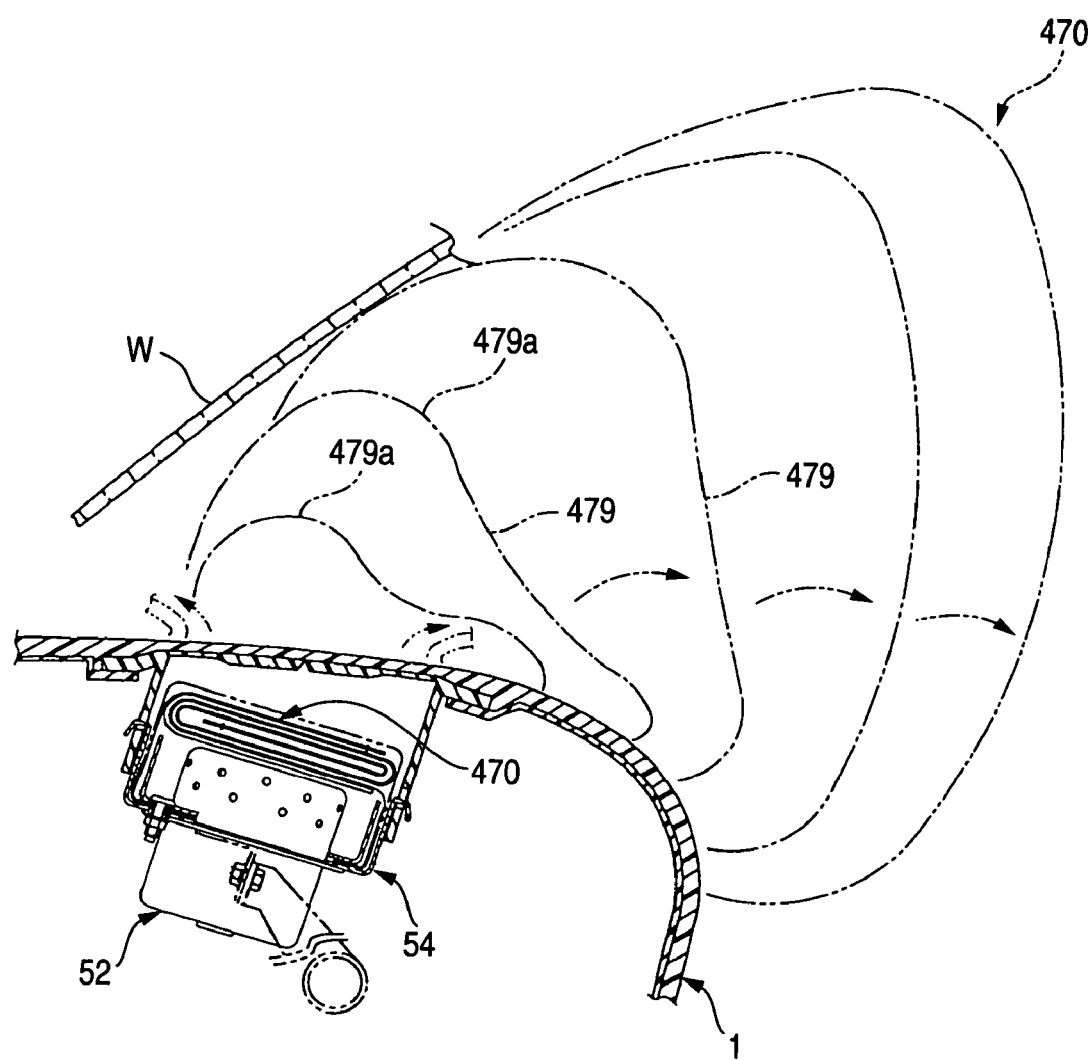
FIG. 49 is a view for explaining the air bag apparatus using the air bag of the embodiment of the invention when the air bag apparatus is operated showing a state of viewing from a side of the vehicle.
Figure 50:
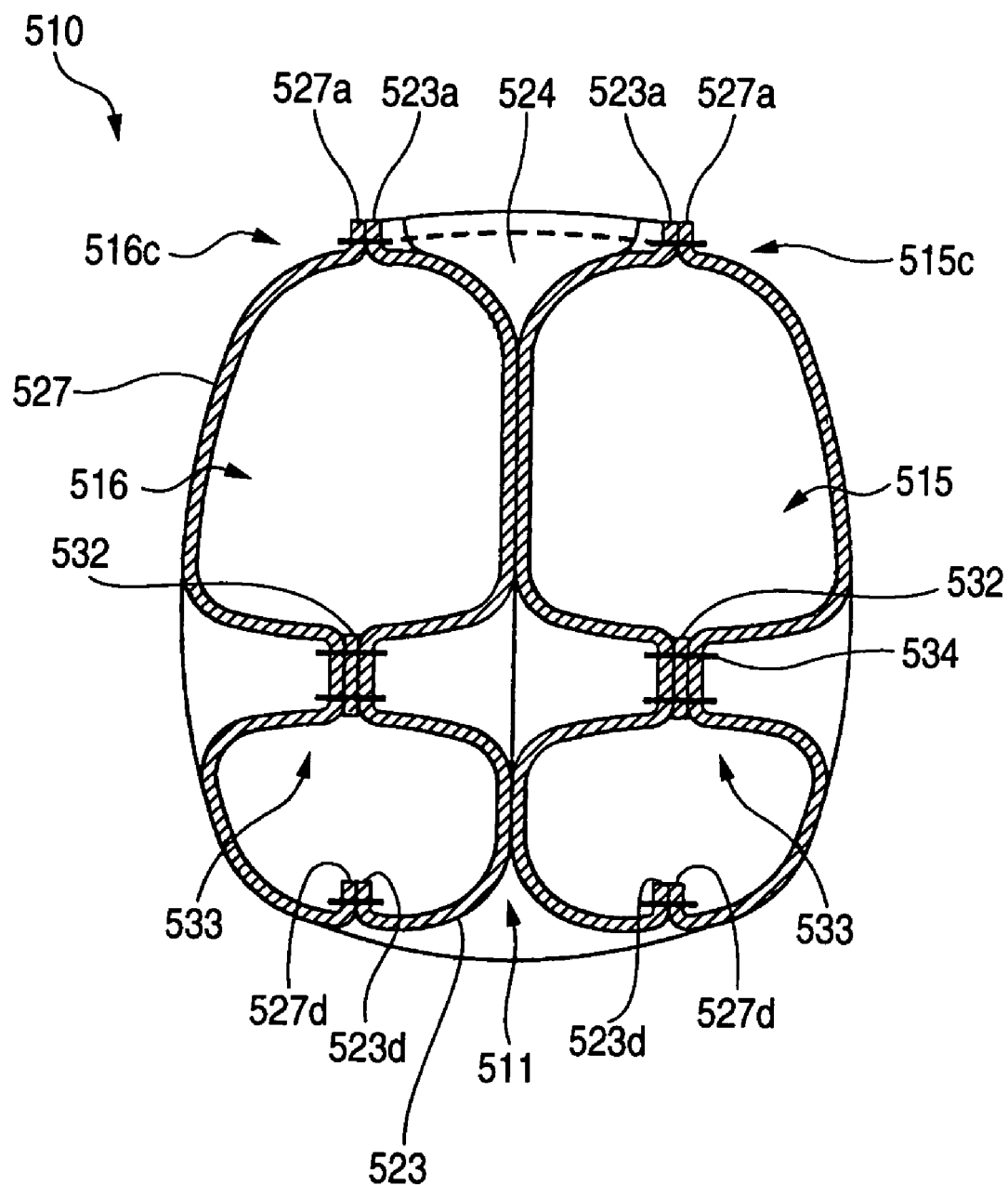
FIG. 50 is a vertical sectional view of an outline of the state of expanding the single member of the air bag of the embodiment.
Figure 52A:
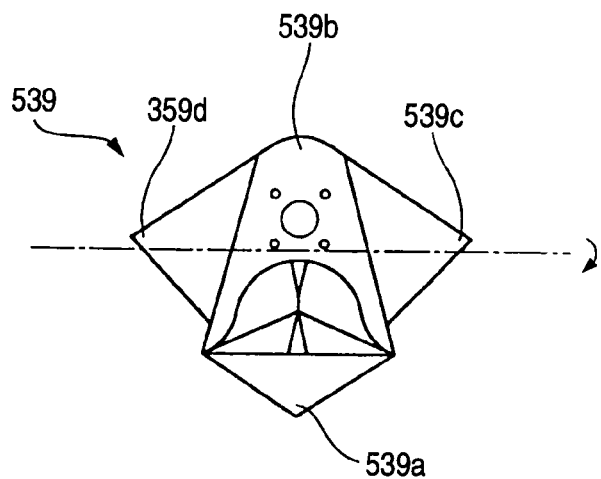
FIG. 52 illustrates views for explaining a transversely folding step of the air bag of the embodiment.
Figure 52B:
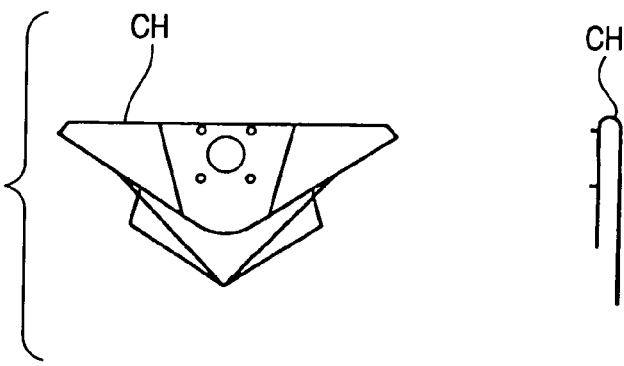
Figure 52C:
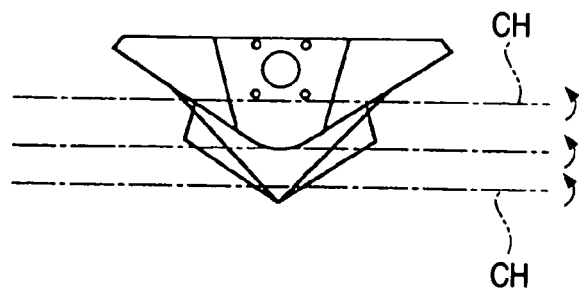
Figure 53A:
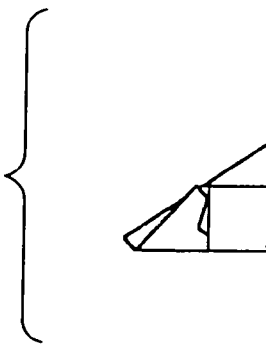
FIGS. 53A to 53C illustrate views for explaining a transversely folding step and a vertical folding step after the step shown in FIG. 52.
Figure 53B:
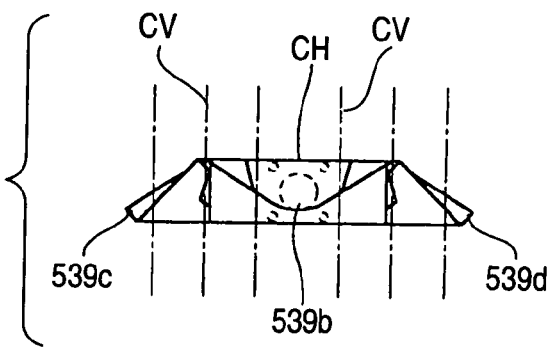
Figure 53C:
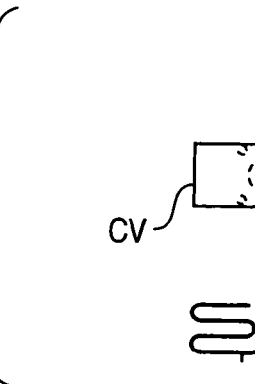

Also in the air bag apparatus using the air bag 470 having the above-described constitution, the air bag 470 is constituted as a ring-like member arranged with the through hole 471 penetrated substantially in the up and down direction and therefore, in expanding to develop the air bag 470, the expanding gas G flowing from the gas flow inlet 478 does not directly flow to the side of the passenger side face 499 but temporality flows to widen in the left and right direction along the shape of the air bag 470 (ring-like main body portion 472). Therefore, in a state of being restrained from projecting considerably to the rear side, the air bag 470 is expanded to considerably widen in the left and right direction and the moving speed to the rear side of the passenger side face 489 in expanding to develop the air bag 470 can be restrained. Further, a portion constituting a vicinity of the upper edge 88a of the second outer peripheral side base cloth 88 constituting the passenger side face 489 of the air bag 470 is arranged at a position opposed to the gas flow inlet 8 in the previously folded air bag 495. Therefore, at an initial stage of expanding the air bag 470, a portion 489a at a vicinity of an upper end of the passenger side face 489 is precedingly pushed up to the upper side via the inner peripheral side base cloth 482 by the pressing force of the expanding gas G flowing from the gas flow inlet 478 (refer to FIG. 49). Further, by pushing up the portion 489a at the vicinity of the upper end of the passenger side face 489, the creases of the lateral folding and the vertical folding are swiftly resolved. Therefore, also in the case of the air bag apparatus using the air bag 470, the air bag 470 is expanded to considerably widen not only in the left and right direction but also in the up and down direction and therefore, at the initial stage of expanding to develop the air bag, the passenger side face 489 (the second outer side base cloth 488 and portions of the first outer side base cloth 487 on sides of the left and right expanded portions 475 and 476 constituting the surrounding of the second outer side base cloth 488) is moved to the rear side of the vehicle by constituting substantially the planar shape widely expanded in the up and down direction and in the left and right direction (refer to FIG. 49). As a result, even when the passenger side face 489 interferes with the passenger moving forward, the passenger can precisely be protected without partially operating pressing force to the side of the passenger.

Further, in the air bag 410 or 470 of the embodiments, a single or a plurality of the through holes 411 or 471 penetrated substantially in the up and down direction may partially be formed by seaming portions of the inner peripheral side base cloths 422 or 482.

Sixth Embodiment

Figure 54:
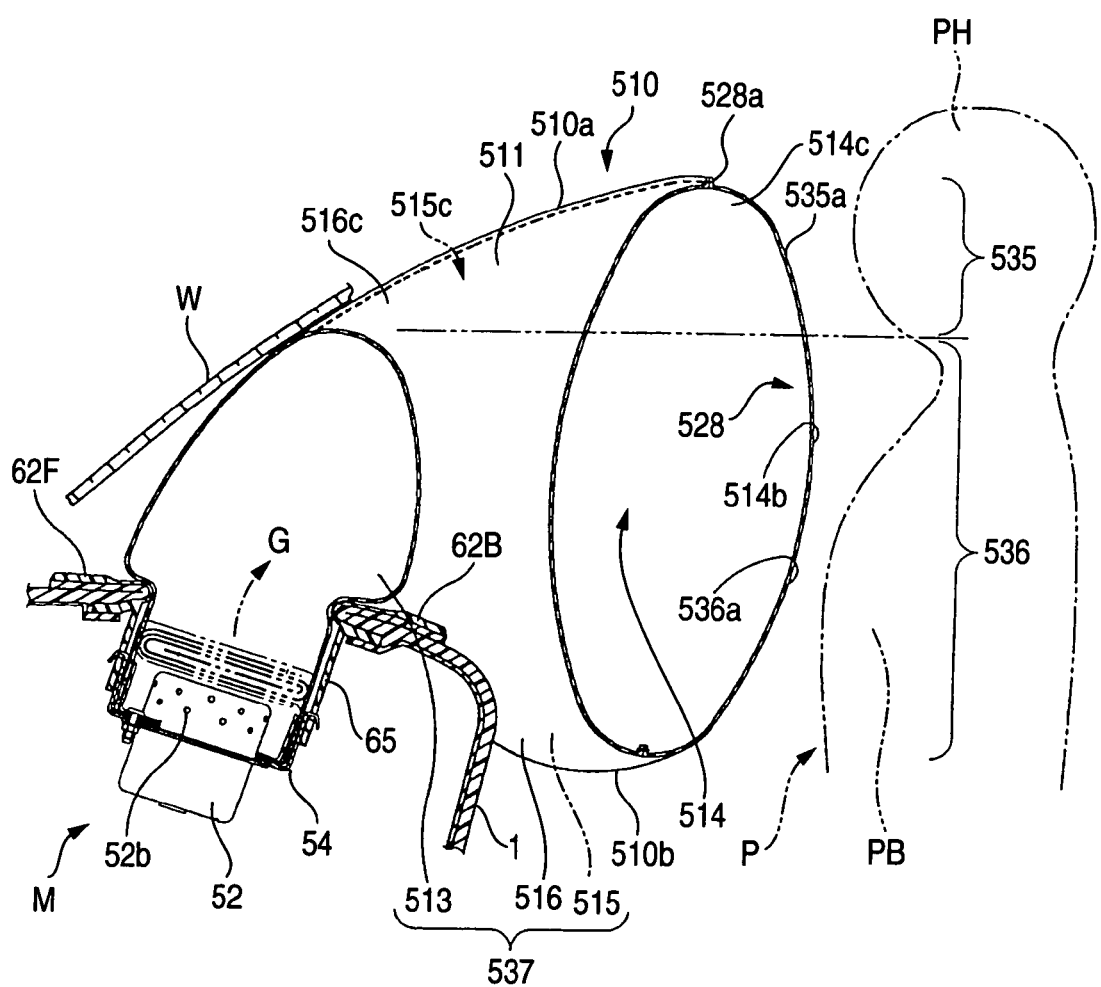
FIG. 54 is a view for explaining the air bag apparatus of a passenger seat of the embodiment when the air bag apparatus is operated.

As shown in FIG. 54, the air bag of the fourth embodiment can be applied to a sixth embodiment.

An air bag 510 is formed with rectifying portions 533, 533 to branch the expanding gas in the up and down direction at vicinities of boundary portions of the front expanded portion 513 and the left and the right expanded portions 514 and 515. The rectifying portions 533 are formed by seaming to bond an inner peripheral side base cloth 522 and an outer peripheral side base cloth 526 in an elliptical shape by interposing a reinforcing cloth 532.

Further, as shown by FIG. 54, an upper expanded portion 535 capable of protecting the head portion PH of the passenger P is constituted by an upper side of the rear expanded portion 514 constituting the rear face 514b as the passenger side front part 528 and a lower expanded portion 536 capable of protecting the chest and belly portion PB of the passenger P is constituted by a lower side thereof in finishing to expand the air bag. Further, the front expanded portion 513, the left expanded portion 515 and the right expanded portion 516 are arranged on the front side of the vehicle of the lower expanded portion 536 in finishing to expand the air bag to thereby constitute a supporting bag 537 constituting a supporting member for supporting the lower expanded portion 536. Further, since the upper expanded portion 535 is arranged on a side of an upper edge 528a of the passenger side wall portion 528, an area of a rear face 535a thereof is set to be smaller than an area of a rear face 536a of the lower expanded portion 536.

According to the supporting bag 537, in finishing to expand the air bag 510 in a state of being mounted to the vehicle, sides of upper ends 515c and 516c of the left expanded portion 515 and the right expanded portion 516 are formed to bend in a front downward direction from the rear side to the front side in view from a side direction, and the front expanded portion 513 is disposed downward from an upper end 514c of the rear expanded portion 514 and therefore, when the rear expanded portion 514 in a state of finishing to expand is exerted with a pressing force to the front side, the upper expanded portion 535 is made to be movable to the front side without being supported by the supporting bag 537, however, the lower expanded portion 536 is restrained from moving to the front side by being supported by the supporting bag 537.

Further, since the ring-like main body portion 512 finishes to expand to close the through hole 511, an outer surface from the lower expanded portion 536 over to the supporting bag 537 achieves a high tension, even when the rear face 536a of the lower expanded portion 536 is exerted with the pressing force to the front side, the rear face 536a is further difficult to recess to thereby restrain from moving to the front side.

Explaining mounting of the air bag 510 to the vehicle, first, the air bag 510 is folded in a state of arranging the retainer 50 at inside thereof to project the bolts 50b on the respective attaching holes 519 and the folded air bag 510 is wrapped by a breakable wrapping sheet 47 (refer to FIG. 2) such that the air bag 510 is not unfolded. Further, in folding the air bag, the air bag is folded after being processed by a transversely folding step and a vertically folding step after having been processed by a previously folding step.

In the previously folding step, a previously folded air bag 539 as shown by FIGS. 51A and 51B is formed. In the previously folding step, in a state of not expanding the air bag 510 (ring-like main body portion 512), the gas flow inlet 518 is disposed on a lower face side thereof, and the outer peripheral side base cloth 526 is arranged above the gas flow inlet 518 by interposing the inner peripheral side base cloth 522. At this occasion, a rear upper portion 526a (at a vicinity of the upper edge 528a of the passenger side wall portion 528) of the outer peripheral side cloth 526 in finishing to expand the air bag 510 is arranged to be opposed to the gas flow inlet 518. Further, a vicinity of the lower edge 528d of the passenger side wall portion 528 is folded to the side of the second inner base cloth 524 to constitute a shape of triangular plate, left and right portions at the vicinity of the gas flow inlet 518 of the first outer base cloth 527 are folded to the side of the gas flow inlet 518 and the air bag 539 is developed flatly substantially symmetrically in the left and right direction.

After the previously folding step, in order to constituted a dimension capable of being contained in the case 54, as shown by FIGS. 52A, 52B, 52C, 53A and 53B, the previously folded air bag 539 is folded by the transversely folding step narrowing the width dimension in the front and rear direction centering on the gas flow inlet 518 by making a crease CH in the left and right direction and the vertically folding step of narrowing the width direction in the left and right direction by making a crease CV in the front and rear direction. In the case of the embodiment, a side of a rear edge 539b is rolled to fold and a side of a front edge 539a is folded in bellows to be proximate to the gas flow inlet 518 to mount to the upper side of the gas flow inlet 518. Further, in the vertical holding step, sides of left and right edges 539c and 539d are folded in bellows to be proximate to the gas flow inlet 518 to mount to the upper side of the gas flow inlet 518.

Further, when the air bag 510 is finished to fold after having been processed by the vertical folding step, as described above, the folded air bag 510 is wrapped by the breakable wrapping sheet 47 such that the air bag is not unfolded.

Further, the folded air bag 510 is mounted above the bottom wall portion 55 of the case 54 while inserting the respective bolts 50b into the attaching hole 57 from above. Successively, the upper portion of the main body portion 52a of the inflator 52 is inserted into the inserting hole 56, the gas flow inlet 518 and the base portion 50a of the retainer 50 from below. and the respective bolts 50b projected to the lower side from the bottom wall portion 55 are inserted into the attaching hole 52d of the flange portion 52c of the inflator, 52. Thereafter, when the nuts 51 are fastened to the respective bolts 50b projected from the flange portion 52c of the inflator 52, the folded air bag 510 and the inflator 40 can be attached to the bottom wall portion 55 of the case 54.

Thereafter, the side wall portion 50 of the case 54 is inserted into the connecting wall portion 57 of the air bag cover 61 in the instrument panel 11 mounted to the vehicle, and the respective locking claws 60 of the case 54 are inserted into the locking holes 66 of the connecting wall portion 57 to thereby lock the respective locking claws 60 by the connecting wall portion 57. Furthermore, when the bolts 7 are fastened to the nuts 58a of the respective brackets 58 via the attaching seats 6c, the air bag apparatus M for the passenger can be mounted to the vehicle.

Further, in mounting the air bag apparatus M to the vehicle, the air bag apparatus M may be mounted to the vehicle by integrating the case 54 attached with the air bag 510 and the inflator 52 previously to the air bag cover 61 of the instrument panel 1 and connecting to fix the air bag apparatus M to a side of the body 6 by utilizing the bolts 7 in attaching the instrument panel 1 to the vehicle.

After mounting the air bag apparatus M to the vehicle, when the expanding gas G is delivered from the respective gas delivering ports 52b of the inflator 52, the air bag 510 is expanded to break the wrapping sheet 47 and break the portion 64 to be broken of the air bag cover 61 to thereby open the door portions 62F and 62B as shown by two-dotted chain lines of FIG. 54 to thereby considerably project the air bag 510 from an opening 67 opened with the door portions 62F and 62B of the air bag cover 61. Further, the air bag is finished to expand and the extra expanding gas G is discharged from the vent holes 520. Further, a member of notation W of FIG. 54 designates a windshield.

Further, according to the air bag apparatus M of the embodiment, the air bag 510 after finishing to expand supports the lower expanded portion 536 for protecting the chest and belly portion PB of the passenger P by the supporting member 537 and in interfering with the passenger P, a moving amount of the lower expanded portion 536 is restrained than that of a moving amount of the rear face 535a of the upper expanded portion 535 to the front side of the vehicle, conversely, a moving amount of the upper expanded portion 535 to the front side of the vehicle is made to be larger than that of the lower expanded portion 536 in interfering with the passenger P and therefore, the head portion PH of the passenger P can softly be constrained.

Naturally, the lower expanded portion 536 can protect the chest and belly portion PB of the passenger P, an area of the rear face 536a is made to be wider than that of the rear face 535a of the upper expanded portion 535 and even when the moving amount to the front side is smaller, a total of the chest and belly portion PB of the passenger P can precisely be protected.

Therefore, according to the air bag apparatus M of the embodiment, the air bag 510 expanded to develop can constrain the head portion PH of the passenger P with further excellent cushioning performance than that of the chest and belly portion PB of the passenger P.

Further, since the supporting member of the embodiment is constituted by the supporting bag 537 bulged by making the expanding gas G flow thereto, the expanding gas G may be supplied to the supporting bag 537 along with the expanding gas made to flow to the upper and the lower expanding portions 535 and 536 and in comparison with the case of using a member of a supporting rod or the like which is not expanded for the supporting member, arrangement of the supporting member 537 is facilitated.

Further, in the case of the embodiment, the supporting bag 537 is arranged to communicate with the lower expanded portion 536 and therefore, the expanding gas G made to flow to the upper and the lower expanded portions 535 and 536 can commonly be used and therefore, the inflator 52 for supplying the gas G can commonly be used and an increase in a number of parts can be prevented.

Further, according to the embodiment, the air bag 510 per se is constituted as the ring-like member arranged with the through hole 511 penetrated substantially in the up and down direction in finishing to expand the air bag and including the front expanded portion 513, the left expanding portion 515 and the rear expanded portion 514 and the right expanded portion 516 to finish expansion by closing the through hole 511 by the bulging base cloth 522 at the surrounding and constituted by arranging the gas flow inlet 518 the peripheral edge 517 of which is attached to the case 54 and which makes the expanding gas G flow at the front expanded portion 513 and arranging the upper expanded portion 535 to the upper side of the rear expanded portion 514 and arranging the lower expanded portion 536 to the lower side and the supporting bag 537 is constituted by the front expanded portion 513, the left expanded portion 515 and the right expanded portion 516.

That is, by only forming the air bag 510 in the ring-like member, the air bag 510 including the upper and the lower expanded portions 535 and 536 and the supporting bag 537 can be formed and therefore, fabrication thereof is facilitated.

Further, according to the air bag 510 of the ring-like member having the through hole 511 at an initial stage of expanding to develop the air bag, when the expanding gas G is made to flow from the gas flow inlet 518, the gas G is made to flow to both left and right sides between the outer peripheral side base cloth 526 and the inner peripheral side base cloth 522 to widen the passenger side wall portion 528 and a portion proximate thereto of the outer peripheral side base cloth 526 widely in the left and right direction while opening the through hole 511 to move to the rear side of the vehicle and therefore, even when the seated passenger advances, the passenger can precisely be constrained by the portion on the passenger side the width of which is widened in the left and right direction, that is, by the wall portion 528 per se or the first outer peripheral side base cloth 527 at the vicinity of the wall portion 528 without partially operating the pressing force.

Further, a single or a plurality of the through holes 511 penetrated substantially in the up and down direction of the air bag 510 may be partially set on the inner peripheral side of the inner peripheral side base cloth 522 by seaming portions of the inner peripheral side base cloth 522 to bond.

What is claimed is:

1. An air bag apparatus comprising:
   a case; and
   an air bag folded in the case, wherein the air bag includes an outer sheet and an inner sheet, wherein the inner sheet and the outer sheet have substantially the same shape and are seamed to one another; and
   a front inner sheet and a front outer sheet, which are seamed with edges of the outer sheet and the inner sheet, wherein
   the air bag, when inflated, includes a through hole, which extends through the air bag such that a gas injected within the air bag flows annularly around the through hole,
   the air bag includes at least a first expanded portion and a second expanded portion, which are formed between the outer sheet and the inner sheet, and a third expanded portion, which is formed between the front inner sheet and the front outer sheet and at a rear end of the air bag,
   the gas is injected into the air bag at a front end of the air bag, which is opposite to the rear end of the air bag,
   when the air bag is inflated, a gas is supplied to the first and second expanded portions so that the first and second expanded portions inflate and oppose one another, and then the gas is supplied to the third expanded portion through the first and second expanded portions, and
   the air bag is constructed so that a tension of the inner sheet, which forms the through hole, is less than a tension of the outer sheet, such that the through hole is substantially closed when the air bag is inflated.

2. The air bag apparatus according to claim 1, wherein the through hole extends substantially in an up and down direction of the air bag apparatus.

3. The air bag apparatus according to claim 1, wherein the air bag further includes a fourth expanded portion communicated with a gas injection port of an inflator, and the gas is supplied to the first and second expanded portions to be inflated to oppose each other through the fourth expanded portion.

4. The air bag apparatus according to claim 1, wherein the air bag further includes a restricting member for restricting expansion of the air bag in a left and right direction of the air bag apparatus.

* * * * *